TOLL SWITCHING TELEPHONE SYSTEM

Filed Feb. 21, 1952

16 Sheets-Sheet 1

INVENTOR.
John Wicks
BY
Smith, Olsen & Baird
Attys.

TOLL SWITCHING TELEPHONE SYSTEM

Filed Feb. 21, 1952

16 Sheets-Sheet 2

INVENTOR.
John Wicks
BY
Smith, Olsen + Baird
Attys.

May 11, 1954 J. WICKS 2,678,356

TOLL SWITCHING TELEPHONE SYSTEM

Filed Feb. 21, 1952 16 Sheets-Sheet 3

INVENTOR.
John Wicks
BY
Smith, Olsen & Baird
Attys.

TOLL SWITCHING TELEPHONE SYSTEM

Filed Feb. 21, 1952 16 Sheets-Sheet 4

INVENTOR.
John Wicks
BY
Smith, Olsen & Baird
Attys.

INVENTOR.
John Wicks
BY
Smith, Olsen & Baird
Attys.

INVENTOR.
John Wicks
BY
Smith, Olsen & Baird
Attys.

TOLL SWITCHING TELEPHONE SYSTEM

Filed Feb. 21, 1952 16 Sheets-Sheet 7

INVENTOR.
John Wicks
BY
Smith, Olsen + Baird
Attys.

INVENTOR.
John Wicks
BY
Smith, Olsen + Baird
Attys.

May 11, 1954 J. WICKS 2,678,356

TOLL SWITCHING TELEPHONE SYSTEM

Filed Feb. 21, 1952 16 Sheets-Sheet 9

INVENTOR.
John Wicks
BY
Smith, Olsen & Baird
Attys.

May 11, 1954 J. WICKS 2,678,356

TOLL SWITCHING TELEPHONE SYSTEM

Filed Feb. 21, 1952 16 Sheets-Sheet 10

INVENTOR.
John Wicks

BY
Smith, Olsen & Baird
Attys.

INVENTOR.
John Wicks
BY
Smith, Olsen & Baird
Attys.

May 11, 1954 J. WICKS 2,678,356

TOLL SWITCHING TELEPHONE SYSTEM

Filed Feb. 21, 1952 16 Sheets-Sheet 12

INVENTOR.
John Wicks
BY
Smith, Olsen + Baird
Attys.

INVENTOR.
John Wicks
BY
Smith, Olsen & Baird
Attys.

TOLL SWITCHING TELEPHONE SYSTEM

Filed Feb. 21, 1952 16 Sheets-Sheet 14

INVENTOR.
John Wicks
BY
Smith, Olsen & Baird
Attys.

May 11, 1954 J. WICKS 2,678,356

TOLL SWITCHING TELEPHONE SYSTEM

Filed Feb. 21, 1952 16 Sheets-Sheet 15

Inventor
John Wicks

BY Smith, Olsen & Baird
Attys.

INVENTOR.
John Wicks
BY
Smith, Olsen & Baird
Attys.

Patented May 11, 1954

2,678,356

UNITED STATES PATENT OFFICE 2,678,356

TOLL SWITCHING TELEPHONE SYSTEM

John Wicks, Biloxi, Miss., assignor to Automatic Electric Laboratories, Inc., Chicago, Ill., a corporation of Delaware Application February 21, 1952, Serial No. 272,741

31 Claims. (Cl. 179—27)

Figure 1:
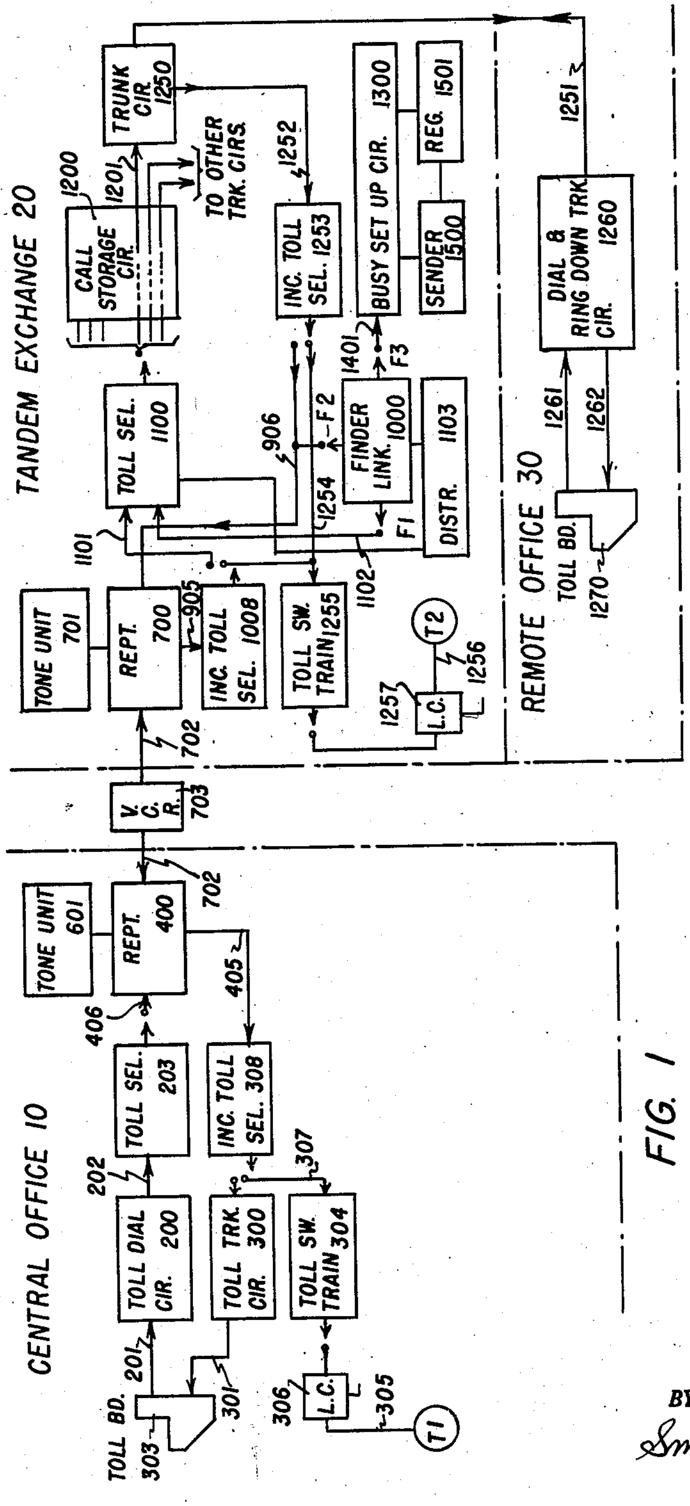

The present invention relates to telephone systems and more particularly to toll switching systems involving tandem related offices and exchanges.

In setting-up toll connections in a toll switching telephone system from a first operator switchboard in an originating office to a second operator switchboard in a terminating office through automatic switching apparatus in a tandem related exchange, the situation is frequently encountered that while there are an adequate number of toll lines extending between the originating office and the tandem exchange and an adequate number of trunk lines extending between the terminating office and the tandem exchange, the automatic switching apparatus in the tandem exchange encounters an all-trunks-busy condition of the trunk lines extending between the tandem exchange and the terminating office so that some of the toll connections cannot be immediately completed by the operators at the first switchboard in the originating office. Thus it becomes necessary for the operators at the first switchboard to make recall slips on these uncompleted toll calls and subsequently to attempt the completion thereof, whereby the operators may be required to make several attempts before completing any one of these toll calls. This situation is further aggravated in a telephone system where the originating office is a large office and the first switchboard comprises a large number of positions and the terminating office is a small office and the second switchboard comprises a small number of operator positions, and wherein the normal toll traffic between the tandem exchange and the terminating office does not warrant the provision of additional trunk lines therebetween.

Accordingly it is the general object of the present invention to provide in the tandem exchange of a telephone system of the character noted, automatic toll call storage and switching apparatus that is rendered operative in response to an all-trunks-busy condition of all of the trunk lines extending between the tandem exchange and the terminating office, and that may then be set by the operator at any operator position at the first switchboard subsequently and automatically to complete a toll connection on a point-to-point basis from the tandem exchange to the second switchboard and from the tandem exchange to the first switchboard.

Another object of the invention is to provide automatic toll call storage and switching apparatus of the character noted, that is capable of storing a plurality of toll calls and that is subsequently operative successively to set-up the corresponding point-to-point calls from the tandem exchange to the two switchboards as the trunk lines extending between the tandem exchange and the terminating office become idle, wherein the point-to-point calls are set-up in the same order that the corresponding toll calls are placed in storage.

Another object of the invention is to provide automatic toll call storage and switching apparatus of the character noted, that is rendered operative when all of the trunk lines between the tandem exchange and the terminating office become busy and that is then automatically taken into use upon the extension of the next toll call from the first switchboard to the tandem exchange which requires completion to the second switchboard, and that is selectively held and released under the control of the calling operator at the first switchboard after it is taken into use, whereby the calling operator at the first switchboard may handle the particular toll call being extended either on a point-to-point basis or upon a recall basis.

A further object of the invention is to provide in a toll switching telephone system, an automatic toll call storage and switching apparatus that is operative in conjunction with toll lines that are terminated at the opposite ends thereof in repeaters of the voice-frequency dailing and signalling type.

A still further object of the invention is to provide in a telephone system, improved call storage and automatic switching apparatus permitting flexibility in the manner of setting-up calls involving a tandem exchange and depending upon the idle or busy conditions of the trunk groups outgoing from the tandem exchange.

Further features of the invention pertain to the particular arrangement of the circuit elements of the telephone system, whereby the above-outlined and additional operating features thereof are attained.

*Sect. 1.—The general arrangement of the telephone system*

Figure 17:
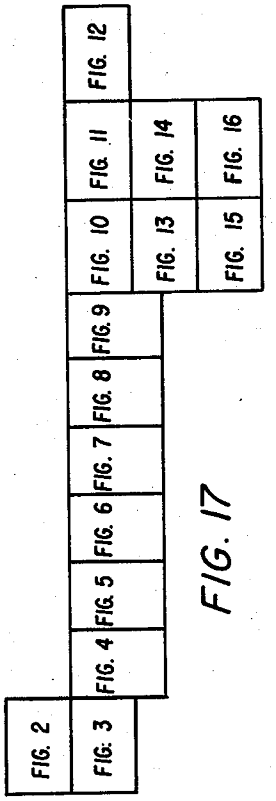

The invention, both as to its organization and method of operation, together with further objects and advantages thereof, will best be understood by reference to the following specification taken in connection with the accompanying drawings, in which Figure 1 is a schematic diagram of the area served by a telephone system embodying the present invention and illustrating the general arrangement of the apparatus incorporated in two offices and one exchange thereof; Figs. 2 to 16, inclusive, taken together, illustrate the details of certain of the apparatus incorporated in one of the offices and the exchange included in the telephone system, which apparatus has incorporated therein the features of the invention as briefly outlined above; and Fig. 17 illustrates the mode of combining Figs. 2 to 16, inclusive, to form a unified diagram.

Figure 2:
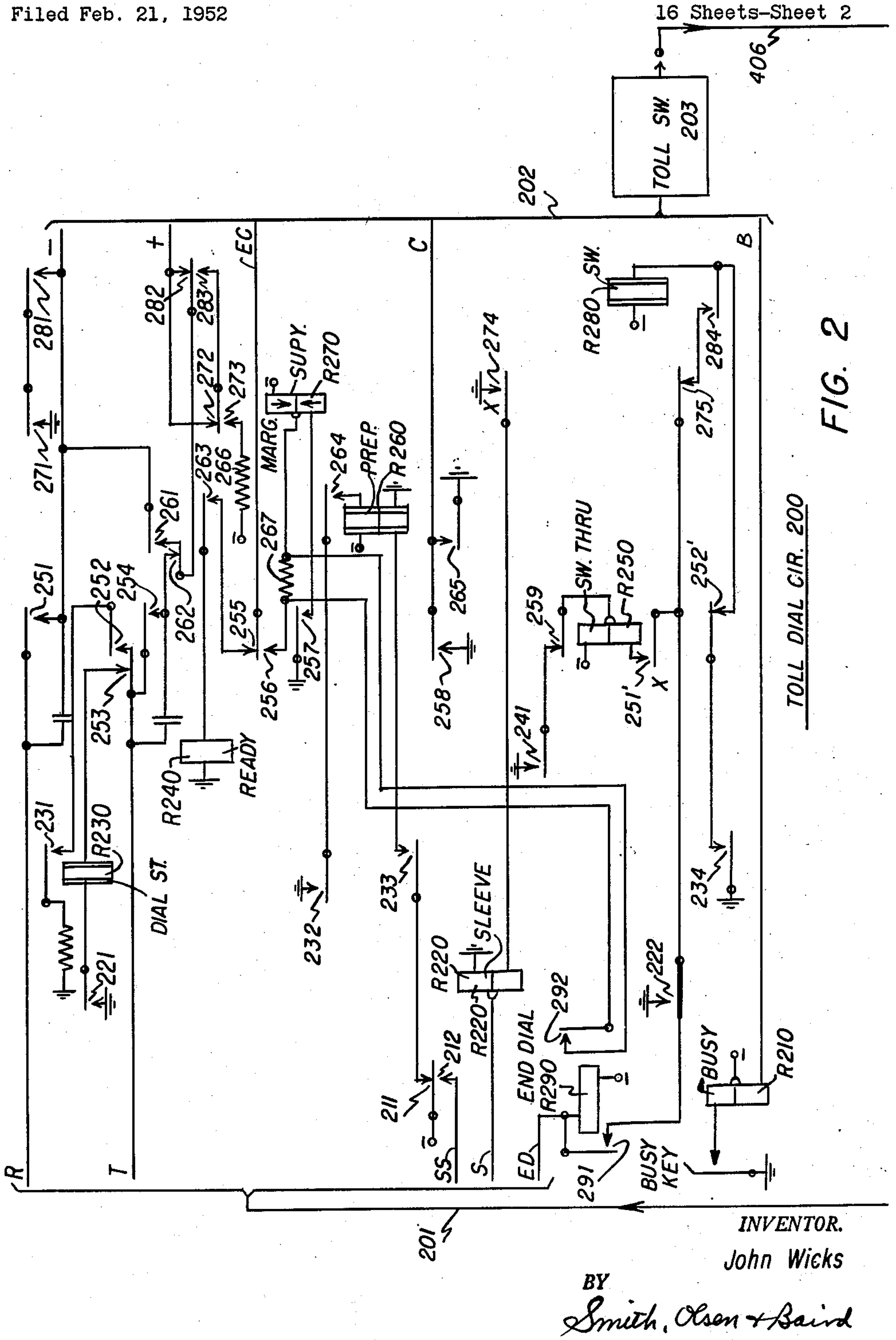
Figure 3:
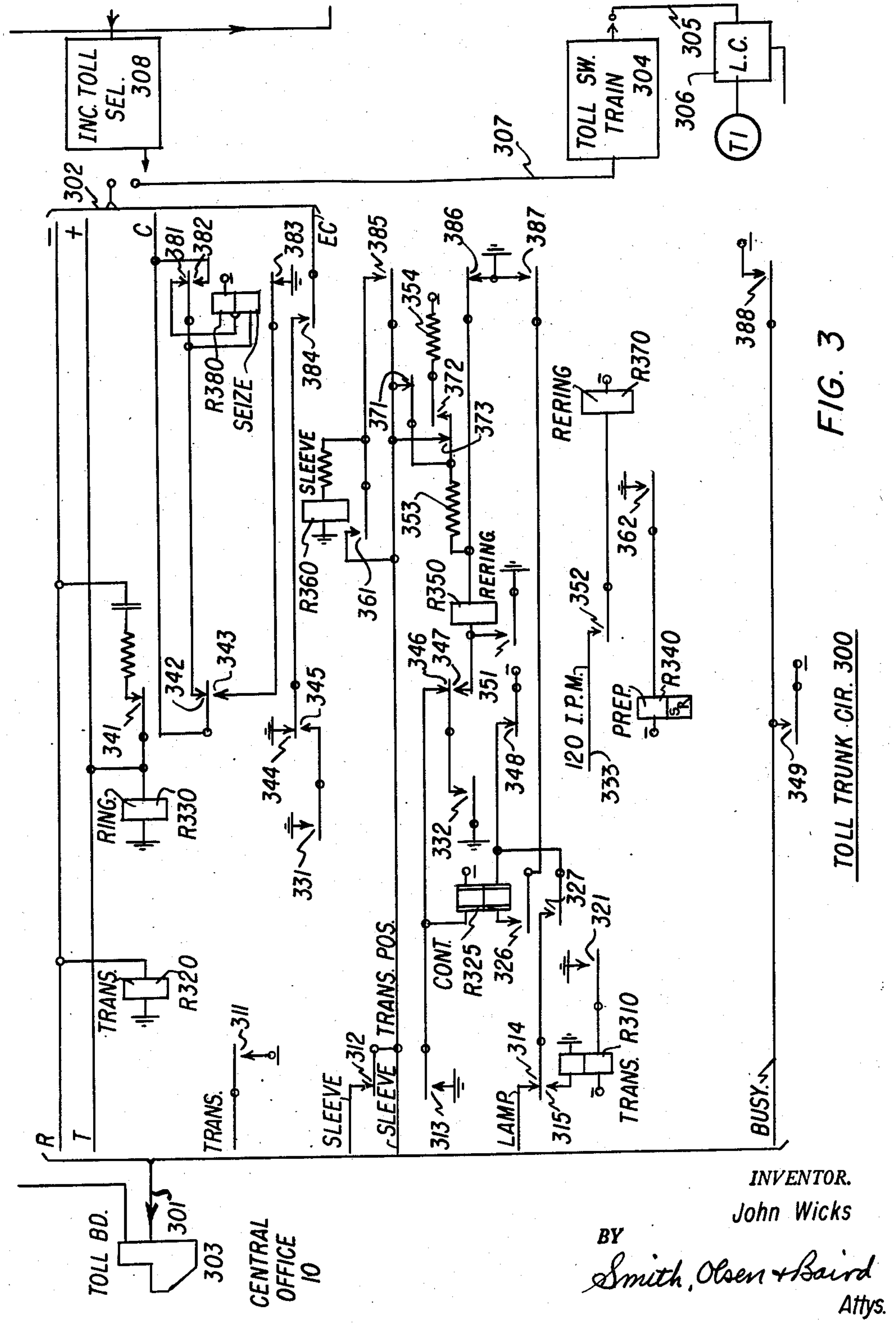
Figure 4:
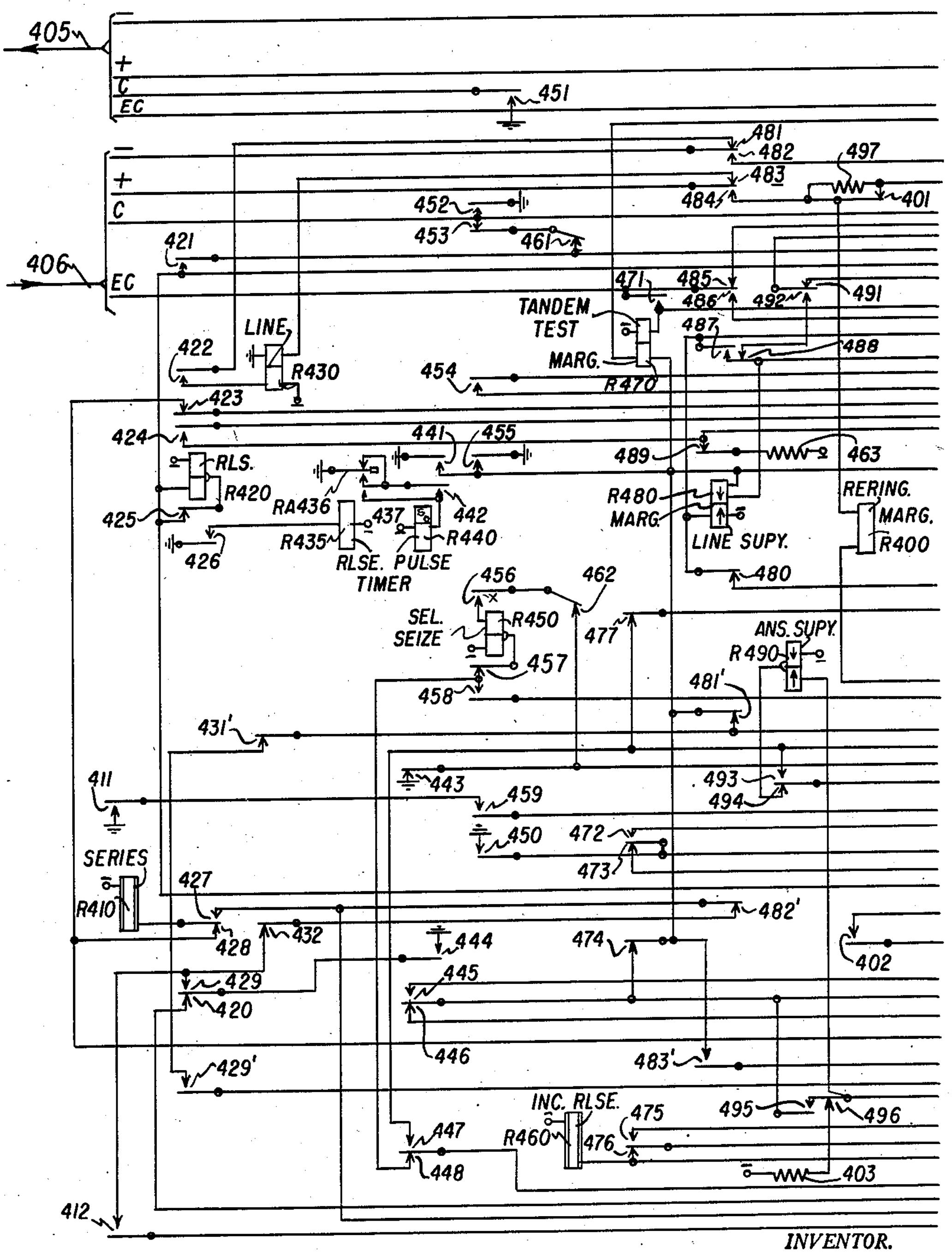
Figure 5:
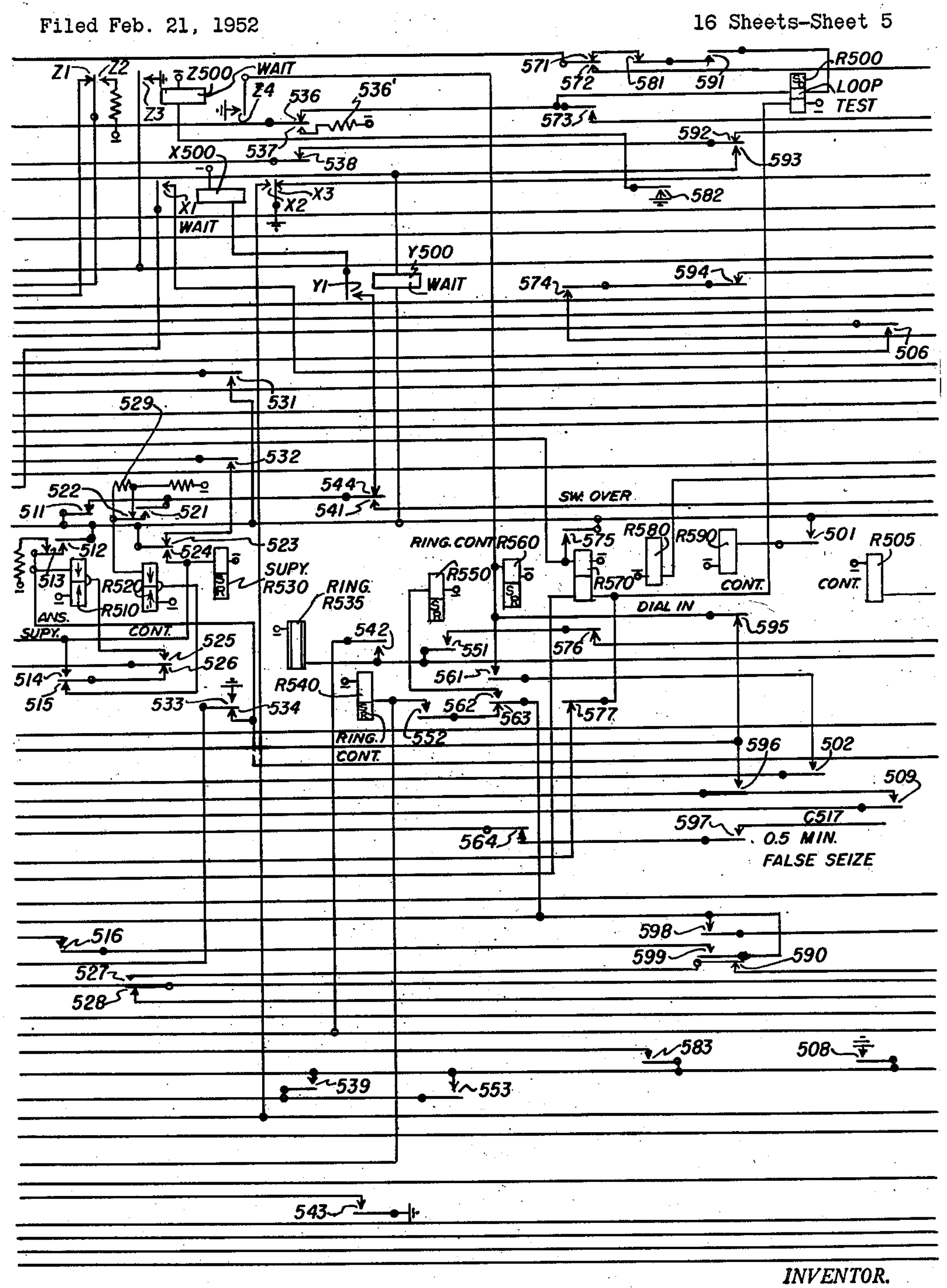
Figure 6:
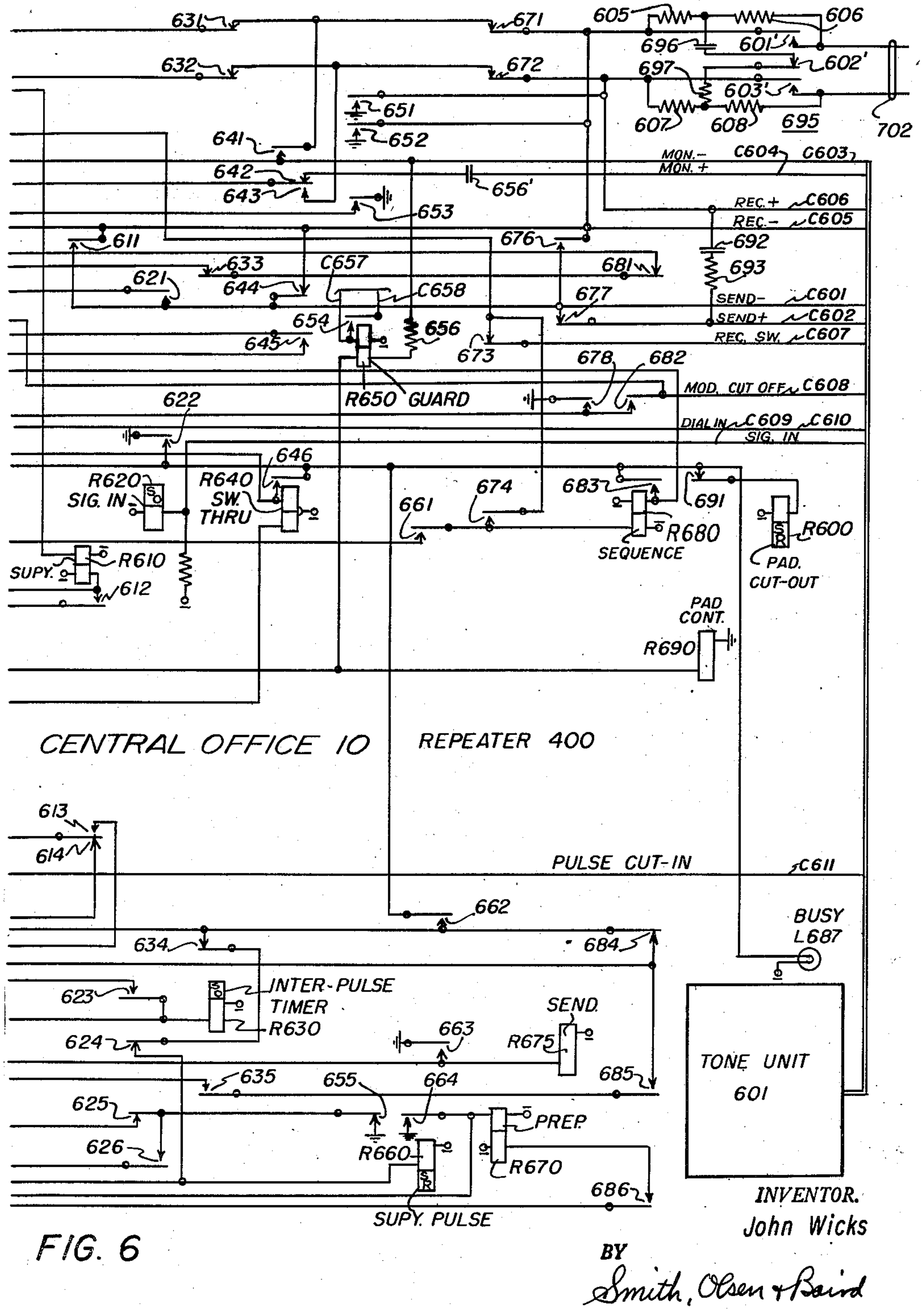
Figure 7:
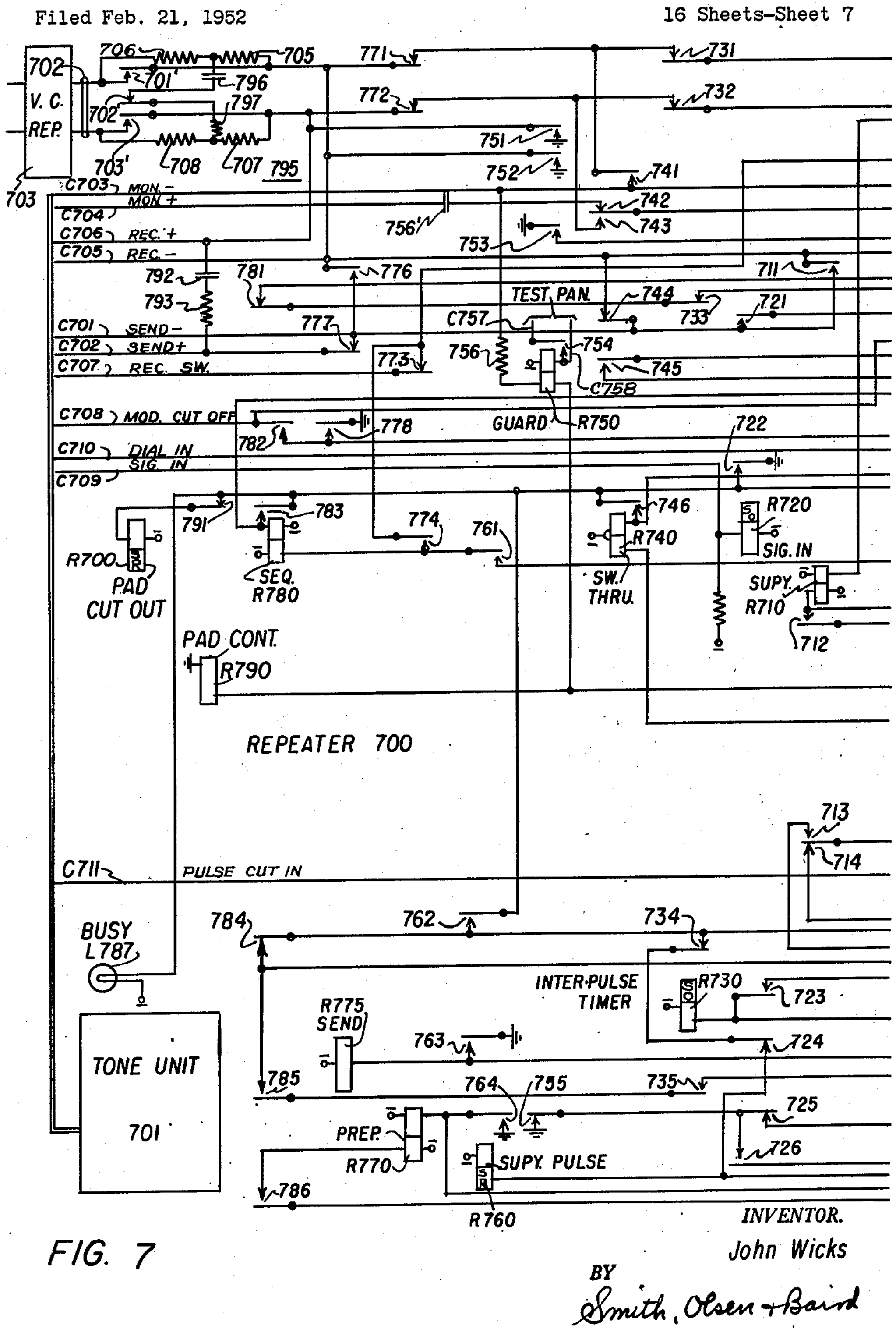
Figure 8:
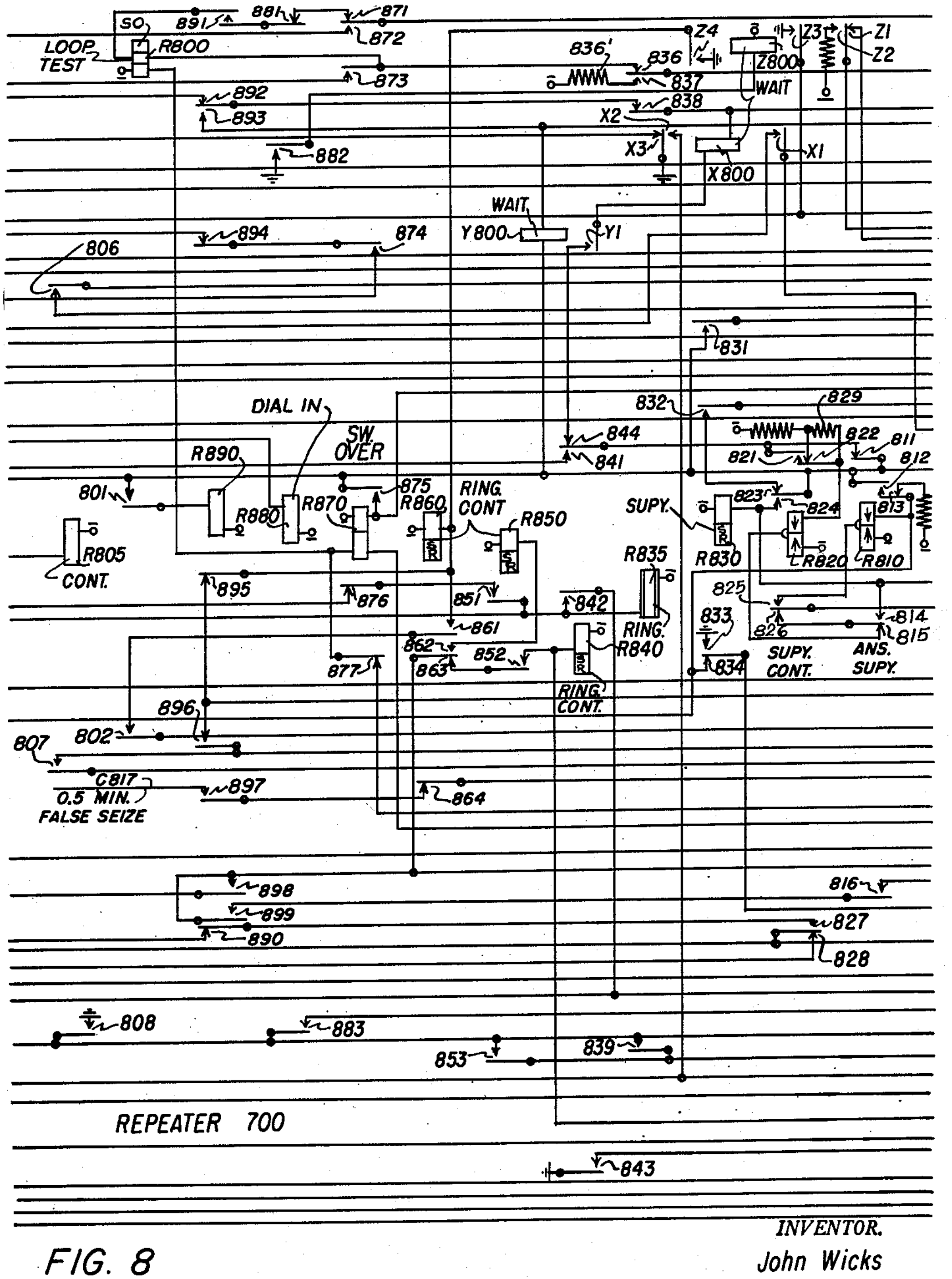
Figure 9:
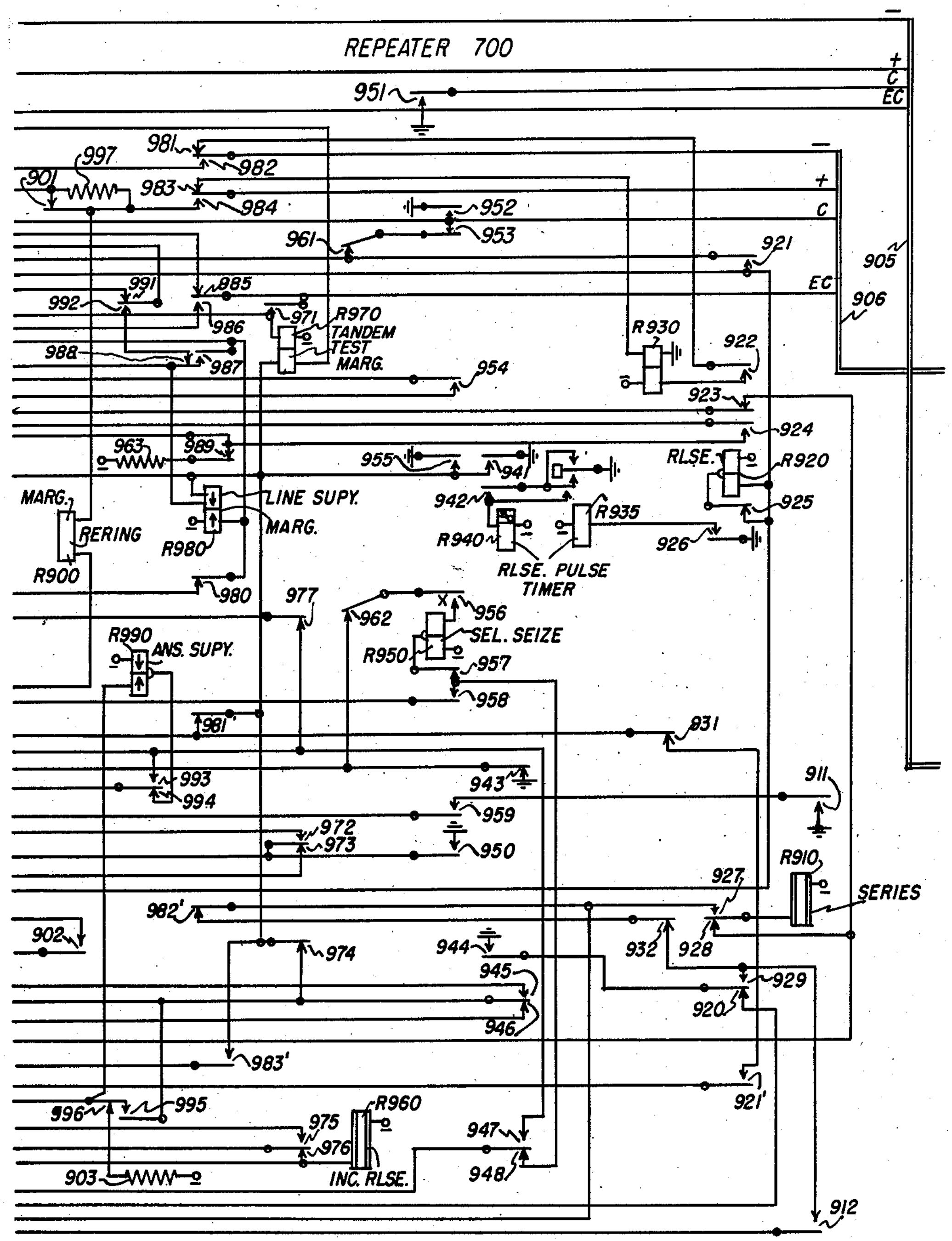
Figure 10:
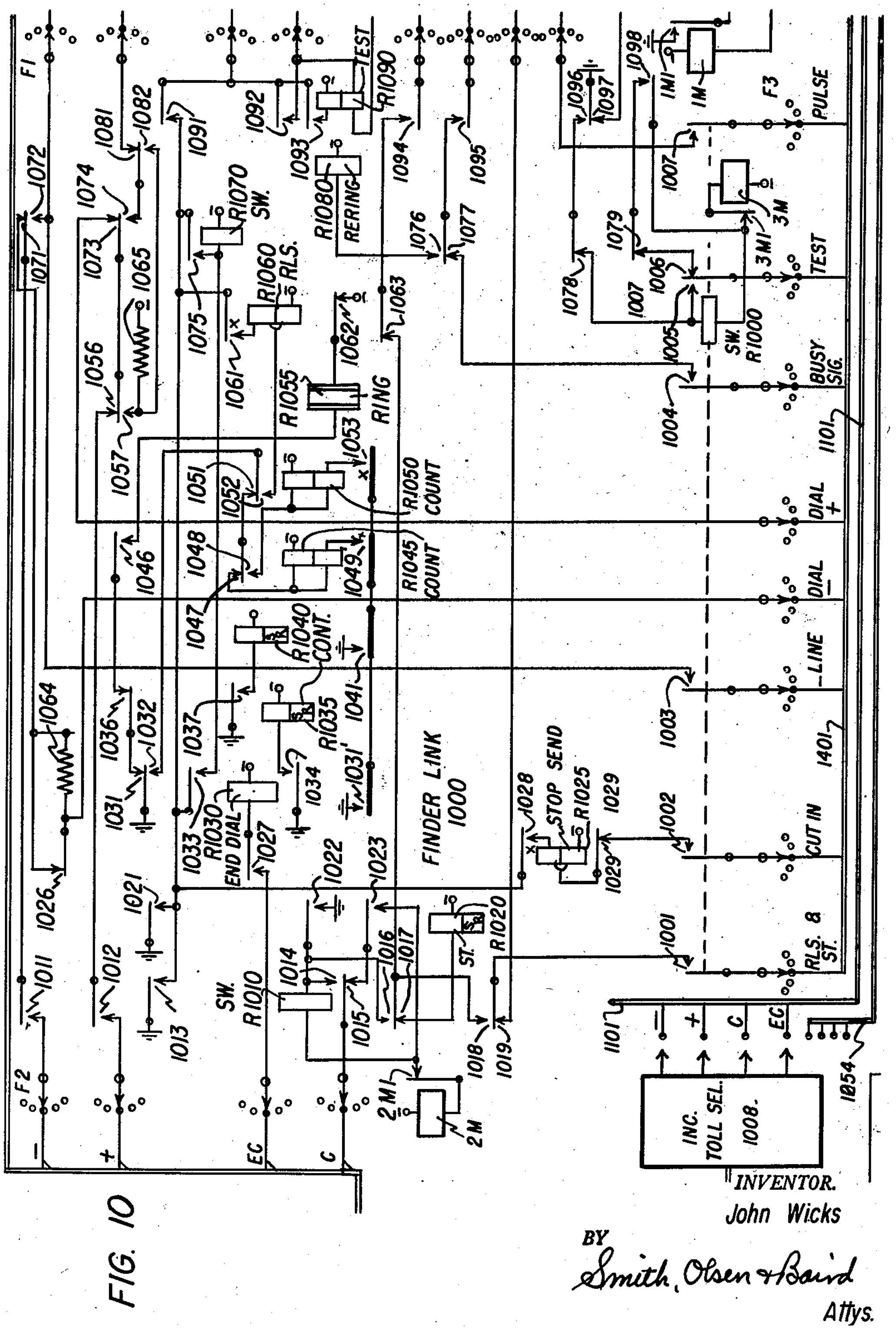
Figure 11:
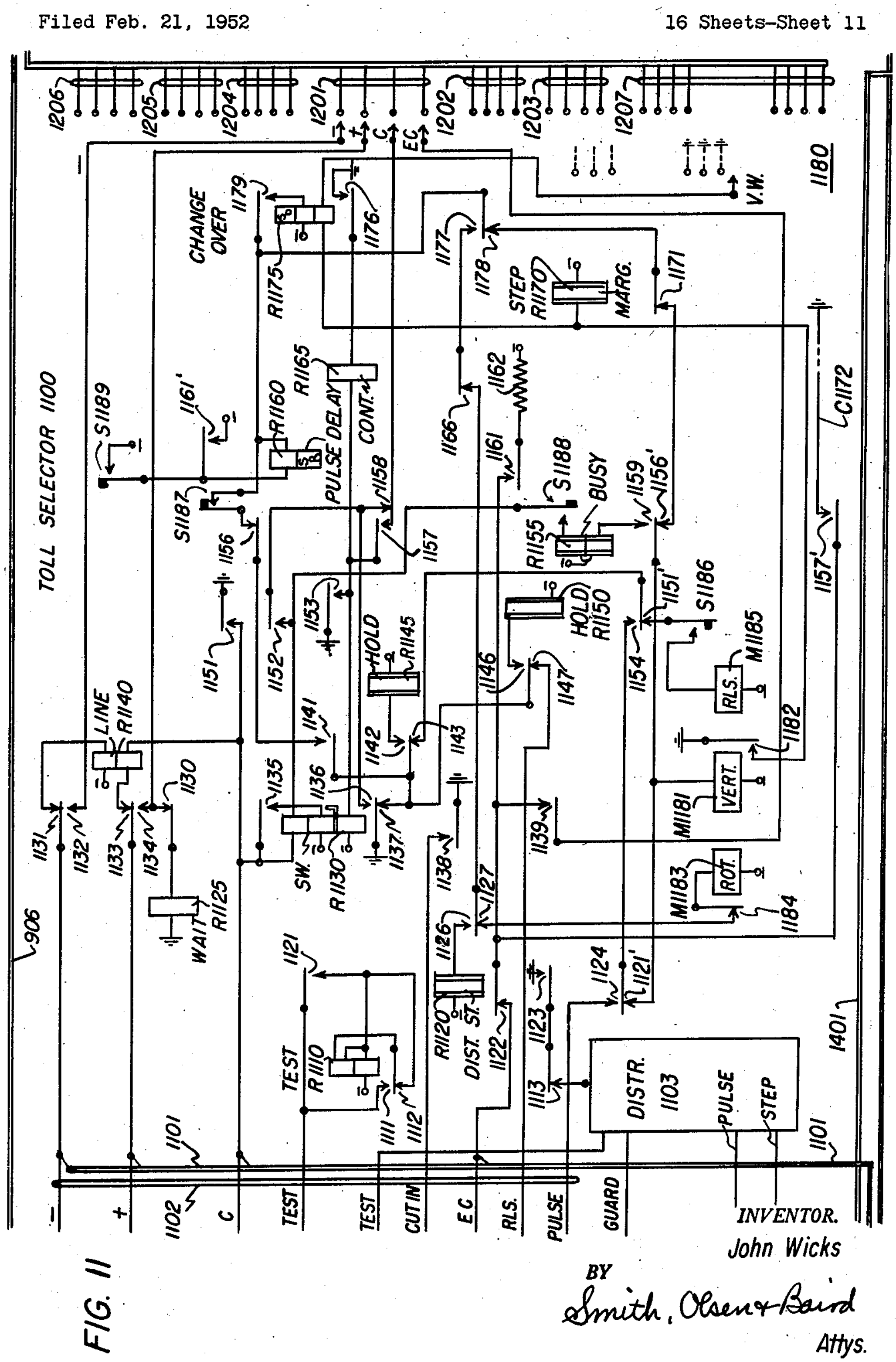
Figure 12:
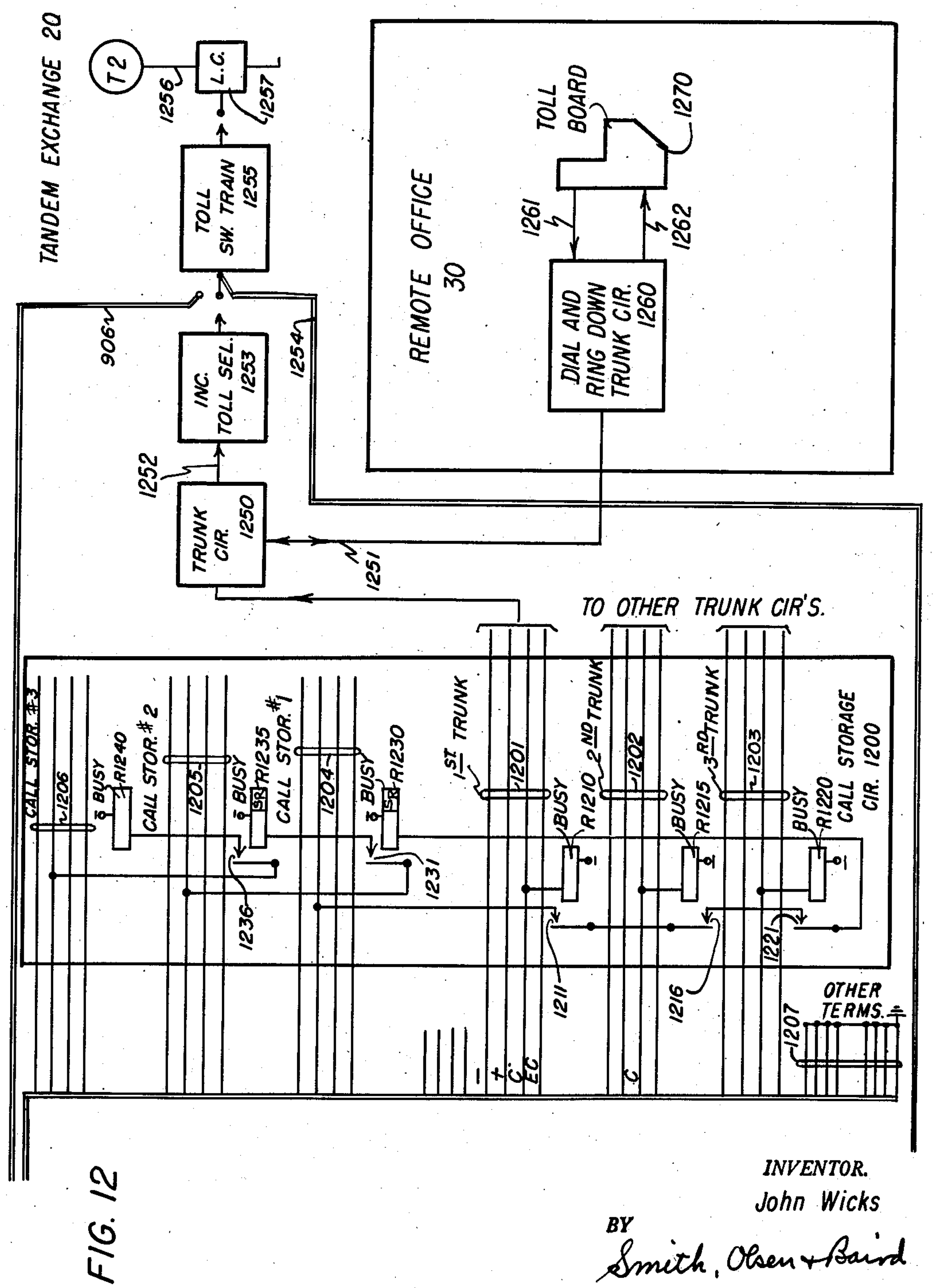
Figure 13:
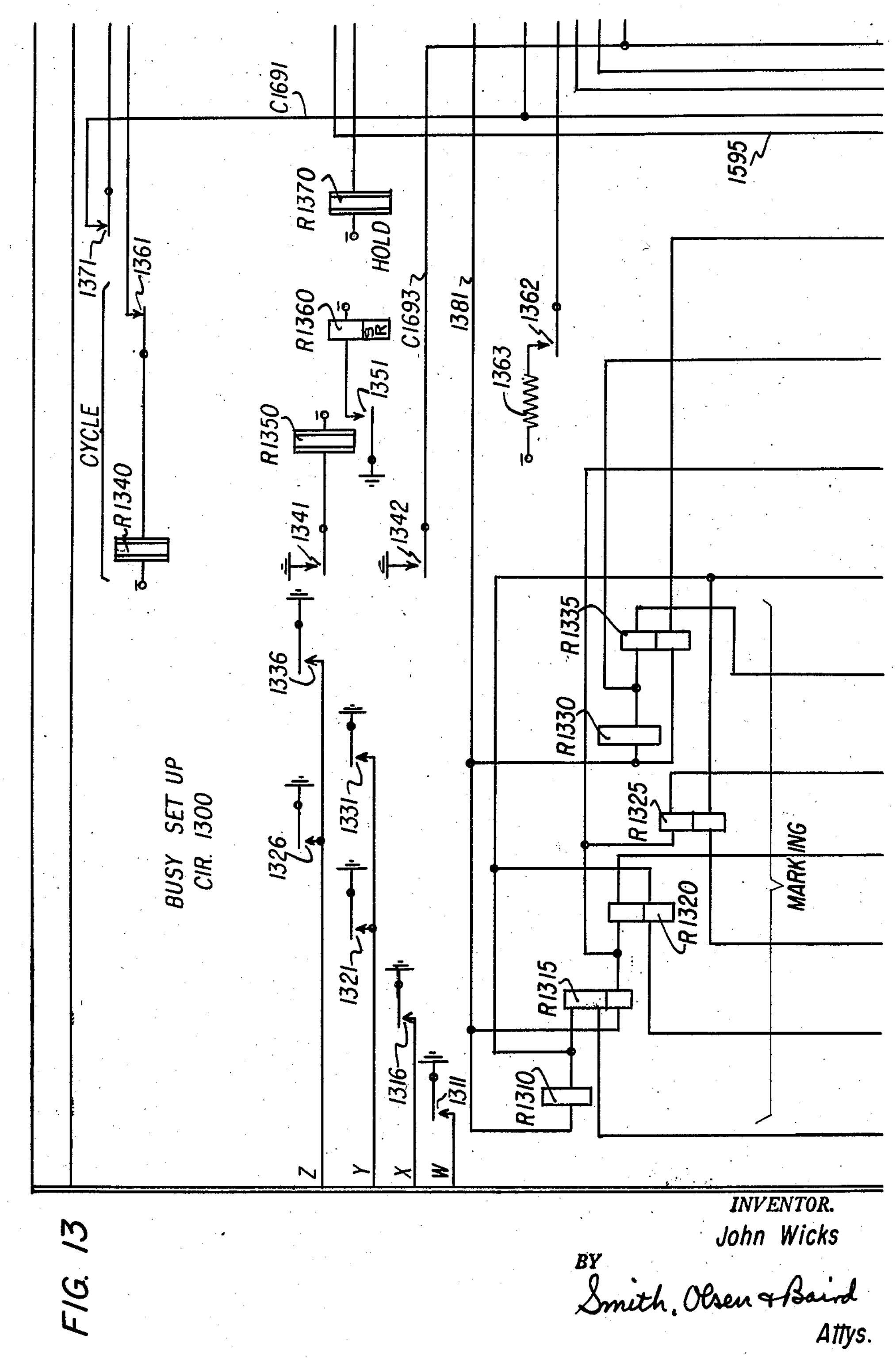
Figure 14:
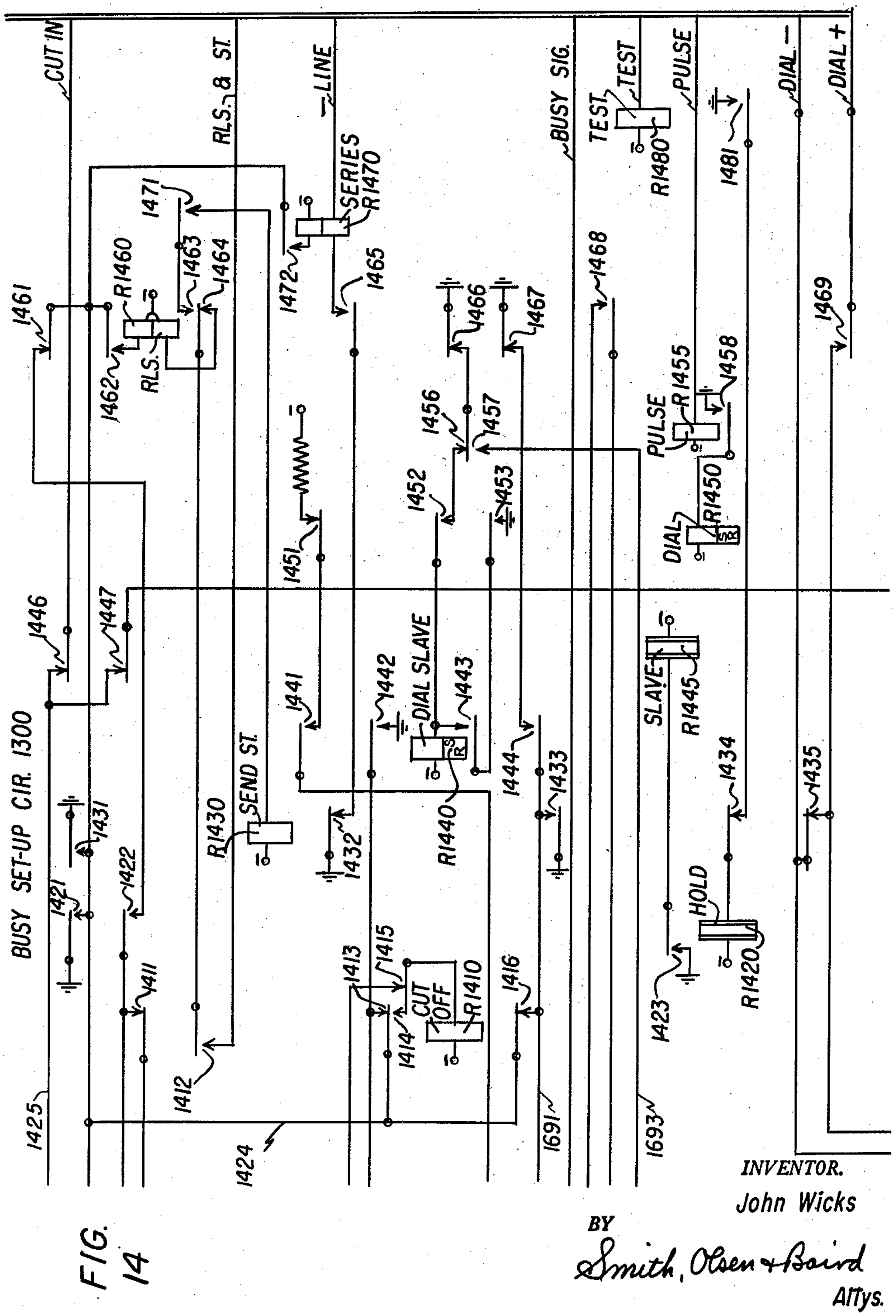
Figure 15:
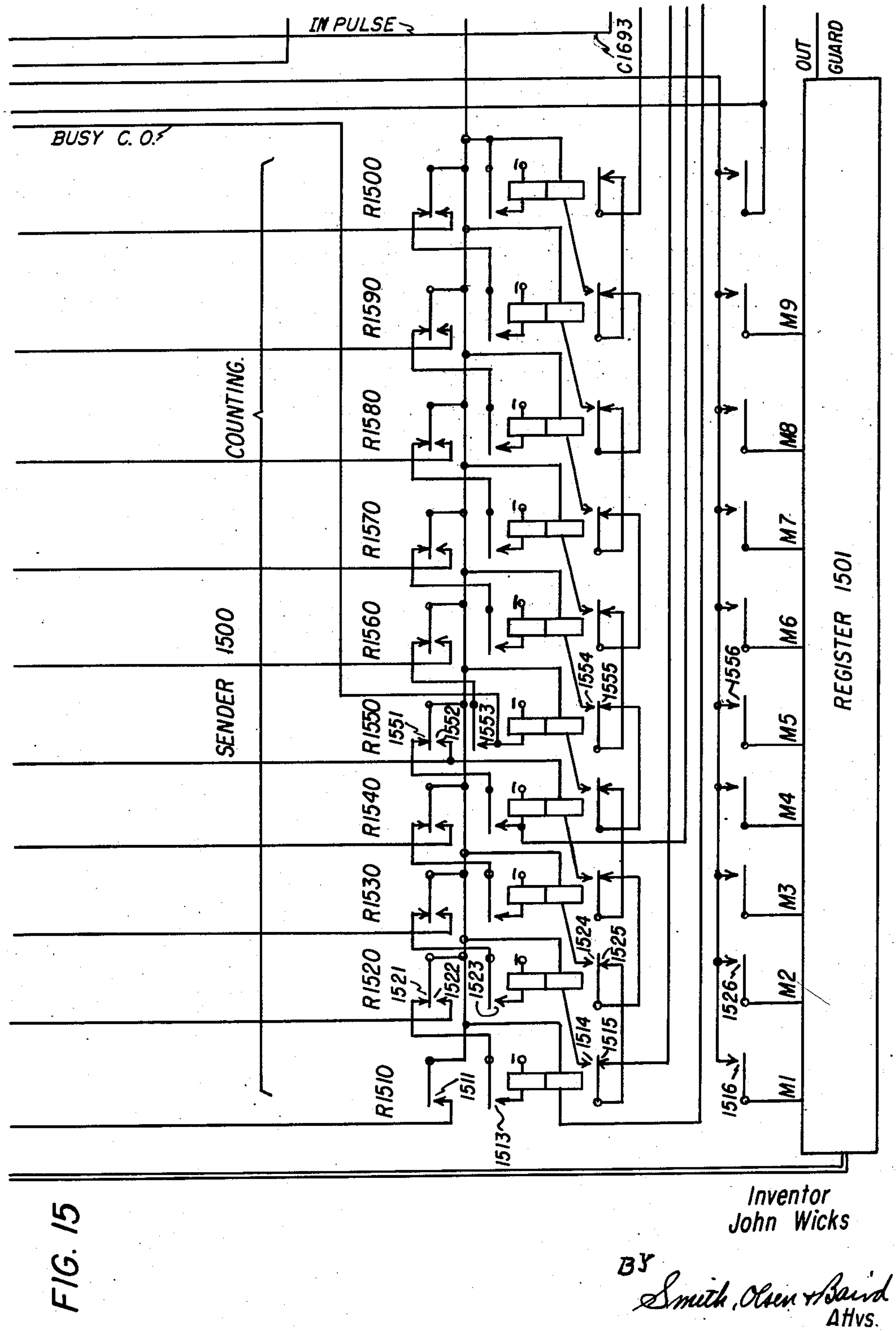
Figure 16:
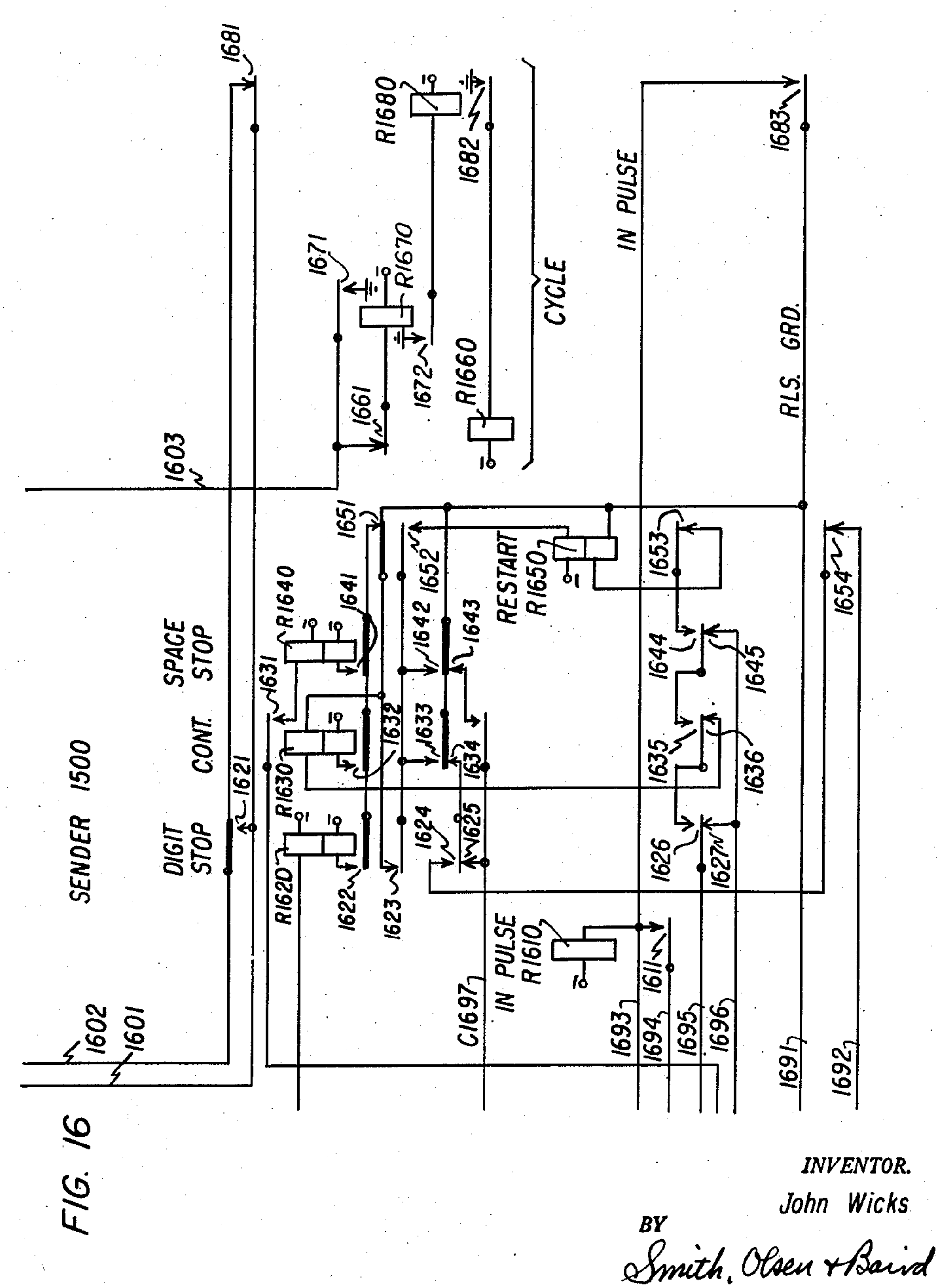

More particularly, Fig. 2 illustrates the details of one of the toll dial circuits incorporated in the central office; Fig. 3 illustrates the details of one of the toll trunk circuits incorporated in the central office; Figs. 4 to 6, inclusive, illustrate the details of one of the repeaters incorporated in the central office; Figs. 7 to 9, inclusive, illustrate the details of one of the repeaters incorporated in the tandem exchange; Fig. 10 illustrates the details of one of the finder links incorporated in the tandem exchange; Fig. 11 illustrates the details of one of the toll selectors incorporated in the tandem exchange; Fig. 12 illustrates the details of the call storage circuit incorporated in the tandem exchange; Figs. 13 and 14 illustrate the details of one of the busy set-up circuits incorporated in the tandem exchange; and Figs. 15 and 16 illustrate the details of the sender individually associated with the busy set-up circuit mentioned and incorporated in the tandem exchange.

Referring now more particularly to Fig. 1, the telephone system there illustrated serves an area including a central office 10, a tandem exchange 20, a remote office 30 and certain other exchanges associated with the tandem exchange 20 and not illustrated. The central office 10 and the tandem exchange 20 are of the automatic type; while the remote office 30 may be of any suitable type, either manual or automatic. The central office 10 and the remote office 30 comprise primary toll centers; while the tandem exchange 20 occupies a tandem position in the area with respect to the central office 10 and the remote office 30. The central office 10 comprises a toll board 303 that may be of any suitable manual dial type, such, for example, as a Western Electric Company No. 3; and, likewise, the remote office 30 comprises a toll board 1270 that may be of any suitable manual dial type, such, for example, as a Western Electric Company No. 3. The central office 10 serves a number of subscriber substations, including the subscriber substation T1; the tandem exchange 20 serves a number of subscriber substations, including the subscriber substation T2; and the remote office 30 serves a number of subscriber substations, not shown.

Preferably, the automatic switching apparatus incorporated in the central office 10 is of the Strowger type, including a local switch train, not shown, for the purpose of setting up local calls therein, and a toll switch train for setting up toll calls; and, preferably, the automatic switching apparatus incorporated in the tandem exchange 20 is of the Strowger type including a local switch train, not shown, for the purpose of setting up local calls therein, and a toll switch train for setting up toll calls. The central office 10 and the tandem exchange 20 are interconnected by a fairly large group of trunk lines, including the trunk line 702; and the tandem exchange 20 and the remote office 30 are interconnected by a fairly small group of trunk lines, including the trunk line 1251. As illustrated, the group of trunk lines interconnecting the central office 10 and the tandem office 20 comprises ten individual trunk lines; while the group of trunk lines interconnecting the tandem exchange 20 and the remote office 30 comprises three individual trunk lines. Each of the trunk lines 702, etc., may include one or more voice current repeaters 703, etc., since these trunk lines are fairly long; while each of the trunk lines 1251, etc., may be of the straight metallic type, since these trunk lines are fairly short. Each of the trunk lines 702, etc., terminates at the opposite ends thereof in substantially identical repeaters respectively disposed in the central office 10 and in the tandem exchange 20, the trunk line 702 respectively terminating in the repeaters 400 and 700 respectively disposed in the central office 10 and in the tandem exchange 20. Each of the trunk lines 1251, etc., terminates at the opposite ends thereof in a trunk circuit disposed in the tandem exchange 20 and in a ring-down trunk circuit disposed in the remote office 30, the trunk line 1251 terminating in the trunk circuit 1250 disposed in the tandem exchange 20 and in the ring-down trunk circuit 1260 disposed in the remote office 30. Each of the repeaters 400, etc., is provided with an individually connected tone unit 601, etc., and an individually connected incoming toll selector 308, etc., in the central office 10; while each of the repeaters 700, etc., is provided with an individually connected tone unit 701, etc., and an individually connected incoming toll selector 1008, etc., in the tandem exchange 20.

In the central office 10, each operator position at the toll board 303 has access to an individual group of toll dial circuits via an individual group of outgoing trunks, the first operator position having access to the group of toll dial circuits 200, etc., via the individual group of outgoing trunks 201, etc. Likewise, at the toll board 303, each operator position is accessible to an individual group of toll trunk circuits via an individual group of incoming trunks, the first operator position being accessible to the individual group of toll trunk circuits 300, etc., via the individual group of incoming trunks 301, etc. Each of the toll dial circuits 200, etc., is connected to a toll selector 203, etc., individual thereto, the toll selectors 203, etc., having access to the repeaters 400, etc. Specifically, the toll selector 203 has access to the outgoing trunk 406 extending to the repeater 400; the repeater 400 being connected via the incoming trunk 405 to the incoming toll selector 308 as previously noted. The incoming toll selectors 308, etc., have access to the toll trunk circuits 300, etc., via the incoming trunk 302, etc., extending thereto. Also, the incoming toll selectors 308, etc., have access to a toll switch train, indicated generally at 304, via incoming trunks 307, etc; while the toll switch train 304 has access to the subscriber lines extending to the subscriber substation T1, etc., in the central office 10. For example, the toll switch train 304 has access to the subscriber line 305 extending to the subscriber substation T1 and provided with the individual line circuit 306. In the central office 10 the toll selectors 203, etc., the incoming toll selectors 308, etc., and the toll switch train 304 comprise component elements of the toll switching apparatus.

In the remote office 30, each operator position at the toll board 1270 has access to the ring-down trunk circuits 1260, etc., via outgoing trunks 1261, etc., and is accessible to the ring-down trunk circuits 1260, etc., via incoming trunks, 1262, etc.

In the tandem exchange 20 the trunk circuits 1250, etc., are provided with individually connected incoming toll selectors 1253, etc., via incoming trunks 1252, etc. Also the trunk circuits 1250, etc., are accessible to a call storage circuit 1200 via individual outgoing trunks 1201, etc. The incoming toll selectors 1253, etc., have access to the repeater 700, etc., via outgoing trunks 906, etc.; and the incoming toll selectors 1008, etc., have access to a group of toll selectors, including the toll selector 1100, that, in turn, has access to the call storage circuit 1200. For example, the incoming toll selector 1008 connected to the repeater 700 via the incoming trunk 905 has access to the toll selector 1100 via the incoming trunk 1101. Also the incoming toll selectors 1253, etc., and the incoming toll selectors 1008, etc., have access to a toll switch train 1255 via incoming trunks 1254, etc.; while the toll switch train 1255 has access to the subscriber lines extending to the subscriber substation T2, etc., in the tandem exchange 20. For example, the toll switch train 1255 has access to the subscriber line 1256 extending to the subscriber substation T2 and provided with the individual line circuit 1257. In the tandem exchange 20 the incoming toll selectors 1253, etc., 1008, etc., the toll selectors 1100, etc., and the toll switch train 1255 comprises component elements of the toll switching apparatus.

Also, the tandem exchange 20 comprises a small group of finder links, including the finder link 1000, and an associated distributor 1103. The distributor 1103 is commonly associated with the finder links 1000, etc., and is provided with a start network commonly associated with the toll selectors 1100, etc. Also, the tandem exchange 20 comprises a small group of busy set-up circuits 1300, etc., each provided with individually associated senders 1500, etc., and individually associated registers 1501, etc. Each of the finder links 1000, etc., comprises three individual finder switches having respective access to the group of toll selectors 1100, etc., to the group of repeaters 700, etc., and to the group of busy set-up circuits 1300, etc. For example, the finder link 1000 comprises the first finder switch F1 having access to the outgoing trunk 1102 extending to the toll selector 1100, the second finder switch F2 having access to the outgoing trunk 906 extending to the repeater 700, and the third finder switch F3 having access to the trunk 1401 extending to the busy set-up circuit 1300.

*Sect. 2.—The apparatus incorporated in the telephone system*

In the central office 10 the toll board 303 may be of the manual dial type Western Electric Company No. 3, as previously noted; the line circuits 306, etc., may be of any suitable type; the toll selectors 203, etc., may be of the Strowger type; the incoming toll selectors 308, etc., may be of the Strowger type; and the toll switch train 304 may be of the Strowger type.

The toll dial circuits 200, etc., are identical; the toll dial circuit 200 comprising, as shown in Fig. 2, a relay group including a busy relay R210, a sleeve relay R220, a dial start relay R230, a ready relay R240, a switch-through relay R250, a prepare relay R260, a supervisory relay R270, a switch relay R280 and an end dial relay R290.

The toll trunk circuits 300, etc., are identical; the toll trunk circuit 300 comprising, as shown in Fig. 3, a relay group including two transfer relays R310 and R320, a control relay R325, a ring relay R330, a prepare relay R340, a re-ring relay R350, a sleeve relay R360, a re-ring relay R370 and a seize relay R380.

The repeaters 400, etc., are identical; and preferably these repeaters are substantially identical to the repeater disclosed in Figs. 4 to 6, inclusive, of U. S. Patent No. 2,517,516, granted on August 1, 1950, to John Wicks and Otho D. Grandstaff. Specifically, the repeater 400 comprises, as shown in Figs. 4 to 6, inclusive, a relay group including a series relay R410, a release relay R420, a line relay R430, two release pulse timer relays R435 and R440, a selector seize relay R450, an incoming release relay R460, a tandem test relay R470, a line supervisory relay R480, an answer supervisory relay R490, a re-ring relay R400, an answer supervisory relay R510, a supervisory control relay R520, a supervisory relay R530, a ring relay R535, three ring control relays R540, R550 and R560, a switch-over relay R570, a dial-in relay R580, a control relay R590, a loop test relay R500, a control relay R505, three wait relays X500, Y500 and Z500, a supervisory relay R610, a signal-in relay R620, an interpulse timer relay R630, a switch-through relay R640, a guard relay R650, a supervisory pulse relay R660, a prepare relay R670, a send relay R675, a sequence relay R680, a pad control relay R690 and a pad cut-out relay R600, as well as a toll pad 695. Specifically, the connection and arrangement of the relay group in the repeater 400 differ from that incorporated in the repeater disclosed in Figs. 4 to 6, inclusive, of the previously mentioned Wicks and Grandstaff patent in the inclusion of the three wait relays X500, Y500 and Z500 that are employed for a purpose more fully explained hereinafter.

The tone units 601, etc., are identical; and the tone unit 601 is connected and arranged in the manner of the tone unit disclosed in U. S. Patent No. 2,482,478, granted on September 20, 1949, to Otho D. Grandstaff. For example, the tone unit 601, indicated in Fig. 6, comprises both a sender and a receiver of unmodulated audio frequency signals and fixed frequency modulated audio frequency carrier signals. Specifically, the tone unit 601 is adapted to send and to receive unmodulated 1000 cycle audio frequency signals, as well as to send and to receive 60 cycle modulated 1000 cycle audio frequency carrier signals; which signals are utilized for the purpose of digit control, seizure control, supervisory control and release control, as explained more fully hereinafter. Also, the tone unit 601 comprises a relay group, not shown, including modulation cut-off relay, a receive switch relay, a pulse cut-in relay, an impulse-in relay and a signal-in relay; as well as a group of conductors extending to the associated repeater 400 and including a sending-conductor C601, a sending + conductor C602, a monitoring − conductor C603, a monitoring + conductor C604, a receiving − conductor C605, a receiving + conductor C606, a receiving switch conductor C607, a modulation cut-off conductor C608, a signal-in conductor C609, a dial-in conductor C610 and a pulse cut-in conductor C611. Finally, the tone unit 601 comprises a 60 cycle generator and a 1000 cycle generator, as well as a vacuum tube relay circuit, not shown.

In the tandem exchange 20 the line circuits 1257, etc., may be of any suitable type; the incoming toll selectors 1008, etc., may be of the Strowger type; the incoming toll selectors 1253, etc., may be of the Strowger type; the distributor 1103 may be of any suitable type, and the trunk circuits 1250, etc., may be of any suitable type.

The repeaters 700, etc., are identical; and preferably these repeaters are substantially identical to the repeaters disclosed in Figs. 4 to 6, inclusive, of the previously mentioned patent of John Wicks and Otho D. Grandstaff. Specifically, the repeater 700 comprises, as shown in Figs. 7 to 9, inclusive, a relay group including a series relay R910, a release relay R920, a line relay R930, two release pulse timer relays R935 and R940, a selector seize relay R950, an incoming release relay R960, a tandem test relay R970, a line supervisory relay R980, an answer supervisory relay R990, a re-ring relay R900, an answer supervisory relay R810, a supervisory control relay R820, a supervisory relay R830, a ring relay R835, three ring control relays R840, R850 and R860, a switch-over relay R870, a dial-in relay R880, a control relay R890, a loop test relay R800, a control relay R805, three wait relays X800, Y800 and Z800, a supervisory relay R710, a signal-in relay R720, an interpulse timer relay R730, a switch-through relay R740, a guard relay R750, a supervisory pulse relay R760, a prepare relay R770, a send relay R775, a sequence relay R780, a pad control relay R790 and a pad cut-out relay R700, as well as a toll pad 795. Specifically, the connection and arrangement of the relay group in the repeater 700 differ from that incorporated in the repeater disclosed in Figs. 4 to 6, inclusive, of the previously mentioned patent of Wicks and Grandstaff in the inclusion of the three wait relays X800, Y800 and Z800 that are employed for a purpose more fully explained hereinafter.

The tone units 701, etc., are identical; and the tone unit 701 is connected and arranged in the manner of the tone unit disclosed in the previously mentioned patent of Otho D. Grandstaff.

For example, the tone unit 701, indicated in Fig. 7, comprises both a sender and a receiver of unmodulated audio frequency signals and fixed frequency modulated audio frequency carrier signals. Specifically, the tone unit 701 is adapted to send and to receive unmodulated 1000 cycle audio frequency signals, as well as to send and to receive 60 cycle modulated 1000 cycle audio frequency carrier signals; which signals are utilized for the purpose of digit control, seizure control, supervisory control and release control, as explained more fully hereinafter. Also, the tone unit 701 comprises a relay group, not shown, including a modulation cut-off relay, a receive switch relay, a pulse cut-in relay, an impulse-in relay and a signal-in relay; as well as a group of conductors extending to the associated repeater 700 and including a sending — conductor C701, a sending + conductor C702, a monitoring — conductor C703, a monitoring + conductor C704, a receiving — conductor C705, a receiving + conductor C706, a receiving switch conductor C707, a modulation cut-off conductor C708, a signal-in conductor C709, a dial-in conductor C710 and a pulse cut-in conductor C711. Finally, the tone unit 701 comprises a 60 cycle generator and a 1000 cycle generator, as well as a vacuum tube relay circuit, not shown.

The finder links 1000, etc., are identical; and the finder link 1000 comprises, as shown in Fig. 10, the three individual finder switches F1, F2 and F3, as previously noted. The finder switch F1 is of the rotary type including eight individual wipers provided with contact banks terminating the individual conductors in the trunks 1102, etc., extending to the toll selectors 1100, etc., as well as a rotary magnet 1M for driving the wipers noted step by step in the clockwise direction. The finder switch F2 is of the rotary type including four individual wipers provided with contact banks terminating the individual conductors in the trunks 906, etc., extending to the repeaters 700, etc., as well as a rotary magnet 2M for driving the wipers noted step by step in the clockwise direction. The finder switch F3 is of the rotary type including eight individual wipers provided with contact banks terminating the individual conductors in the trunks 1401, etc., extending to the busy set-up circuits 1300, etc., as well as a rotary magnet 3M for driving the wipers noted step by step in the clockwise direction. Also, the finder link 1000 comprises a relay group including a switch relay R1010, a start relay R1020, a stop send relay R1025, an end dial relay 1030, two control relays R1035 and R1040, two count relays R1045 and R1050, a ring relay R1055, a release relay R1060, a switch relay R1070, a re-ring relay R1080, a test relay R1090 and a switch relay R1000.

The toll selectors 1100, etc., are identical; and the toll selector 1100 comprises, as shown in Fig. 11, a Strowger mechanism 1180 including a wiper carriage carrying four wipers, a vertical magnet M1181 for driving the wiper carriage step by step in the vertical direction away from its normal vertical position, a rotary magnet M1183 for driving the wiper carriage step by step in the rotary direction away from its normal rotary position, and a release magnet M1185 for releasing the wiper carriage and for causing it to be returned to its normal rotary and vertical positions.

The Strowger mechanism 1180 also comprises a contact bank associated with the wiper set and terminating the trunks extending to the various destinations including the trunks extending to the call waiting circuit 1200. Further, the Strowger mechanism 1180 comprises a vertical control wiper VW carried by the wiper carriage and associated with a vertical control contact bank that is employed for a control purpose more fully explained hereinafter. Associated with the Strowger mechanism 1180 are two sets of switch springs S1186 and S1187 that are operated when the wiper carriage is moved in the vertical direction one step away from its normal vertical position, a set of switch springs S1189 that is operated when the wiper carriage is moved in the vertical direction a predetermined number of steps corresponding to a given level of a number of adjacent levels in the associated contact bank terminating trunks extending to a destination, not shown, as well as a set of switch springs S1188 that is operated when the wiper carriage is moved in the rotary direction eleven steps away from its normal rotary position.

Further, the toll selector 1100 comprises a relay group, including a test relay R1110, a distributor start relay R1120, a wait relay R1125, a switch relay R1130, a line relay R1140, two hold relays R1145 and R1150, a busy relay R1155, a pulse delay relay R1160, a control relay R1165, a step relay R1170 and a change-over relay R1175.

The call storage circuit 1200 comprises, as shown in Fig. 12, first, second and third trunks 1201, 1202 and 1203 respectively extending to the three trunk circuit 1250, etc., respectively terminating the three trunk lines 1251, etc., extending between the tandem exchange 20 and the remote office 30. Also, the call storage circuit comprises first, second and third call storage trunks 1204, 1205 and 1206, as well as four other terminals indicated generally at 1207. The three trunks 1201, 1202 and 1203, the three call storage trunks 1204, 1205 and 1206, and the four other terminals 1207 are terminated in a predetermined level of the contact banks of the Strowger mechanisms 1180, etc., incorporated in the toll selector 1100, etc. Specifically, as the wiper carriage of any one of the Strowger mechanisms 1180, etc., is operated step by step in the rotary direction in the predetermined level thereof the wiper set sequentially tests the third call storage trunk 1206, then the second call storage trunk 1205, then the first call storage trunk 1204, then the three trunks 1201, 1202 and 1203 in the order named. Ultimately, in the event the three trunks 1201, 1202 and 1203 are busy, and the three call storage trunks 1204, 1205 and 1206 are also busy, the wiper set noted then runs across the four terminals 1207 and off of the associated contact bank into its eleventh rotary position. Further, the call storage circuit 1200 comprises three busy relays R1210, R1215 and R1220 respectively connected to the control conductors of the respective trunks 1201, 1202 and 1203, as well as three busy relays R1230, R1235 and R1240 adapted to be respectively connected to the + conductors of the respective call storage trunks 1204, 1205 and 1206.

The busy set-up circuits 1300, etc., are identical; the busy set-up circuit 1300 comprising, as shown in Figs. 13 and 14, a relay group including six marking relays R1310, R1315, R1320, R1325, R1330 and R1335, three cycle relays R1340, R1350 and R1360, a hold relay R1370, a cut-off relay R1410, a hold relay R1420, a send start relay R1430, a dial slave relay R1440, a slave relay R1445, a dial relay R1450, a pulse relay R1455, a release relay R1460, a series relay R1470, and a test relay R1480.

The senders 1500, etc., are identical; and the sender 1500 comprises, as shown in Figs. 15 and 16, ten counting relays R1510, R1520, R1530, R1540, R1550, R1560, R1570, R1580, R1590 and R1500, an in-pulse pulse 1610, a digit stop relay 1620, a control relay 1630, a space stop relay R1640, and three cycle relays R1660, R1670 and R1680.

The groups of registers 1501, etc., are identical; and preferably, each of these groups of registers is connected and arranged in the manner of the group of registers disclosed in Figs. 18 and 19 in U. S. Patent No. 2,167,710, granted on August 1, 1939, to Thomas F. Crocker.

In the remote office 30 the toll board 1270 may be of the manual dial type Western Electric Company No. 3 as previously noted; and the ringdown trunk circuits 1260, etc., may be of any suitable type.

A better understanding of the connection and arrangement of the apparatus incorporated in the telephone system will be facilitated from a consideration of the extension of calls involving various ones of the central office 10, the tandem exchange 20 and the remote office 30.

*Sect. 3.—Local and C. L. R. calls in the central office, in the tandem exchange and in the remote office*

Local calls in the central office 10 are completed directly via the local automatic switch train under the control of the subscriber substations involved, in a conventional manner; and, likewise, C. L. R. calls are extended from the calling subscriber substations via the local automatic switch train to the toll board 303 to be answered and extended via the toll switch train, as explained more fully hereinafter.

Local calls in the tandem exchange 20 are completed directly via the local automatic switch train under the control of the subscriber substations involved, in a conventional manner; and, likewise, C. L. R. calls are extended from the calling subscriber substations via the local automatic switch train to a toll board, not shown, to be answered and extended via the toll switch train in a manner not disclosed.

Local calls in the remote office 30 may be completed directly via a local switch train, not shown, under the control of the subscriber substations involved, in a conventional manner in the event this office is of the automatic type, or may be completed with the aid of operators at an A-B switchboard, not shown, in the event this office is of the manual type. Likewise, C. L. R. calls may be extended from the calling subscriber substations via the local automatic switch train to the toll board 1270 to be answered and extended in the event this office is of the automatic type, or may be extended with the aid of operators at the A-B switchboard to the toll board 1270 in the event this office is of the manual type.

The details of the arrangements for extending local and C. L. R. calls in the central office 10, in the tandem exchange 20 and in the remote office 30, form no part of the present invention, and in the interest of brevity have been omitted.

*Sect. 4.—A call from the toll board in the central office to a subscriber substation in the tandem exchange*

Assuming that a call has been answered at the first operator position circuit at the toll board 303 in the central office 10 that requires extension to a subscriber substation, such, for example, as the subscriber substation T2 in the tandem exchange 20, the operator at the first position mentioned selects an idle one of the trunks extending to a toll dial circuit, such, for example, as the trunk 201 extending to the toll dial circuit 200, and then connects the answering cord circuit thereto. When the cord circuit mentioned is thus connected to the outgoing trunk 201 battery is extended via the supervisory lamp in the cord circuit at the first operator position at the toll board 303 over the sleeve conductor S of the outgoing trunk 201 completing a circuit for energizing the upper winding of the sleeve relay R220 in the toll dial circuit 200, whereby the latter relay operates. Upon operating, the sleeve relay R220 completes, at the contacts 221, a path for applying ground potential by way of the winding of the dial start relay R230 to the tip conductor T of the outgoing trunk 201. When the operator at the first position at the toll board 301 then operates the talk key in her cord circuit, the tip and ring conductors T and R of the outgoing trunk 201 are extended to her position circuit. The operator then operates her dial front key in the cord circuit, whereby battery potential is applied to the tip conductor T of the outgoing trunk 201 in order to effect operation of the dial start relay R230. Upon operating, the dial start relay R230 completes, at the contacts R233, a circuit for energizing the lower winding of the prepare relay R260, in order to cause the latter relay to operate and complete, at the contacts 264, a holding circuit for energizing the upper winding thereof. Also, upon operating, the prepare relay R260 completes, at the contacts 261, a temporary short-circuit between the — and + conductor of the trunk 202; and completes, at the contacts 265, a path for applying ground potential to the control conductor C of the trunk 202, whereby, the toll selector 203 is seized. When the toll selector 203 is thus seized, ground potential is returned over the busy conductor B of the trunk 202 effecting energization of the lower winding of the busy relay R210, whereby the latter relay operates to complete, at the contacts 212, a path for returning battery potential over the conductor SS of the outgoing trunk 201 indicating to the operator at the first position at the toll board 303 that the toll selector 203 has been seized. Also, upon operating, the dial start relay R230 completes, at the contacts 234, a circuit for operating the switch relay R280, whereby the latter relay, upon operating, completes, at the contacts 284, a holding circuit for energizing the winding thereof.

Also, when the toll selector 203 has thus been seized and is in readiness to receive the first digit, battery potential is momentarily connected to the EC conductor of the trunk 202, energizing and then de-energizing the winding of the ready relay R240 in order to cause the latter relay to operate and then to restore. Upon operating, the relay R240 completes, at the contacts 241, a circuit for energizing the upper winding of the switch-through relay R250, whereby the latter relay operates through its first step, it being of the two-step type, completing, at the contacts 251′, a path for short-circuiting the lower winding thereof. When the ready relay R240 then restores, as noted above, it interrupts, at the contacts 241, the path for short-circuiting the lower winding of the switch-through relay, whereby the upper and lower windings of the switch-through relay R250 are energized in series circuit relation causing the latter relay to operate through its second step. When the switch-through relay R250 operates through its second step, it interrupts, at the contacts 253, the previously mentioned circuit for energizing the winding of the dial start relay R230 in order to cause the latter relay to restore shortly thereafter, it being of the slow-to-release type. Upon restoring, the dial start relay R230 interrupts, at the contacts 232, the holding circuit for energizing the upper winding of the prepare relay R260 in order to cause the latter relay to restore shortly thereafter, it being of the slow-to-release type. Upon restoring, the prepare relay R260 interrupts, at the contacts 261, the initial path for short-circuiting the — and + conductors of the trunk 202; and completes, at the contacts 262, a direct connection, including the contacts 251 and 254, between the — and + conductors of the trunk 202 and the ring and tip conductors R and T of the trunk 201, whereby the dial in the position circuit at the first operator position at the toll board 303 is connected directly across the — and + conductors of the trunk 202 extending to the toll selector 203. Also, upon operating, the switch-through relay R250 completes, at the contacts 257, a circuit for energizing in series the lower and upper windings in the supervisory relay R270; however, the latter relay does not operate at this time as it is of the marginal differential type. Accordingly, at this time, a connection has been extended from the first operator position at the toll board 303 via the outgoing trunk 201, the toll dial circuit 200, and the trunk 202, to the toll selector 203, and the toll selector 203 is in readiness to receive the first digit dialled at the first operator position at the toll board 303.

The operator at the first position at the toll board 303 then proceeds to dial the first digit in order to effect the extension of the connection from the central office 10 to the tandem exchange 20, the line relay in the toll selector 203 following the impulses of the first digit mentioned in a conventional manner. The toll selector 203 first operates to select the group of trunks, including the trunk 406, and then to select an idle trunk in this group. Assuming that the trunk 406 is the first idle trunk in the group noted, the toll selector 203 selects this trunk extending to the repeater 400, the trunk 406 being marked as idle by the application of battery potential upon the control conductor C thereof. The path mentioned extends from battery potential by way of the upper winding of the release relay R420 in the repeater 400, the contacts 425, 633, 681, 461, and 453 to the control conductor C of the trunk 406. When the toll selector 203 seizes the trunk 406, ground potential therein is applied to the control conductor C of the trunk 406, thereby to complete a substantially identical circuit for energizing the upper winding of the release relay R420 in order to cause the latter relay to operate shortly thereafter. Upon operating, the release relay R420 interrupts, at the contacts 425, a path for short-circuiting the lower winding thereof, whereby the upper and lower windings of the release relay R420 are energized in series circuit relation via the control conductor C of the trunk 406. Also, the release relay R420 completes, at the contacts 422, a loop circuit between the upper and lower windings of the line relay R430 and the + and — conductors of the trunk 406; which loop circuit now extends back to the dial in the position circuit at the first operator position at the toll board 303 since the toll selector 203 switched through incident to seizure of the trunk 406, whereby the line relay R430 operates over the loop circuit mentioned. Further, the release relay R420 completes, at the contacts 426, a circuit for operating the release pulse timer relay R435. Upon operating, the release pulse timer relay R435 sets its armature RA436 into vibration and closes the contacts 437, whereby the winding of the release pulse timer relay R440 is energized intermittently by the vibratory action of the armature RA436, causing the release pulse timer relay R440 to operate shortly thereafter, the latter relay being of the slow-to-operate type. At this point it is noted that the incoming release relay R460 normally occupies its operated position, the operating circuit therefor being normally completed.

Upon operating, the release pulse timer relay R440 completes, at the contacts 442, a holding circuit for energizing the winding thereof; and completes, at the contacts 441 and 445, a circuit for operating the supervisory pulse relay R660. Also, the release pulse timer relay R440 completes, at the contacts 441, a multiple circuit for operating the pad cut-out relay R600. Upon operating, the pad cut-out relay R600 interrupts, at the contacts 602′, a termination circuit, including the windings 606, 608, and 697 of the pad 695 and the condenser 696, between the line conductors of the toll line 702; and completes, at the contacts 601′ and 603′ direct paths for short-circuiting the windings 605, 696 and 607, 608 respectively of the pad 695. Finally, the release pulse timer relay R440 completes, at the contacts 441, a multiple circuit for illuminating the busy lamp L687 in order to indicate that the repeater 400 is busy at this time.

Upon operating the supervisory pulse relay R660 completes, at the contacts 663, a circuit for operating the send relay R675; and completes, at the contacts 664, a circuit for energizing the upper winding of the prepare relay R670 in order to cause the latter relay to operate. Also, the supervisory pulse relay R660 completes, at the contacts 664, a multiple circuit for operating the series relay R410. Upon operating, the prepare relay R670 interrupts, at the contacts 673, the application of ground potential upon the receiving switch conductor C607 extending to the tone unit 601, thereby to bring about the restoration of the receiving switch relay in the tone unit 601, whereupon the tone unit 601 is placed in sending condition. Also, the prepare relay R670 completes, at the contacts 674, a circuit for energizing the lower winding of the sequence relay R680 in order to cause the latter relay to operate; and completes, at the contacts 674, a multiple circuit for operating the control relay R505. Upon operating, the send relay R675 completes, at the contacts 678, a path for applying ground potential to the modulation cut-off conductor C608 extending to the tone unit 601, thereby to insure that the modulation cut-off relay in the tone unit 601 is maintained in its restored position, whereby the tone unit 601 is rendered operative to send 60 cycle modulated 1000 cycle current over the sending — conductor C601 and the sending + conductor C602 extending therefrom. Also, the send relay R675 interrupts, at the contacts 677, a normally completed path between the sending — conductor C601 and the sending + conductor C602; and completes, at the contacts 676, a path, including the resistor 693, the condenser 692, and the contacts 691′ and 693′, between the sending — conductor C601 and the sending + conductor C602 and the line conductors of the toll line 702, whereby 60 cycle modulated 1000 cycle current is transmitted from the tone unit 601 individually associated with the repeater 400 over the line conductors of the toll line 702 extending from the central office 10 to the tandem exchange 20. This 60 cycle modulated 1000 cycle current transmitted over the line conductors of the toll line 702 is repeated by the voice current repeaters 703, etc., to the repeater 700 in the tandem exchange, 20, in order to effect seizure of the repeater 700, in a manner more fully explained hereinafter. Also, upon operating, the sequence relay R680 completes, at the contacts 683, a holding circuit for energizing the upper winding thereof; and completes, at the contacts 686, a holding circuit for energizing the lower winding of the prepare relay R670. Also, the supervisory pulse relay R660 completes, at the contacts 662, a holding circuit for energizing the winding thereof.

Upon operating, the control relay R505 completes, at the contacts 508, a circuit for energizing the winding of the inter-pulse timer relay R630, to cause the latter relay to operate shortly thereafter, it being of the slow-to-operate type. Further, the control relay R505 completes, at the contacts 506, a path for connecting battery potential by way of the upper winding of the tandem test relay R470 to the EC conductor of the trunk 406, thereby to permit the tandem test relay R470 to operate in the special event that the preceding circuit connection includes a repeater of the general character of the repeater 400; which circumstance is not encountered in the extension of the present connection, whereby the tandem test relay R470 is not operated. Upon operating, the inter-pulse timer relay R630 interrupts at the contacts 634 the holding circuit for maintaining operated the supervisory pulse relay R660, whereby the latter relay restores shortly thereafter, it being of the slow-to-release type. Also, the inter-pulse timer relay R630 completes, at the contacts 635, a circuit for energizing in series the upper and lower windings of the answer supervisory relay R490; whereby the latter relay operates, it being of the differential type, as explained more fully hereinafter. Upon operating, the answer supervisory relay R490 completes, at the contacts 495, a holding circuit for energizing in series the upper and lower windings thereof; and interrupts, at the contacts 496, the normally completed path for applying battery potential by way of the resistor 403 to the associated terminal of the lower winding thereof; and interrupts, at the contacts 491, the previously mentioned path for connecting the upper winding of the tandem test relay R480 to the E. C. conductor of the trunk 406. Further the answer supervisory relay R490 completes, at the contacts 492, a path for applying ground potential by way of the upper winding of the line supervisory relay R480 to the E. C. conductor of the trunk 406, which is without effect at this time since the above described operation takes place following the transmission of the first digit from the first operator position at the toll board 303 and preceding the transmission of the remainder of the digits to effect operation of the switching apparatus in the tandem exchange 20.

Specifically, it will be observed that the supervisory relay R270 in the toll dial circuit 200 is of the marginal differential type, whereby the connection of battery potentail via the upper winding of the tandem test relay R470 to the E. C. conductor of the trunk 406 and the subsequent connection of ground potential via the upper winding of the line supervisory relay R480 to the E. C. conductor of the trunk 406, in the operation of the repeater 400 described above, do not bring about sufficient upsetting of the supervisory relay R270 to cause operation thereof at this time.

When the supervisory pulse relay R660 restores, it interrupts, at the contacts 664, the circuit for maintaining operated the series relay R410, thereby to cause the latter relay to restore shortly thereafter, it being of the slow-to-release type. Also, the supervisory relay R660 interrupts, at the contacts 661, the circuit for maintaining operated the control relay R505; and interrupts, at the contacts 663, the circuit for maintaining operated the send relay R675. Further, the supervisory pulse relay R660 interrupts, at the contacts 664, the multiple circuit for energizing the upper winding of the prepare relay R670. Upon restoring, the send relay R675 interrupts, at the contacts 676, the connection between the line conductors of the toll line 702 and the sending — conductor C601 and the sending + conductor C602 extending to the tone unit 601; and completes, at the contacts 677, the normal connection between the sending — conductor C601 and the sending + conductor C602, thereby to terminate the transmission over the toll line 702 from the tone unit 601 of the seizing pulse of 60 cycle modulated 1000 cycle current. Further, the send relay R675 interrupts, at the contacts 678, the path for applying ground potential to the modulation cut-off conductor C608; whereby, there is completed a path, including the contacts 489, the resistor 463 and the contacts 424 and 682, for applying battery potential to the modulation cut-off conductor C608. This application of battery potential to the modulation cut-off conductor C608 extending to the tone unit 601 effects operation of the modulation cut-off relay therein, whereby the tone unit 601 is conditioned at this time to transmit 1000 cycle current therefrom upon the next seizure thereof. Upon restoring, the control relay R505 interrupts, at the contacts 508, the circuit for maintaining operated the interpulse timer relay R630. When the series relay R410 restores, it interrupts, at the contacts 412, the circuit for energizing the lower winding of the prepare relay R670 in order to cause the latter relay to restore. Upon restoring, the prepare relay R670 recompletes, at the contacts 673, the path for applying ground potential to the receiving switch conductor C607 extending to the tone unit 601, thereby to effect operation of the receiving switch relay therein, whereby the tone unit 601 is placed in receiving condition. Upon restoring, the interpulse timer relay R630 reprepares, at the contacts 634, a point in the circuit for operating the supervisory pulse relay R660 for a purpose more fully explained hereinafter.

Recapitulating, at this time the toll selector 203 has operated to select the trunk 406 extending to the repeater 400, whereby the repeater 400 is operated in conjunction with the tone unit 601 to transmit a short splash of 60 cycle modulated 1000 cycle current, constituting a seizure signal, over the toll line 702; thereby to condition the repeater 700 in the tandem exchange 20 to be responsive to digits dialed at the first operator position at the toll board 303 and repeated by the repeater 400 over the toll line 702.

Specifically, the seizure signal transmitted over the toll line 702 is conducted over the windings 706, 705 and 708, 707 of the pad 795 and the receiving — conductor C705 and the receiving + conductor C706 to the tone unit 701 associated with the repeater 700 in order to cause operation of the signal-in relay in the tone unit 701, whereby ground potential is applied for a short time duration to the signal-in conductor C709 extending therefrom. This application of ground potential to the signal-in conductor C709 completes a circuit for energizing the winding of the signal-in relay R720 in the repeater 700, whereby the latter relay operates shortly thereafter, it being of the slow-to-operate type. Upon operating, the signal-in relay R720 interrupts, at the contacts 725 the normally completed circuit for maintaining operated the incoming release relay R960; however, the latter relay does not immediately restore as it is of the slow-to-release type. Also, the signal-in relay R720 completes, at the contacts 722, a circuit for illuminating the busy lamp L797 in order to indicate the busy condition of the repeater 700 at this time; and completes, at the contacts 722, a multiple circuit for operating the pad cut-out relay R700. Upon operating, the pad cut-out relay R700 interrupts, at the contacts 702′ a normally completed termination circuit, including the winding 706, 708 and 797 of the pad 795, and the condenser 796, across the line conductors of the toll line 702; and completes, at the contacts 701′ and 703′, paths for respectively short-circuiting the windings 706, 705 and 708, 707 of the pad 795. Also, the signal-in relay R720 completes, at the contacts 722 and 723, multiple circuits for energizing the winding of the interpulse timer relay R730 and for operating the series relay R910, whereby the interpulse timer relay R730 operates shortly thereafter, it being of the slow-to-operate type. Further, the signal-in relay R720 completes, at the contacts 726, a circuit for energizing the lower winding of the selector seize relay R950. When the lower winding of the selector seize relay R950 is thus energized, it operates through its first step to complete, at the contacts 956, a path for short-circuiting the upper winding thereof in order to prevent operation of the selector seize relay R950 through its second step at this time, the selector seize relay R950 being of the two-step type.

At the conclusion of the seizure signal the tone unit 701 brings about the removal of ground potential from the signal-in conductor C709 and the consequent restoration of the signal-in relay R720 in the repeater 700. Upon restoring, the signal-in relay R720 recompletes, at the contacts 725, the circuit for maintaining operated the incoming release relay R960 in order positively to prevent restoration of the latter relay. Also, the signal-in relay R720 interrupts, at the contacts 726, the previously mentioned path for short-circuiting the upper winding of the selector seize relay R950; whereby, there is completed a circuit, including the contacts 956 and 962 and 943, for energizing in series the upper and lower windings thereof, causing the selector seizure relay R950 to operate through its second step. When the selector seize relay R950 operates through its second step it interrupts, at the contacts 953, the previously completed path for applying battery potential by way of the upper winding of the release relay R920 to the C conductor of the trunk 906; and completes, at the contacts 952, a path for applying ground potential to the C conductor of the trunk 906, thereby to mark the trunk 906 and, consequently, the repeater 700 as busy to the incoming toll selectors 1253, etc., having access thereto. Further, the selector seize relay R950 completes, at the contacts 955, an alternative circuit for maintaining operated the pad cutout relay R700; and completes, at the contacts 951, a path for applying ground potential to the C conductor of the trunk 905 extending to the incoming toll selector 1008; and completes, at the contacts 959, a circuit for energizing the lower winding of the loop test relay R800 in order to cause the latter relay to operate shortly thereafter, it being of the slow-to-operate type. Upon operating, the loop test relay R800 completes, at the contacts 801, a circuit for operating the control relay R890. Also, upon restoring the signal-in relay R720 interrupts, at the contacts 723, the previously traced circuit for maintaining operated the interpulse timer relay R730 and the series relay R910; whereby, the interpulse timer relay R730 restores substantially immediately and the series relay R910 restores shortly thereafter, the series relay R910 being of the slow-to-release type.

Upon operating the control relay R890 completes, at the contacts 891, a loop circuit between the upper winding of the loop test relay R800 and the — and + conductors of the trunk 905 extending to the incoming toll selector 1008; whereby, the upper winding of the loop test relay R800 is energized over this circuit effecting seizure of the incoming toll selector 1008. Also, the control relay R890 completes, at the contacts 897, a path between the false seize conductor C817 and the junction between the upper and lower windings of the answer supervisory relay R990; over which path the upper and lower windings of the answer supervisory relay R990 are not immediately energized; and which circuit is completed in case of false seizure of the repeater 700. Further, the control relay R890 completes, at the contacts 898, a path for applying ground potential to the pulse cut-in conductor C711 extending to the tone unit 701 in order to effect operation of the pulse cut-in relay in the tone unit 701; whereby the tone unit 701 is conditioned to respond to the unmodulated 1000 cycle dialing pulses subsequently transmitted over the toll line 702 and constituting a dialing signal. Further, the control relay R890 completes, at the contacts 893, a path for applying ground potential by way of the lower winding of the tandem test relay R970 to the EC conductor of the trunk 905 extending to the incoming toll selector 1008, thereby to permit operation of the tandem test relay R970 in the special event that a toll connection is ultimately completed involving other toll lines embodying repeaters of the general character of the repeaters 400 and 700; which circumstance is not encountered in the extension of the present connection. Further, the control relay R890 completes, at the contacts 893, a multiple path for applying ground potential via the winding of the wait relay Y800 to the EC conductor of the trunk 905 extending to the incoming toll selector 1008; thereby to permit operation of the wait relay Y800 in the special event that a delay is encountered in the extension of a connection from the tandem exchange 20 to the remote office 30; which situation is not encountered in the extension of the present connection.

Continuing now with the extension of the present connection, the operator at the first position circuit at the toll board 303 proceeds to dial the second digit, whereby the line relay R430 in the repeater 400 follows. Each time the line relay R430 restores and then reoperates, it completes and then interrupts, at the contacts 432, a circuit for energizing the winding of the series relay R410, thereby to cause the latter relay to operate and to remain operated during impulsing, since it is of the slow-to-release type. Also, each time the line relay R430 restores and then reoperates, it completes and then interrupts, at the contacts 431, a circuit for energizing the winding of the send relay R675, thereby to cause the latter relay to follow. Upon operating, the series relay R410 recompletes, at the contacts 412, the previously mentioned circuit for energizing the lower winding of the prepare relay R670 in order to cause the latter relay to operate. Since the series relay R410 is maintained operated throughout the impulses of the present digit, and the prepare relay R670 is operated by the series relay R410, as explained above, it will be understood that the prepare relay R670, is also maintained operated throughout the impulses of the present digit. Upon reoperating, the prepare relay R670 again interrupts, at the contacts 673, the path for applying ground potential to the receiving switch conductor C607 extending to the tone unit 601, whereby the tone unit 601 is conditioned to send unmodulated 1000 cycle current, since battery potential at this time appears upon the modulation cut-off conductor C608 extending thereto, as previously noted. Each time the send relay R675 operates and then restores, it completes, and then interrupts, at the contacts 676 the previously traced connection between the sending — conductor C601 and the sending + conductor C602 and the line conductors of the toll line 702; and interrupts, and then recompletes, at the contacts 677, the previously mentioned connection between the sending — conductor C601 and the sending + conductor C602. Each time the send relay R675 operates and then restores, it completes, and then interrupts, at the contacts 678, the previously mentioned path for applying ground potential to the modulation cut-off conductor C608 extending to the tone unit 601, whereby the winding of the modulation cut-off relay in the tone unit 601 is short-circuited intermittently. However, the modulation cut-off relay in the tone unit 601 does not restore during this intermittent short-circuiting of the winding thereof, but is maintained steadily operated causing the unmodulated 1000 cycle current to be projected over the sending — conductor C601 and the sending + conductor C602 extending therefrom, and consequently pulses of this unmodulated 1000 cycle current to be transmitted over the line conductors of the toll line 702 corresponding to the intermittent operation of the send relay R675. Accordingly, at this time, a plurality of impulses of unmodulated 1000 cycle current corresponding to the impulses of the present digit are transmitted over the line conductors of the toll line 702 to the repeater 700 and the associated tone unit 701.

At the conclusion of the present digit the line relay R430 is maintained in its operated position, effecting immediate restoration of the send relay R675, and the restoration of the series relay R410 shortly thereafter, and the consequent restoration of the prepare relay R670. When the next, or third digit, is then dialed at the first operator position circuit at the toll board 303, the line relay R430 in the repeater 400 again follows; whereby, the series relay R410 and the prepare relay R670 operate and remain operated during impulsing; while the send relay R675 again follows; all in the manner explained above. Thus the send relay R675 transmits a number of impulses of unmodulated 1000 cycle current corresponding to the impulses of the third digit mentioned over the line conductors of the toll line 702 from the tone unit 601, in a manner identical to that explained above. In view of the foregoing it will be appreciated that all of the remainder of the digits are dialed at the first operator position circuit at the toll board 303 and are repeated by the repeater 400 over the toll line 702 to the repeater 700.

When the second digit is dialed at the first operator position at the toll board 303 and repeated by the repeater 400 to the repeater 700 in the form of a series of unmodulated 1000 cycle pulses of current, the tone unit 701 associated with the repeater 700 responds thereto. Specifically, the in-pulse relay in the tone unit 701 operates and restores repeating a corresponding series of ground impulses from the tone unit 701 over the dial-in conductor C710 extending therefrom. The series of ground impulses thus transmitted over the dial-in conductor C710 completes intermittently a circuit for operating the dial-in relay R880 in the repeater 700 in order to cause the latter relay to follow. Each time the dial-in relay R880 operates and then restores, it completes, and then interrupts, at the contacts 882, a circuit for operating the wait relay Z800, whereby the latter relay follows. Each time the wait relay Z800 operates and then restores, it completes and then interrupts, at the contacts Z4, a circuit for operating the ring control relay R860; thereby to cause the latter relay to operate and remain operated during impulsing since it is of the slow-to-release type. Also, each time the dial-in relay R880 operates and then restores, it completes, and then interrupts, at the contacts 883, a circuit for energizing the winding of the series relay R910; thereby to cause the latter relay to operate and remain operated during impulsing since it is of the slow-to-release type. Also, each time the dial-in relay R880 operates and then restores, it completes, and then interrupts, at the contacts 883, a substantially identical multiple circuit for energizing the winding of the interpulse timer R730, thereby to cause the latter relay to operate and restore intermittently the interpulse timer relay R730 operating shortly following energization of the winding thereof since it is of the slow-to-operate type. When the series relay R910 operates, it completes, at the contacts 911, a holding circuit for energizing the lower winding of the loop test relay R800; thereby to prevent the latter relay from restoring incident to the interruption of the previously traced loop circuit including the upper winding thereof and extending via the trunk 905 to the incoming toll selector 1008. Upon operating, the ring control relay R860 completes, at the contacts 861, a holding circuit for energizing the winding thereof; and completes, at the contacts 862, a circuit for operating the ring control relay R850. Also, the ring control relay R860 interrupts at the contacts 864, the previously mentioned connection between the false seize conductor C817 and the junction between the upper and lower windings of the answer supervisory relay R990; thereby to prevent operation of the latter relay over the false seize conductor C817 since the repeater 700 has not been falsely seized as evidenced by the prompt reception by the associated tone unit 701 of the dialing signal constituting the second digit.

Also, each time the dial-in relay R880 operates and then restores, it interrupts, and then recompletes, at the contacts 881, the previously traced loop circuit between the upper winding of the loop test relay R800 and the incoming toll selector 1008; whereby, the impulses of the present digit are repeated at the contacts 881 over the trunk 905 to the incoming toll selector 1008. The incoming toll selector 1008 responds to the second digit in order to select the group of trunks including the trunk 1254, and then an idle trunk is this group. For example, the incoming toll selector 1008 may select the trunk 1254 extending to the toll switch train 1255; whereby, the incoming toll selector 1008 switches through so that the remainder of the digits received by the repeater 700 may be transmitted to the toll switch train 1255. At the conclusion, of the second digit the dial-in relay R880 remains restored interrupting, at the contacts 883, the previously traced multiple circuits for operating the interpulse timer relay R730 and for maintaining operated the series relay R910; whereby the interpulse timer relay R730 restores substantially immediately and the series relay R910 restores shortly thereafter, it being of the slow-to-release type. Upon restoring, the series relay R910 interrupts, at the contacts 911, the holding circuit for energizing the lower winding of the loop test relay R800; however, the latter relay is retained in its operated position at this time by virtue of the completion of the loop circuit including the upper winding thereof and extending by way of the trunk 905, the incoming toll selector 1008 and the trunk 1254 to the toll switch train 1255.

In a similar manner the tone unit 701 responds to the dialing signals corresponding to the third and remaining digits; whereby the digits mentioned are transmitted by the dial-in relay R880 in the repeater 700 over the trunk 905, the incoming toll selector 1008 and the trunk 1254 to the toll switch train 1255; whereby the toll switch train 1255 responds to the digits mentioned and operates in a conventional manner to select the subscriber line 1256 extending to the called subscriber substation T2.

After the operator at the first position circuit at the toll board 303 in the central office 10 has dialed all of the digits for the purpose of effecting the extension of the present connection to the called subscriber substation T2 in the tandem exchange 20 in the manner described above, she momentarily operates her end-of-dial key causing ground potential to be applied momentarily to the end dialing conductor ED in the trunk 201 thereby effecting operation of the end dial relay R290 in the toll dial circuit 200. Upon operating the end dial relay R290 completes, at the contacts 291, a holding circuit for energizing the winding thereof; and completes, at the contacts 292, a path, for short-circuiting the resistor 267, whereby the upper winding of the line supervisory relay R480 in the repeater 400 is effectively energized, the latter relay being of the combination marginal and differential type. Specifically, at this time, ground potential is applied by way of the contacts 441 to one terminal of the upper winding of the line supervisory relay R480; and the other terminal of the upper winding of the latter relay is connected by way of the contacts 488, 492, Z1 and 485 to the EC conductor of the trunk 406; which path may be traced back through the toll selector 203 to the EC conductor of the trunk 202 and then by way of the contacts 256 and 292 to the junction between the upper and lower windings of the supervisory relay R270 in the toll dial circuit 200. The supervisory relay R270 is also of the combination marginal and differential type; whereby the latter relay does not operate at this time due to the impedance of the upper winding of the line supervisory relay R480. Upon operating, the line supervisory relay R480 completes, at the contacts 487, a holding circuit for energizing in series the upper and lower windings thereof; and interrupts, at the contacts 485 and 488, points in the original circuit for energizing the upper winding thereof. Also, the line supervisory relay R480 interrupts, at the contacts 489, the path for applying battery potential by way of the resistor 463 to the modulation cut-off conductor C608 extending to the tone unit 601. When battery potential is thus removed from the modulation cut-off conductor C608 the modulation cut-off relay in the tone unit 601 restores, whereby the tone unit 601 is prepared to send 60 cycle modulation 1000 cycle current the next time it is employed for sending purposes. Also, the line supervisory relay R480 prepares, at the contacts 486, a path traced hereinafter, and governed by the contacts 531 of the supervisory relay R530, for applying direct ground potential to the EC conductor of the trunk 406 thereby to control the operation of the supervisory relay R270 in the toll dial circuit 200 as explained more fully hereinafter. Further, the line supervisory relay R480 interrupts, at the contacts 481 and 483, the loop circuit extending via the + and − conductors of the trunk 406 to the windings of the line relay R430 in order to cause the latter relay to restore. Further, the line supervisory relay R480 completes, at the contacts 482 and 484, a connection between the − and + conductors of the trunk 406 and the monitoring − conductor C603 and the monitoring + conductor C604 extending to the tone unit 601. Finally, the receiving − conductor C605 and the receiving + conductor C606 are operatively connected in the tone unit 601 to the monitoring − conductor C603 and the monitoring + conductor C604. Accordingly, the T and R conductors of the trunk 201 extending from the toll board 303 are operatively connected through the tone unit 601 to the line conductors of the toll line 702, whereby the operator at the first position circuit at the toll board 303 may subsequently listen in on the toll line 702 without interfering in any way with the subsequent reception by the tone unit 601 of signals received over the toll line 702 from the switching apparatus in the tandem exchange 20, and specifically the end of dialing signal that is subsequently transmitted by the tone unit 701 associated with the repeater 700 and received by the tone unit 601 associated with the repeater 400 as explained more fully hereinafter.

Also, at this time, high resistance battery potential in the first operator position circuit at the toll board 303 is connected to the T and R conductors of the trunk 201; application of high resistance battery potential to the + conductor of the trunk 406 completes a circuit for energizing the winding of the re-ring relay R400 in the repeater 400 in series with the winding of the pad control relay R690, whereby the pad control relay R690 operates; however, the re-ring relay R400 does not operate since it is of the marginal type. Upon operating, the pad control relay R690 interrupts, at the contacts 691, the circuit for maintaining operated the pad cut-out relay R600 in order to cause the latter relay to restore shortly thereafter, it being of the slow-to-release type. When the pad cut-out relay R600 restores, it interrupts, at the contacts 601′ and 603′, the previously mentioned path short-circuiting the windings 605, 606 and 607, 608 of the pad 695; and completes, at the contacts 602′ the termination circuit, including the condenser 696 and the windings 697, 606 and 608 of the pad 695, between the line conductors of the toll line 702; whereby the windings 605, 606 and 607, 608 of the pad 695 are included in the connection between the toll line 702 and the first position circuit at the toll board 303.

When the connection is extended by the toll switch train 1255 to the subscriber line 1256 extending to the called subscriber substation T2 in the tandem exchange 20, the toll switch train 1255 operates to dry the loop circuit, including the trunk 1254; and to apply ground potential upon the EC conductor thereof and consequently through the incoming toll selector 1008 to the EC conductor of the trunk 905 extending from the repeater 700. When the loop circuit extending by way of the + and − conductors of the trunk 905 and including the upper winding of the loop test relay R800 in the repeater 700 is thus dried, the upper winding of the latter relay is de-energized causing the loop test relay R800 to restore. Upon restoring, the loop test relay R800 interrupts, at the contacts 801, the circuit for maintaining operated the control relay R890; and interrupts, at the contacts 802, the holding circuit for maintaining operated the ring control relay R860 in order to cause the latter relay to restore shortly thereafter, it being of the slow-to-release type. Upon restoring, the control relay R890 interrupts, at the contacts 893, the previously traced connection for applying ground potential by way of the lower winding of the tandem test relay R970 and the multiple connection for applying ground potential by way of the winding of the wait relay Y800 to the EC conductor of the trunk 905; and completes, at the contacts 892, a circuit for energizing the upper winding of the supervisory relay R710, ground potential being applied in the toll switch train 1255 through the EC conductors of the various trunks, including the trunk 905, at this time. When the upper winding of the supervisory relay R710 is thus energized, it operates; and also the control relay R890 interrupts, at the contacts 898, the path for applying ground potential to the pulse cut-in conductor C711 extending to the tone unit 701 in order to cause the pulse cut-in relay in the tone unit 701 to restore preventing further response by the tone unit 701 to dialing signals transmitted over the toll line 702.

Upon operating, the supervisory relay R710 completes, at the contacts 713, a circuit for operating the supervisory pulse relay R760. Upon operating, the supervisory pulse relay R760 completes, at the contacts 763, the circuit for operating the send relay R775; and completes, at the contacts 764, the circuit for energizing the upper winding of the prepare relay R770 in order to cause the latter relay to operate. Upon operating, the prepare relay R770 completes, at the contacts 774, a circuit for energizing the lower winding of the sequence relay R780 in order to cause the latter relay to operate; and completes, at the contacts 774, a multiple circuit for operating the control relay R805. Upon operating, the control relay R805 completes, at the contacts 808, a circuit for operating shortly thereafter, the interpulse timer relay R730; and a multiple circuit for operating the series relay R910. Upon operating, the series relay R910 completes, at the contacts 912, a holding circuit for energizing the lower winding of the prepare relay R770. Also, the control relay R805 completes, at the contacts 807, a circuit for energizing the lower winding of the supervisory control relay R820 and a multiple circuit for energizing the upper winding of the supervisory control relay R820; however, the latter relay does not operate at this time as it is of the differential type. Upon operating, the interpulse timer relay R730 interrupts, at the contacts 734, the circuit for maintaining operated the supervisory pulse relay R760; thereby to cause the latter relay to restore shortly thereafter, it being of the slow-to-release type. Upon restoring, the supervisory pulse relay R760 interrupts, at the contacts 761, the circuit for maintaining operated the control relay R805; and, upon restoring, the control relay R805 interrupts, at the contacts 807, the circuit for energizing in multiple the upper and lower windings of the supervisory control relay R820. The magnetic flux in the lower winding of the supervisory control relay R820 does not immediately decay by virtue of the shunt connection including the upper winding thereof and the contacts 822 extending also to battery potential; whereby the upper and lower windings of the supervisory control relay R820 are effectively energized in series circuit relation during the decay of the magnetic flux therein, causing the latter relay to operate in order to close its contacts 821, which are, in turn, connected by way of the contacts 811 and 955 to ground potential. Thus, the upper and lower windings of the supervisory control relay R820 are energized in series circuit relation causing the latter relay to operate fully in order to interrupt, at the contacts 822, the previously mentioned path for short-circuiting the associated resistor 829. Also, the supervisory control relay R820 interrupts, at the contacts 828, a further point in the circuit for operating the supervisory pulse relay R760; and completes, at the contacts 824, a circuit for operating the supervisory relay R830 and a multiple circuit for energizing the lower winding of the line supervisory relay R980 in order to cause the latter relay to operate. Upon operating, the line supervisory relay R980 completes, at the contacts 987, a holding circuit for energizing the upper and lower windings thereof in series circuit relation. Also, upon operating the sequence relay R780 completes, at the contacts 783, a circuit for energizing the upper winding of the switchover relay R870 in order to cause the latter relay to operate. Upon operating, the switchover relay R870 completes, at the contacts 875, a holding circuit for energizing the upper winding thereof; and completes, at the contacts 872 and 873, the previously traced connection between the — and + conductors of the trunk 905 and the line conductors of the toll line 702.

Also, when the ring control relay R860 restores, it interrupts, at the contacts 862, the circuit for maintaining operated the ring control relay R850 in order to cause the latter relay to restore shortly thereafter, it being of the slow-to-release type. Further, upon restoring the ring control relay R860 completes, at the contacts 863, a circuit for operating the ring control relay R840. Upon operating, the ring control relay R840 completes, at the contacts 842, a circuit for operating the ring relay R835. Upon operating, the ring relay R835 interrupts, at the contacts 836, the previously mentioned connection between the + conductor of the trunk 905 and the corresponding line conductor of the toll line 702; and completes, at the contacts 837, a path including the resistor 836′ for applying battery potential to the + conductor of the trunk 905 thereby to initiate operation of the toll switch train 1255 to transmit ringing current over the subscriber line 1256 to the called subscriber substation T2 in the tandem exchange 20, assuming that the called subscriber substation T2 is idle at this time. Upon restoring, the ring control relay R850 interrupts, at the contacts 852, the circuit for maintaining operated the ring control relay R840 in order to cause the latter relay to restore shortly thereafter, it being of the slow-to-release type. Upon restoring, the control relay R840 interrupts, at the contacts 842, the circuit for maintaining operated the ring relay R835 in order to cause the latter relay to restore shortly thereafter, it being of the slow-to-release type. Upon restoring, the ring relay R835 interrupts, at the contacts 837, the path for applying battery potential by way of the resistor 836′ to the + conductor of the trunk 905; and recompletes, at the contacts 836, the point in the previously mentioned connection between the + conductor of the trunk 905 and the corresponding line conductor of the toll line 702.

Also, upon restoring, the supervisory pulse relay R760 interrupts, at the contacts 763, the circuit for maintaining operated the send relay R775; and, upon restoring, the control relay R805 interrupts, at the contacts 808, the circuit for maintaining operated the interpulse timer relay R730 and the series relay R910; whereby, the interpulse timer relay R730 restores substantially immediately and the series relay R910 restores shortly thereafter, it being of the slow-to-release type. Upon restoring, the series relay R910 interrupts, at the contacts 912, the holding circuit for enerizing the lower winding of the prepare relay R770 in order to cause the latter relay to restore. During the time that the send relay R775 and the prepare relay R770 occupy their operated positions, the tone unit 701 was operatively connected to the toll line 702 and operated to transmit thereover a splash of 60 cycle modulated 1000 cycle current constituting an end-of-dialing signal.

This end-of-dialing signal returned over the toll line 702 is received by the tone unit 601 over the receiving — conductor C605 and the receiving + conductor C606 connected to the line conductors of the toll line 702 by way of the windings previously noted of the pad 695; whereby the tone unit 601 responds in order to bring about operation of the signal-in relay therein so that ground potential is applied to the signal-in conductor C609 extending therefrom. This application of ground potential to the signal-in conductor C609 completes a circuit for energizing the winding of the signal-in relay R620 in the repeater 400 thereby to cause the latter relay to operate shortly thereafter, it being of the slow-to-operate type. Upon operating, the signal-in relay R620 interrupts, at the contacts 625, the normally completed circuit for maintaining operated the incoming release relay R460, whereby the latter relay tends to restore shortly thereafter since it is of the slow-to-release type. However, at this time, the end-of-dialing signal is of short-time duration; whereby, the signal-in relay R620 does not occupy its operated position sufficiently long to bring about the restoration of the incoming release relay R460 as explained more fully hereinafter.

Also, upon operating, the signal-in relay R620 completes, at the contacts 626, a circuit for energizing the lower winding of the supervisory control relay R520, and a multiple circuit for energizing the upper winding of the supervisory control relay R520; whereby, the latter relay does not operate at this time since it is of the differential type. At the conclusion of the end-of-dialing signal, the signal-in relay in the tone unit 601 restores in order to interrupt the application of ground potential to the signal-in conductor C609 extending therefrom so as to bring about the restoration of the signal-in relay R620 in the repeater 400. Upon restoring, the signal-in relay R620 interrupts, at the contacts 626, the circuit for energizing in multiple the upper and lower windings of the supervisory control relay R520. The magnetic flux in the lower winding of the supervisory control relay R520 does not immediately decay by virtue of the shunt connection including the upper winding thereof and the contacts 522 extending also to the battery potential, whereby the upper and lower windings of the supervisory control relay R520 are effectively energized in series circuit relation during the decay of the magnetic flux therein, causing the latter relay to operate in order to close its contacts 521, which are, in turn, connected by way of the contacts 511 and the contacts 441 to ground potential. Thus the upper and lower winding of the supervisory control relay R520 are energized in series circuit relation causing the latter relay to operate fully in order to interrupt, at the contacts 522, the path for short-circuiting the resistor 529. Upon operating fully, the supervisory control relay R520 interrupts, at the contacts 526, a further point in the circuit for energizing in multiple the upper and lower windings thereof; and prepares, at the contacts 525, a circuit for energizing in multiple the upper and lower windings of the answer supervisory relay R510. Also, the supervisory control relay R520 completes, at the contacts 524, a circuit for operating the supervisory relay R530. Upon operating, the supervisory relay R530 completes, at the contacts 531, a path for applying direct ground potential to the EC conductor of the trunk 406 and consequently to the EC conductor of the trunk 202, whereby the lower winding of the supervisory relay R270 in the toll dial circuit 200 is short-circuited causing the latter relay to operate, the supervisory relay R270 being of the differential type.

Upon operating, the supervisory relay R270 completes, at the contacts 271 and 273, paths for applying ground and battery potential to the respective R and T conductors of the trunk 201; which potentials are effective to bring about the disconnection of the dial in the first operator position circuit at the toll board 303 from the trunk 201. Also, the supervisory relay R270 interrupts, at the contacts 275, the holding circuit for retaining operated the switch relay R280, whereby the latter relay restores shortly thereafter, it being of the slow-to-release type. Upon restoring, the switch relay R280 completes, at the contacts 282, a direct connection including the contacts 262 and 254 between the + conductor of the trunk 202 and the T conductor of the trunk 201. Further, upon operating the supervisory relay R270 completes, at the contacts 274, a circuit for energizing the lower winding of the sleeve relay R220 in multiple with the upper winding thereof, whereby low resistance ground potential is thus applied to the S conductor of the trunk 201 bringing about illumination of the call supervisory lamp at the first operator position circuit at the toll board 303 so as to render thereto end-of-dialing supervision. Also, the end-of-dialing signal in the form of the splash of 60 cycle modulated 1000 cycle current returned over the toll line 702 and via the receiving − conductor C605 and the receiving + conductor C606 to the tone unit 601 is coupled therein to the monitoring − conductor C603 and to the monitoring + conductor C604 and consequently is returned to the first operator position circuit at the toll board 303; whereby the operator thereat thus received an audible end-of-dialing signal. Further, when the signal-in relay R620 in the repeater 400 restores it again completes, at the contacts 625, the circuit for maintaining operated the incoming release relay 460; which latter relay is maintained operated during the reception of the end-of-dialing signal by the repeater 400, as previously mentioned.

When the subscriber at the called subscriber substation T2 in the tandem exchange 20 answers the call by removing the receiver of the telephone instrument from the associated switchhook, the toll switch train 1255 operates to interrupt the projection of ringing current over the subscriber line 1256 extending thereto and to interrupt the return of ring-back tone current over the trunk 1254. Also the toll switch train 1255 operates to interrupt the path for applying ground potential to the EC conductor of the trunk 1254 and consequently to the EC conductor of the trunk 905 in order to interrupt the circuit for energizing the upper winding of the supervisory relay R710 causing the latter relay to restore. Upon restoring, the supervisory relay R710 completes, at the contacts 714, a circuit for operating the supervisory pulse relay R760. Upon operating, the supervisory pulse relay R760 effects recycling of the relays previously mentioned and including the send relay R775; whereby the tone unit 701 is operatively connected to the toll line 702 to send a splash of 60 cycle modulated 1000 cycle current thereover, and constituting an answer signal. During this cycling of the relays mentioned the control relay R805 operates and then restores, completing and then interrupting, at the contacts 807, a circuit for energizing in multiple the upper and lower windings of the answer supervisory relay R810. The answer supervisory relay R810 operates when the circuit for energizing in multiple the upper and lower windings thereof is interrupted, as previously explained, in order to complete, at the contacts 812, a holding circuit for energizing in series the upper and lower windings thereof. Also, upon operating, the answer supervisory relay R810 interrupts, at the contacts, 811, the circuit for maintaining operated the supervisory control relay R820; and, upon restoring, the supervisory control relay R820 interrupts, at the contacts 824, the circuit for maintaining operated the supervisory relay R830 in order to cause the latter relay to restore shortly thereafter, it being of the slow-to-release type.

This answer signal sent over the toll line 702 by the repeater 700, is received by the tone unit 601, in order to effect operation and subsequent restoration of the signal-in relay R620 in the repeater 400. When the signal-in relay R620 thus operates, it completes, at the contacts 626, the circuit for energizing the lower winding of the answer supervisory relay R510 and a substantially identical multiple circuit for energizing the upper winding of the answer supervisory relay R510, whereby the latter relay is not operated at this time since it is of the differential type. Upon the restoration of the signal-in relay R620, it interrupts, at the contacts 626, the multiple circuits for energizing the upper and lower windings of the answer supervisory relay R510, whereby the magnetic flux in the lower winding of the latter relay does not immediately decay by virtue of the shunt connection including the upper winding thereof and the contacts 513 extending also to battery potential. Thus, the upper and lower windings of the answer supervisory relay R510 are effectively energized in series circuit relation during the decay of the magnetic flux therein causing the latter relay to operate in order to close its contacts 512, which are, in turn, connected by way of the contacts 441 to ground potential. Thus the upper and lower windings of the answer supervisory relay R510 are energized in series circuit relation causing the latter relay to operate fully in order to interrupt, at the contacts 513, the path for short-circuiting in series the upper and lower windings thereof. Also, the answer supervisory relay R510 completes, at the contacts 512, a circuit for energizing the lower winding of the switch-through relay R640 in order to cause the latter relay to operate; and interrupts, at the contacts 511, the holding circuit for energizing in series the upper and lower winding of the supervisory control relay R520 in order to cause the latter relay to restore. Further, the answer supervisory relay R510 interrupts, at the contacts 515, a further point in the circuit for energizing in multiple the upper and lower windings of the supervisory control relay R520; and prepares, at the contacts 514, a circuit, traced hereinafter, for energizing the winding of the supervisory relay R530. Upon operating, the switch-through relay R640 completes, at the contacts 646, a holding circuit for energizing the upper winding thereof; and interrupts, at the contacts 642, the previously traced connection between the + conductor of the trunk 406 and the monitoring + conductor C604. Finally, the switch-through relay R640 completes, at the contacts 641 and 643, a direct connection, including the contacts 482, 484 and 671, 672, as well as the winding 605, 606 and 607, 608 of the pad 695, between the + and − conductors of the trunk 406 and the line conductors of the toll line 702, thereby to complete an established connection between the first operator position circuit at the toll board 303 in the central office 10, and the called subscriber substation T2 in the tandem exchange 20.

Upon restoring, the supervisory control relay R520 interrupts, at the contacts 524, the circuit for retaining operated the supervisory relay R530 in order to cause the latter relay to restore shortly thereafter, it being of the slow-to-release type. Upon restoring, the supervisory relay R530 interrupts, at the contacts 531, the path for applying direct ground potential to the EC conductor of the trunk 406, thereby to remove the short-circuit around the lower winding of the supervisory relay R270 in the toll dial circuit 200, whereupon the upper and lower windings of the supervisory relay R270 are energized in series circuit relation causing the latter relay to restore since it is of the differential type. Upon restoring, the supervisory relay R270 interrupts, at the contacts 274, the circuit for energizing the lower winding of the sleeve relay R220 in multiple with the upper winding thereof, whereby high resistance ground potential is applied to the S conductor of the trunk 201 effecting extinguishing of the call supervisory lamp at the first operator position circuit at the toll board 303 so as to indicate to the operator thereat that the call has been answered. At this time a connection is established between the calling first operator position circuit at the toll board 303 in the central office 10 and the called subscriber substation T2 in the tandem exchange 20; and after the operator in the first position circuit converses with the subscriber at the called subscriber substation T2 and informs him of the toll call, she may complete a connection to an incoming circuit at the toll board 303. When the last-mentioned connection is completed, the operator at the first position circuit at the toll board 303 restores the associated talk key thereby disconnecting the position equipment from the established connection, whereupon high resistance battery potential is removed from the R and T conductors of the trunk 201, whereby the removal of the high resistance battery potential from the + conductor of the trunk 406 effects the restoration of the pad control relay R690 in the repeater 400; whereupon the latter relay restores, recompleting at the contacts 691, the circuit for operating the pad cut-out relay R600. Upon operating, the pad cut-out relay R600 recompletes, at the contacts 601′ and 603′, the paths for short-circuiting the windings 605, 606 and 607, 608 of the pad 695; whereby the pad 695 is now excluded from the established connection between the incoming circuit to the toll board 303 in the central office 10 and the called subscriber substation T2 in the tandem exchange 20.

Reconsidering the operation of the repeater 400 in conjunction with the repeater 700, it is noted that in the event the called subscriber substation T2 in the tandem exchange 20 is busy when the toll switch train 1255 operates to test the subscriber line 1256 extending thereto, as previously explained, the toll switch train 1255 operates in order to interrupt the application of steady ground potential upon the EC conductor of the trunk 1254 and to cause interrupted ground potential to be applied thereto. This application of interrupted ground potential in the toll switch train 1255 upon the EC conductor of the trunk 1254 and consequently upon the EC conductor of the trunk 905 completes intermittently the circuit for energizing the upper winding of the supervisory relay R710, whereby the latter relay operates and restores intermittently. The first time the supervisory relay R710 restores, it completes, at the contacts 714, the circuit for operating the supervisory pulse relay R760. Upon operating, the supervisory pulse relay R760 completes, at the contacts 763, the circuit for operating the send relay R775; and completes, at the contacts 764, the circuit for operating the prepare relay R770 via the upper winding thereof. Upon operating, the prepare relay R770 completes, at the contacts 774, the circuit for operating the control relay R805; and upon operating the control relay R805 completes, at the contacts 808, the circuit for operating the series relay R910; whereby, the latter relay, upon operating, completes, at the contacts 912, the holding circuit for energizing the lower winding of the prepare relay R770. Upon operating, the interpulse timer relay R730 interrupts, at the contacts 734, the circuit for maintaining operated the supervisory pulse relay R760; whereby, the latter relay restores shortly thereafter, it being of the slow-to-release type. Upon restoring, the supervisory pulse relay R760 effects the restoration of the send relay R775 and the control relay R805; whereby, the control relay R805 effects the restoration of the interpulse timer relay R730. Upon restoring, the interpulse timer relay R730 recompletes, at the contacts 734, when the supervisory relay R710 occupies its restored position closing the contacts 714, the circuit for reoperating the supervisory pulse relay R760; thereby to initiate another cycle of the relays mentioned above, in the manner explained. Since the supervisory relay R710 operates and restores intermittently, a new cycle of operation of the relays mentioned, as explained above, must be initiated when the supervisory relay R710 occupies its restored position closing the contacts 714; however, this condition occurs subsequently, whereby the relays mentioned repeat the cycle above-described continuously at this time. During the short time interval between the operation and the subsequent restoration of the send relay R775, in the manner described above, the tone unit 701 is operatively connected to the toll line 702 and is rendered operative to send by virtue of the operation of the prepare relay R770, during the time interval mentioned, a short splash of 60 cycle modulated 1000 cycle current over the toll line 702. Accordingly, each time the relays mentioned operate through the cycle above-described, a splash of 60 cycle modulated 1000 cycle current is sent over the toll line 702; whereby, a series of splashes of the 60 cycle modulated 1000 cycle current are transmitted over the toll line 702, at this time, and constitute a busy signal.

This busy signal, sent over the toll line 702, is received by the tone unit 601 in order to cause corresponding intermittent operation and restoration of the signal-in relay therein; whereby, the signal-in relay R620 in the repeater 400 operates intermittently in a corresponding manner. Upon the prior reception of the end-of-dialing signal, the signal-in relay R620 brought about operation of the supervisory control relay R520 and the consequent operation of the supervisory relay R530, in the manner previously explained; whereby the supervisory relay R530 upon operating effected illumination of the call supervisory lamp at the first operator position circuit at the toll board 303, in the manner previously explained. Upon the reception of the first pulse of the busy signal, the signal-in relay R620 brings about operation of the answer supervisory relay R510 and the consequent restoration of the supervisory control relay R520 and the supervisory relay R530, in the manner previously explained; whereby the supervisory relay R530 upon restoring effects extinguishing of the call supervisory lamp at the first operator position circuit in the toll board 303. Upon the reception of the second impulse of the busy signal, the signal-in relay R620 operates and then restores to complete and then to interrupt, at the contacts 626, the previously traced circuit for operating the supervisory relay R530, whereby the latter relay operates and then restores intermittently, the supervisory relay R530 restoring shortly after each deenergization thereof since it is of the slow-to-release type. Each time the supervisory relay R530 operates and then restores, it completes and then interrupts, at the contacts 531, the previously mentioned circuit for effecting illumination of the call supervisory lamp at the first operator position circuit at the toll board 303, whereby the call supervisory lamp mentioned is flashed at this time giving the operator busy supervision. When the operator at the first operator position circuit at the toll board 303 receives busy supervision, she proceeds to release the established connection, including the repeater 400, in the central office 10 and the repeater 700 in the tandem exchange 20, in a manner more fully explained hereinafter.

Continuing now with the established connection between the incoming circuit to the central office 10 and the called subscriber substation T2 in the tandem exchange 20, when the subscriber at the called subscriber station T2 replaces the receiver of the telephone instrument thereat upon its associated switch hook, the toll switch train 1255 in the tandem exchange 20 operates to recomplete the path for applying ground potential to the EC conductor of the trunk 1254 and consequently to the EC conductor of the trunk 905 in order to energize the upper winding of the supervisory relay R710 causing the latter relay to reoperate. Upon reoperating, the supervisory relay R710 completes, at the contacts 713, the previously traced circuit for operating the supervisory pulse relay R760. Upon operating, the supervisory pulse relay R760 effects operation of the send relay R775 and the prepare relay R770; the prepare relay R770 effects operation of the control relay R805; the control relay R805 effects operation of the interpulse timer relay R730; all in the manner previously explained. Also the control relay R805 completes, at the contacts 807, the previously traced circuit for operating the supervisory relay R830. Upon operating, the interpulse timer relay R730 effects the restoration of the supervisory pulse relay R760, in the manner previously explained; and upon operating the supervisory relay R830 completes, at the contacts 832, a holding circuit for maintaining operated the interpulse timer relay R730 and a substantially identical multiple circuit, also including the contacts 928, for maintaining operated the series relay R910; the series relay R910 having been operated incident to operation of the control relay R805, in the manner previously explained. Upon restoring, the supervisory pulse relay R760 effects restoration of the send relay R775 and the prepare relay R770; and the prepare relay R770 effects restoration of the control relay R805; all in the manner previously explained. Upon restoring, the control relay R805 interrupts, at the contacts 807, the previously traced circuit for maintaining operated the supervisory relay R830, thereby to cause the latter relay to restore shortly thereafter, it being of the slow-to-release type. Upon restoring, the supervisory relay R830 interrupts, at the contacts 832, the previously traced circuits for maintaining operated the series relay R910 and the interpulse timer relay R730; whereby the series relay R910 being of the slow-to-release type does not restore immediately, but the interpulse timer relay R730 does restore immediately to recomplete, at the contacts 734, the previously traced circuit for operating the supervisory pulse relay R760. The supervisory pulse relay R760 upon operating initiates another cycle of operation of the relays mentioned.

During the above-described cycle of operation of the relays mentioned and while the send relay R775 and the prepare relay R770 occupy their operated positions, the tone unit 701 was operatively connected to the toll line 702 and also operated to transmit a pulse of 60 cycle modulated 1000 cycle current over the toll line 702. Accordingly at this time, the relays mentioned operate continuously through the cycle above described in order to cause a series of pulses of 60 cycle modulated 1000 cycle current to be transmitted over the toll line 702 and constituting a disconnect signal. In passing, it is noted that the disconnect signal is identical to the busy signal, previously described; and the disconnect signal is continuously transmitted from the repeater 700 in the tandem exchange 20 over the toll line 702 to the repeater 400 in the central office 10 until the operator at the first position circuit at the toll board 303 effects the release of the established connection, in a manner more fully explained hereinafter.

When this disconnect signal is received by the repeater 400 in the central office 10, the tone unit 601 responds thereto effecting intermittent operation of the signal-in relay R620 and the consequent intermittent operation of the supervisory relay R530, in a manner substantially identical to that previously explained. Each time the supervisory relay R530 operates and then restores, it completes and then interrupts, at the contacts 631, the previously traced path for applying direct ground potential to the EC conductor of the trunk 406 so as to effect intermittent operation and restoration of the supervisory relay R270 in the toll dial circuit 200, and the consequent flashing of the call supervisory lamp at the first operator position circuit at the toll board 303 rendering to the operator thereat disconnect supervision.

Upon receiving the disconnect supervision, the operator at the first position circuit at the toll board 303 may effect the release of the established connection by withdrawing the call plug of the cord circuit in use from the jack terminating the trunk 201, thereby interrupting the previously traced circuit for maintaining operated the sleeve relay R220 in the toll dial circuit 200. Upon restoring the sleeve relay R220 interrupts, at the contacts 222, the multiple circuits for retaining operated the end-dial relay R290 and the switch-through relay R250. Upon restoring the switch-through relay R250 interrupts, at the contacts 256, the connection between the junction of the upper and lower windings of the supervisory relay R270 and the EC conductor of the trunk 202; and interrupts, at the contacts 258, the path for applying ground potential to the C conductor of the trunk 202 so as to bring about the release of the toll selector 203. When the toll selector 203 is thus released, ground potential is removed from the C conductor of the trunk 406 interrupting the previously traced holding circuit for energizing in series the upper and lower windings of the release relay R420 in the repeater 400 causing the latter relay to restore. Upon restoring, the release relay R420 completes, at the contacts 420, a circuit for operating the supervisory pulse relay R660; and interrupts, at the contacts 426, the circuit for maintaining operated the release pulse timer relay R435. Upon operating, the supervisory pulse relay R660 effects operation of the control relay R505, the send relay R675 and the prepare relay R670, all in a manner previously explained. Upon operating, the prepare relay R670 interrupts, at the contacts 673, the application of ground potential to the receiving switch conductor C607, whereby the tone unit 601 is conditioned to send 60 cycle modulated 1000 cycle current over the toll line 702. Upon operating, the send relay R675 completes, at the contacts 678, the path for applying ground potential to the modulation cut-off conductor C608 in order to insure restoration of the modulation cut-off relay in the tone unit 601 and effectively to connect the tone unit to the toll line 702, whereby the 60 cycle modulated 1000 cycle current is sent from the tone unit 601 over the toll line 702.

Also upon restoring, the release pulse timer relay R435 sets its armature RA436 into vibration, whereby the previously traced holding circuit for maintaining operated the release pulse timer relay R440 is automatically completed and interrupted, at the contacts associated with the vibratory armature RA436. After a time interval of approximately two seconds, the armature RA436 settles down effecting complete interruption of the holding circuit for maintaining operated the release pulse timer relay R440 so that the latter relay restores interrupting, at the contacts 444, the previously traced circuit for maintaining operated the supervisory pulse relay R660 causing the latter relay to restore and bring about the restoration of the prepare relay R670, the send relay R675 and the control relay R505. When the send relay R675 is thus restored, it disconnects the tone unit 601 from the toll line 702, thereby terminating the long pulse of 60 cycle modulated 1000 cycle current, constituting a release signal. Finally the release pulse timer relay R440 interrupts, at the contacts 441, the multiple holding circuits for maintaining operated the answer supervisory relay R490, the sequence relay R680, the switch-through relay R640, the answer supervisory relay R510, the line supervisory relay R480 and the pad cut-out relay R600. Accordingly at this time, only the incoming release relay R460 in the repeater 400 occupies its operated position, whereby the repeater 400 is completely released. Also at this time, battery potential is applied by way of the previously traced path, including the upper winding of the release relay R420 to the C conductor of the trunk 406, thereby marking the trunk 406 and consequently the repeater 400 as idle to the toll selectors 203, etc., having access thereto.

This release signal sent over the toll line 702 is received by the tone unit 701 and brings about continuous operation of the signal-in relay R720 in the repeater 700 for a corresponding time interval of approximately two seconds, the release signal being in the form of the continuous pulse of 60 cycle modulated 1000 cycle current of the time duration of approximately two seconds. Upon operating, the signal-in relay R720 completes, at the contacts 722, a multiple circuit for maintaining operated the switch-over relay R870, etc., and interrupts, at the contacts 724, a further point in the circuit for operating the supervisory pulse relay R760, thereby causing the latter relay to restore shortly thereafter in the special event that it is operating at this time as a consequence of intermittent operation of the supervisory relay R710 under the control of the toll switch train 1255 when the subscriber at the called subscriber substation T2 in the tandem exchange 20 replaced the receiver of the telephone instrument thereat upon its associated switch hook. Accordingly upon restoring the supervisory pulse relay R760 prevents further operation of the relays mentioned in the repeater 700 to control operation of the tone unit 701 to return the disconnect signal over the toll line 702, all in the manner previously explained. Further, the signal-in relay R720 completes, at the contacts 723, the circuit for operating shortly thereafter the interpulse timer relay R730; and completes, at the contacts 726, the circuit for operating the ring control relay R860. Also the signal-in relay R720 interrupts, at the contacts 725, the circuit for maintaining operated the incoming release relay R960 in order to cause the latter relay to restore shortly thereafter, it being of the slow-to-release type. At this point, it is again noted that the incoming release relay R960 is caused to restore at this time as a consequence of the signal-in relay R720 being maintained operated for approximately two seconds as a result of the tone unit 701 receiving the release signal over the toll line 702. Upon restoring, the incoming release relay R960 interrupts, at the contacts 962, the holding circuit for energizing the selector seize relay R950 in order to cause the latter relay to restore. Upon restoring, the selector seize relay R950 interrupts, at the contacts 955, the original path for maintaining operated the line supervisory relay R980, etc., whereby, at this time, the line supervisory relay R980, etc., are maintained operated only by virtue of the closed contacts 722 of the operated signal-in relay R720. Also upon restoring, the selector seize relay R950 interrupts, at the contacts 951, the path for applying ground potential to the C conductor of the trunk 905 in order to bring about the release of the incoming toll selector 1008 and the toll switch train 1255 in the tandem exchange 20. When the toll switch train 1255 is thus released, the subscriber line 1256 extending to the called subscriber substation T2 in the tandem exchange 20 is marked as idle thereto.

At the conclusion of the release signal, the signal-in relay R720, in the repeater 700, restores, interrupting, at the contacts 722, the alternative holding circuit for maintaining operated the line supervisory relay R860, etc., whereby the relays mentioned restore. Specifically the following relays, in the repeater 700, restore when the contacts 722 are opened incident to the restoration of the signal-in relay R720; the sequence relay R780, the supervisory control relay R820, the switch-over relay R870, the supervisory relay R830, and the pad cut-out relay R700. Also upon restoring, the selector seize relay R950 reprepares, at the contacts 953, the path for applying battery potential by way of the upper winding of the release relay R920 to the C conductor of the trunk 906. Finally, upon restoring, the signal-in relay R720 recompletes, at the contacts 725, the circuit for operating the incoming release relay R960; whereby the latter relay, upon operating, completes, at the contacts 961, the path for applying battery potential by way of the upper winding of the release relay R920 to the C conductor of the trunk 906; whereby the trunk 906 and consequently the repeater 700 are marked as idle to the incoming toll selectors 1253, etc., having access thereto. Finally, when the contacts 722, are opened, incident to the restoration of the signal-in relay R720, the circuit for illuminating the busy lamp L787 is interrupted in order to indicate the idle condition of the repeater 700.

At this time, all of the apparatus involved in the established connection between the first operator position circuit at the toll board 303 in the central office 10 and the called subscriber substation T2 in the tandem exchange 20 is completely released and available for further use.

*Sect. 5.—A call from the toll board in the central office to the toll board in the remote office*

Assuming that a call has been answered at the first operator position circuit in the toll board 303 in the central office 10 that requires extension to a subscriber substation in the remote office 30, the operator at the first position mentioned selects an idle one of the trunks extending to a toll dial circuit, connects the answering cord circuit thereto, and then proceeds with dialing in the manner described in Sect. 4. In the present example, the call may be first extended from the first operator position circuit at the toll board 303 via the trunk 201, the toll dial circuit 200, the trunk 202, the toll selector 203, the trunk 406, the repeater 400, the toll line 702, the repeater 700, and the trunk 905, to the incoming toll selector 1008, in the manner previously explained; whereby the incoming toll selector 1008 responds to the next digit to select the group of trunks, including the trunk 1101, and then an idle trunk in the group mentioned. Specifically, the incoming toll selector 1008 may select the trunk 1101 extending to the toll selector 1100, the trunk 1101 being marked as idle by the absence of ground potential upon the C conductor thereof. The incoming toll selector 1008 then switches through, whereby ground potential therein is forwarded over the C conductor of the trunk 1101, completing a loop circuit for energizing in series the upper and lower windings of the line relay R1140 in the toll selector 1100. This loop circuit extends from the grounded C conductor of the trunk 1101 via the lower winding of the line relay R1140 and the contacts 1133 to the + conductor of the trunk 1101, and from battery potential via the upper winding of the line relay R1140 and the contacts 1131 to the — conductor of the trunk 1101, the + and — conductors of the trunk 1101 being looped together at this time, via the + and — conductors of the incoming toll selector 1008 and the trunk 905, at the upper winding of the loop test relay R800 in the repeater 700. When this loop circuit is thus completed, the loop test relay R800 is retained in its operated position and the line relay R1140 is operated. Upon operating, the line relay R1140 completes, at the contacts 1142, a circuit, including the contacts 1137, for operating the hold relay R1145. Upon operating the hold relay R1145 completes, at the contacts 1146, a circuit, including the contacts 1137, for operating the hold relay R1150. Upon operating, the hold relay R1150 prepares, at the contacts 1154, a circuit traced hereinafter for operating the vertical magnet M1181; completes, at the contacts 1151, a direct path for applying ground potential to the C conductor of the trunk 1101; and completes, at the contacts 1153, a circuit for energizing the lower polarizing winding of the switch relay R1130. The energization of the lower polarizing winding of the switch relay R1130 renders the latter relay fast to operate when the upper winding thereof is subsequently energized.

The next digit dialed at the first operator position circuit at the toll board 303 controls the line relay R430 in the repeater 400, whereby the digit is repeated between the repeater 400 and the repeater 700 over the toll line 702, in the manner explained in Sect. 4, the dial-in relay R880 in the repeater 700 following and repeating, at the contacts 881, over the loop circuit traced above, to the line relay R1140 in the toll selector 1100. Accordingly, the line relay R1140 follows and each time it restores and then reoperates, it interrupts and then recompletes, at the contacts 1142, the circuit for retaining operated the hold relay R1145, the latter relay being of the slow-to-release type. Also each time the line relay R1140 restores and then reoperates, it completes and then interrupts, at the contacts 1143, the circuit, including the contacts 1137, 1154 and 1121', for operating the vertical magnet M1181, whereby the wiper carriage of the Strowger mechanism 1180 is driven step by step in the vertical direction away from its normal vertical position. When the wiper carriage of the Strowger mechanism 1180 is driven one step in the vertical direction away from its normal vertical position, the sets of switch springs S1186 and S1187 are operated, for a purpose more fully explained hereinafter. Also each time the vertical magnet M1181 operates and then restores, it completes and then interrupts, at the contacts 1182, a circuit for energizing the winding of the step relay R1170, whereby the latter relay is operated and remains operated during impulsing.

In the present example, the digit that is received by the toll selector 1100 effects operation of the vertical magnet M1181 so that the wiper carriage of the Strowger mechanism 1180 is driven in the vertical direction to the level of trunks terminating the call storage circuit 1200, whereby the vertical control wiper VW engages a contact in the associated control contact bank having ground potential thereon so as to complete a series circuit for energizing the lower winding of the change-over relay R1175 and the winding of the step relay R1170. At the conclusion of the present digit, the line relay R1140 is retained in its operated position, and the restored vertical magnet M1181 interrupts the direct circuit for energizing the winding of the step relay R1170, whereby only the above mentioned series circuit is completed at this time for energizing the winding of the step relay R1170. Accordingly, the step relay R1170 restores shortly thereafter, it being of the combination slow-to-release and marginal type; however the change-over relay R1175 is operated shortly thereafter in the series circuit noted, it being of the slow-to-operate type. Upon operating, the change-over relay R1175 completes, at the contacts 1179, a holding circuit, including the set of switch springs S1187 and the contacts 1156, 1141, and 1137, for energizing the upper winding thereof. Also upon operating the change-over relay R1175 completes, at the contacts 1177, a circuit, including the contacts 1184, 1127 and 1166, for operating the rotary magnet M1183, whereby the wiper carriage of the Strowger mechanism 1180 is driven step by step in the rotary direction away from its normal rotary position by virtue of the inclusion of the contacts 1184. Specifically the present operation of the toll selector 1100 depends upon the condition of the call storage circuit 1200 that, in turn, depends upon the idle or busy condition of each of the three trunks 1201, 1202 and 1203 extending to the trunk circuits 1250, etc., terminating the trunk lines 1251, etc. In the present example, it may be assmued that each of the trunks 1201, 1202 and 1203 is idle at this time, whereby each of the busy relays R1210, R1215 and R1220 occupies its restored position; hence the busy relays R1230, R1235 and R1240 occupy their restored positions so that the wiper carriage of the Strowger mechanism 1180 is driven directly across the trunks 1206, 1205 and 1204 in the order named in the selected level, so that the wiper carriage then engages the trunk 1201 comprising the first trunk in the call storage circuit 1200 and terminated by the trunk circuit 1250. When the wiper carriage of the Strowger mechanism 1180 engages the contact set in the selected level terminating the trunk 1201, battery potential is applied to the C conductor thereof via the winding of the busy relay R1210, whereby a series circuit is completed for energizing the winding of the busy relay R1210 and the upper winding of the switch relay R1130, this circuit, including the contacts 1152 and 1158. When this series circuit is thus completed, the switch relay R1130 operates fast to complete, at the contacts 1135, a holding circuit for energizing the intermediate winding thereof; and interrupts, at the contacts 1137, the previously traced circuit for operating the rotary magnet M1183 in order to prevent further driving of the wiper carriage of the Strowger mechanism 1180 in the rotary direction. Also the switch relay R1130 completes, at the contacts 1136, a direct path, including the contacts 1158, for applying ground potential to the C conductor of the first trunk 1201 so as to effect operation of the busy relay R1210 and so as to mark the first trunk 1201 as busy to the other toll selectors having access thereto.

Also the switch relay R1130 interrupts, at the contacts 1131 and 1133, the loop circuit extending to the upper and lower windings of the line relay R1140, so as to cause the latter relay to restore; and completes, at the contacts 1132 and 1134, a connection between the — and + conductors of the trunk 1101 and the — and + conductors of the first trunk 1201. Further the switch relay R1130 interrupts, at the contacts 1139, a normal connection between the winding of the wait relay R1125 and the + wiper of the wiper carriage; and completes, at the contacts 1139, a path including the contacts 1122 between the EC conductor of the trunk 1101 and the EC wiper of the wiper carriage. Also upon operating, the switch relay R1130 interrupts, at the contacts 1137, the circuits for retaining operated the hold relay R1145 and the hold relay R1150 and the holding circuit for retaining operated the change-over relay R1175, whereby the relays mentioned restore at this time without effect.

At this time, the trunk 1101 is connected through the toll selector 1100 and the first trunk 1201 to the trunk circuit 1250; and the operator at the first position circuit at the toll board 303 having dialed all of the required digits momentarily operates her end-of-dial key, as explained in Sect. 4. Moreover the loop circuit extending from the repeater 700 is dried in the trunk circuit 1250, and ground potential in the trunk circuit 1250 is returned over the EC conductor of the first trunk 1201 and back through the toll selector 1100 to the EC conductor of the trunk 905 extending from the repeater 700 in order to cause the repeater 700 to apply battery potential to the + conductor of the trunk 905. The application of battery potential to the + conductor of the trunk 905 constitutes a ring signal and is forwarded via the toll selector 1100 and the + conductor of the first trunk 1201 into the trunk circuit 1250 causing the trunk circuit 1250 to ring down the dial and ring-down trunk circuit 1260 over the trunk line 1251 so that the dial and ring-down trunk circuit 1260 forwards a call over the incoming trunk 1262 to the toll board 1270 in the remote office 30. Also at this time the repeater 700 operates to return the end-of-dialing signal over the toll line 702 to the repeater 400 so that the toll dial circuit 200 is controlled to bring about illumination of the call supervisory lamp at the first operator position circuit at the toll board 303, in the manner explained in Sect. 4.

When the operator at the toll board 1270 answers the call by inserting the answer plug of an idle cord circuit thereat into the jack terminating the trunk 1262, the ring-down trunk circuit 1260 is controlled in order to effect a control over the trunk line 1251 so that the trunk circuit 1250 is operated to remove ground potential from the EC conductor of the first trunk 1201, whereby the repeater 400 returns the answer signal over the toll line 702 to the repeater 400 so that the toll dial circuit 200 is governed to extinguish the call supervisory lamp at the first operator position circuit at the toll board 303. At this time, an established connection is completed between the first operator position circuit at the toll board 303 in the central office 10 and the operator position circuit at the toll board 1270 in the remote office 30 via the toll line 702 and the trunk line 1251.

Supervision between the toll board 303 in the central office 10 and the toll board 1270 in the remote office 30 is substantially identical to that previously described in Sect. 4, so that when the operator at the position circuit at the toll board 1270 disconnects, the ring-down trunk circuit 1260 is controlled over the trunk 1262 in order to govern the trunk circuit 1250 over the trunk line 1251, for the purpose of returning ground potential upon the EC conductor of the first trunk 1201, whereby the repeaters 700 and 400 and the toll dial circuit 200 are controlled in the manner previously explained, bringing about flashing of the call supervisory lamp at the first operator position circuit at the toll board 303, so as to render to the operator thereat disconnect supervision. At this time, the operator at the first position circuit at the toll board 303 may effect the release of the apparatus involved in the present connection by taking down the cord circuit so as to effect the release of the toll dial circuit 200, the toll selector 203, the repeaters 400 and 700, and the incoming toll selector 1008, in the manner explained in Sect. 4.

When the incoming toll selector 1008 is thus released, ground potential is removed from the C conductor of the trunk 1101, interrupting the holding circuit for energizing the intermediate winding of the switch relay R1130 in the toll selector 1100, causing the latter relay to restore. Upon restoring, the switch relay R1130 completes, at the contacts 1137, a circuit, including the contacts 1143 and 1151′ and the set of switch springs 1186, for operating the release magnet M1185, whereby the wiper carriage of the Strowger mechanism 1180 is released and returned to its normal rotary and vertical positions, opening the sets of switch springs S1186 and S1187. When the set of switch springs S1186 is thus opened the circuit for operating the rotary magnet M1185 is interrupted. When the toll selector 1100 is thus released, the circuit for retaining operated the busy relay R1210 in the call storage circuit 1200 is interrupted causing the latter relay to restore; and also the trunk circuit 1250 is released controlling the ring-down trunk circuit 1260 over the trunk line 1251 to render disconnect supervision via the trunk 1262 to the operator position circuit at the toll board 1270. The operator at the toll board 1270 then takes down the cord circuit to the jack terminating the trunk 1262 effecting the complete release of the ring-down trunk circuit 1260. At this time, the established connection between the toll board 303 in the central office 10 and the toll board 1270 in the remote office 30 is completely released and all of the apparatus involved therein is available for further use.

Reconsidering the operation of the toll selector 1100, in conjunction with the call storage circuit 1200 it will be understood that when the first trunk 1201 is rendered busy, the next toll selector that is searching in this level will select the second trunk 1202 effecting operation of the associated busy relay R1215. When all of the three trunks 1201, 1202 and 1203 are busy, the busy relays R1210, R1215 and R1220 occupy their operated positions, completing, at the contacts 1211, 1216 and 1221 respectively, a chain circuit for applying battery potential via the winding of the busy relay R1230 to the + conductor of the first call storage trunk 1204. At this time, the next toll selector that is searching in the level terminating the trunks 1201, etc., and the call storage trunks 1204, etc., will operate to select the first call storage trunk 1204 and to camp thereon for a purpose more fully explained in Sect. 8. For the present purpose, it is noted that when all of the trunks 1201, 1202 and 1203 are busy, the next three operating toll selectors searching in the corresponding level will be operated to effect camping upon the three respective call storage trunks 1204, 1205 and 1206. Accordingly when three of the toll selectors are camping upon the three call storage trunks 1204, 1205 and 1206, the full facility of the call storage circuit 1200 is utilized, whereby any further operating toll selector searching in the corresponding level will encounter an ordinary all-trunks-busy condition.

More specifically, assuming that the toll selector 1100 is searching in the level mentioned, when all three of the trunks 1201, etc., and all three of the call storage trunks 1204, etc., are busy, in this case the wiper carriage of the Strowger mechanism 1180 will be driven first across the call storage trunks 1206, etc., and then across the trunks 1201, etc., and ultimately across the terminals 1207, etc., into its eleventh rotary position, whereby the set of switch springs S1188 is operated to complete a circuit for energizing the upper winding of the busy relay R1155 in series with the upper winding of the switch relay R1130, to effect operation of the relays mentioned. Upon operating the switch relay R1130 effects the restoration of the line relay R1140, the change-over relay R1175 and the hold relays R1145 and R1150, in the manner previously explained. Also the switch relay R1130 dries the loop circuit extending back over the — and + conductors of the trunk 1101 to the repeater 700; and the busy relay R1155, upon operating, completes, at the contacts 1157′, a connection between the interrupted ground conductor C1172 and the EC conductor of the trunk 1101 extending back to the repeater 700. The repeater 700 is controlled in the manner explained in Sect. 4, in order to effect the return of the busy signal over the toll line 702 to the repeater 400, whereby the toll dial circuit 200 is governed to bring about flashing of the call supervisory lamp at the first operator position circuit at the toll board 303 rendering all-trunks-busy supervision to the operator thereat. The operator at the first operator position circuit at the toll board 303 then proceeds to effect the release of the connection by taking down the cord circuit from the jack terminating the trunk 201 in the manner explained in Sect. 4.

The release of the toll selector 1100 in the present example is substantially identical to that described above. At this time, all of the apparatus involved in the connection between the first operator position circuit at the toll board 303 in the central office 10 and the busy toll selector 1100 in the tandem exchange 20 is completely released and available for further use.

*Sect. 6.—A call from the toll board in the remote office to a subscriber substation in the central office*

Assuming that a call has been answered at the toll board 1270 in the remote office 30 that requires extension to a subscriber substation, such, for example, as the subscriber substation T1, in the central office 10. The operator at the toll board 1270 selects an idle one of the outgoing trunks extending to a dial and ring-down trunk circuit, such, for example, as the trunk 1261 extending to the dial and ring-down trunk circuit 1260 and then connects the answering cord circuit thereto. When the cord circuit mentioned is connected to the trunk 1261, the dial and ring-down trunk circuit 1260 is controlled in order to effect seizure of the trunk circuit 1250 over the trunk line 1251, whereby the trunk circuit 1250 effects seizure of the incoming toll selector 1253 over the trunk 1252. The operator at the toll board 1270 then proceeds to operate the talk key and the dial front key in her cord circuit and then dials the first digit effecting operation of the incoming toll selector 1253 to select the group of trunks, including the trunk 906, and then an idle trunk therein. The incoming toll selector 1253 may select the trunk 906 extending to the repeater 700, whereby the repeater 700 effects seizure of the repeater 400, and the repeater 400 effects seizure of the incoming toll selector 308 over the trunk 405, the operations of the calling repeater 700 and the called repeater 400 being substantially identical to the operations of the calling repeater 400 and the called repeater 700 described in Sect. 4. The operator at the toll board 1270 proceeds to dial the next digit in order ultimately to effect operation of the incoming toll selector 308, whereby the incoming toll selector 308 selects the group of trunks, including the trunk 307, and then an idle trunk therein. The incoming toll selector 308 may select the particular trunk 307 extending to the toll switch train 304. The operator at the toll board 1270 then proceeds to dial the other required digits so as to effect operation of the toll switch train 304 to select the subscriber line 305 extending to the called subscriber substation T1 in the central office 10. The subsequent operation of the toll switch train 304 depends upon the idle or busy condition of the called subscriber substation T1 at this time. The ultimate completion of the established connection and the subsequent release of the apparatus involved therein are substantially identical to the corresponding operations described in Sect. 4.

*Sect. 7.—A call from the toll board in the remote office to toll board in the central office*

Assuming that a call has been answered at the toll board 1270 in the remote office 30 that requires extension by the operator at the first position circuit at the toll board 303 in the central office 10, the operator at the toll board 1270 initiates the extension of the call in a manner substantially identical to that described in Sect. 6, whereby the call may be extended from the toll board 1270 via the trunk 1261, the dial and ring-down trunk circuit 1260, the trunk line 1251, the trunk circuit 1250, the trunk 1252, the incoming toll selector 1253, the trunk 906, the repeater 700, the toll line 702, the repeater 400, and the trunk 405 to the incoming toll selector 308. At this time, the operator at the toll board 1270 dials the next digit 5 effecting operation of the incoming toll selector 308 to select the group of trunks, including the trunk 302, and then an idle trunk in the group mentioned. Specifically the incoming toll selector 308 may select the particular trunk 302 extending to the toll trunk circuit 300 and connected to the trunk 301 terminating at the first operator position circuit at the toll board 303, the trunk 302 being marked as idle to the incoming toll selector 308 by the application of battery potential via the upper winding of the seize relay R380 and the contacts 381 and 342 to the C conductor thereof. When the incoming toll selector 308 seizes the trunk 302, ground potential is applied to the C conductor of the trunk 302 effecting operation of the seize relay R380 in the toll trunk circuit 300. Upon operating the seize relay R380, interrupts, at the contacts 381, the initial operating circuit for energizing the upper winding thereof; and completes, at the contacts 382, a holding circuit for energizing in series the upper and lower windings thereof via the C conductor of the trunk 302. Further the seize relay R380 completes, at the contacts 384, a path, including the contacts 344, for applying ground potential to the EC conductor of the trunk 302; completes, at the contacts 385, a path for applying ground potential via the winding of the sleeve relay R360 and the contacts 312 to the sleeve conductor of the trunk 301 extending to the first operator position circuit at the toll board 301; and completes, at the contacts 383, a path for applying battery potential to the busy conductor of the trunk 301. At this time, the loop circuit extending from the upper winding of the loop test relay R500 in the repeater 400 to the — and + conductors of the trunk 302 is effectively opened by virtue of the connection of ground potential to the R and T conductors of the trunk 301 via the windings of the transfer relay R320 and the ring relay R330, whereby the loop test relay R500 restores. At this time, ground potential is applied to the EC conductor of the trunk 302 and the loop circuit, including the — and + conductors of the trunk 302 is dried as explained above, whereby the repeater 400 is controlled to return an end-of-dial signal over the toll line 702 to the repeater 700 in order to bring about illumination of the call supervisory lamp at the toll board 1270 indicating to the operator thereat that the call has been extended to the toll board 302.

Moreover in the repeater 400 the ring relay R535 is operated and then restored in order to effect the application of battery potential to the + conductor of the trunk 405 and thence to the + conductor of the trunk 302 so as to bring about operation and subsequent restoration of the ring relay R330 in the toll trunk circuit 300. Upon operating the ring relay R330 completes, at the contacts 332, a circuit, including the contacts 346, for energizing the upper winding of the control relay R325 causing the latter relay to operate and complete, at the contacts 326, a holding circuit for energizing the lower winding thereof. Also the control relay R325 completes, at the contacts 327, a path, including the contacts 348 and 314, for applying battery potential to the lamp conductor of the trunk 301 so as to eliminate the call lamp at the first operator position circuit at the toll board 303 indicating a call on the trunk 301.

The operator at the first position circuit at the toll board 303 answers the call by selecting an idle cord circuit and inserting the answer plug thereof into the jack terminating the trunk 301 effecting the application of battery potential upon the sleeve conductor of the trunk 301 so that the sleeve relay R360 is operated. Upon operating, the sleeve relay R360 completes, at the contacts 362, a circuit for operating the prepare relay R340, whereby the latter relay interrupts, at the contacts 348, the multiple holding circuit for retaining operated the control relay R325 and path for applying battery potential to the lamp conductor of the trunk 301. Also the prepare relay R340 interrupts, at the contacts 341, a normally completed termination circuit across the R and T conductors of the trunk 301 conditioning the trunks 301 and 302 for talking over the line conductors thereof. Finally the prepare relay R340 interrupts, at the contacts 344, the path for applying ground potential to the EC conductor of the trunk 302 so as to cause the repeater 400 to operate and return the answer signal over the toll line 702 to the repeater 700 bringing about the extinguishing of the call supervisory lamp at the toll board 1270. At this time an established connection is completed between the toll board 1270 in the remote office 30 and the first operator position circuit at the toll board 303 in the central office 10 and the operator at the toll board 1270 advises the operator at the first position circuit at the toll board 303 concerning the extension of the connection.

The operator at the first position circuit at the toll board 303 proceeds with the extension of the connection to a called circuit; and subsequently upon receiving disconnect supervision the operator at the first position circuit at the toll board 303 takes down the cord circuit to the trunk 301 effecting the restoration of the sleeve relay R360 in he toll trunk circuit 300, whereby the prepare relay R340 is restored shortly thereafter, the latter relay being of the slow-to-release type. Upon restoring, the prepare relay R340 recompletes, at the contacts 344, the path for applying ground potential to the EC conductor of the trunk 302, whereby the repeater 400 operates to return the disconnect signal over the toll line 702 to the repeater 700 bringing about flashing of the call supervisory lamp at the toll board 1270 so as to render to the operator thereat disconnect supervision. The operator at the toll board 1270 may take down the cord circuit to the trunk 1281 effecting the release of the apparatus involved in the established connection, in a manner substantially identical to that described in Sect. 6. In this case, when the incoming toll selector 303 is released, the seize relay R380 in the toll trunk circuit 300 is restored in order to interrupt, at the contacts 383, the path for applying battery potential to the busy conductor of the trunk 301 so as to indicate to the toll board 303 that the toll trunk circuit 300 has been released and is now idle.

*Sect. 8.—Call storage in the tandem exchange*

Considering now the call storage facility provided in the tandem exchange 20, it may be again assumed that a call has been extended from the first operator position circuit at the toll board 303 in the central office 10 via the trunk 201, the toll dial circuit 200, the trunk 202, the toll selector 203, the trunk 406, the repeater 400, the toll line 702, the repeater 700, the trunk 905, the incoming toll selector 1008 and the trunk 1101 to the toll selector 1100, in the manner explained in Sect. 5. Further it may be assumed that the toll selector 1100 has been operated in accordance with the predetermined digit in order to cause the wiper carriage thereof to select the associated level of trunks 1201, etc., and the call storage trunks 1204, etc., at a time when all three of the trunks 1201, 1202 and 1203 are busy. In this case, the operated busy relays R1210, R1215 and R1220 connect battery potential via the winding of the busy relay R1230 to the + conductor of the first call storage trunk 1204. Thus in the present example, when the wiper carriage of the Strowger mechanism 1180 is operating in the rotary direction and engages the contact set terminating the first call storage trunk 1204, a series circuit is completed for energizing the winding of the busy relay R1230 and the winding of the wait relay R1125, this series circuit, including the contacts 1130 of the restored switch relay R1130 and the + wiper of the wiper set carried by the wiper carriage of the Strowger mechanism 1180, as well as the contacts 1211, 1216 and 1221. When this series circuit is completed, the wait relay R1125 and the busy relay R1230 operate. More particularly, the busy relay R1230 upon operating completes, at the contacts 1231, a connection between the winding of the busy relay R1235 and the + conductor of the second call storage trunk 1205, whereby the second call storage trunk 1205 is conditioned to be selected by the next toll selector that is searching in the associated level. In view of the above description, it will be appreciated that when a call is subsequently stored on the second call storage trunk 1205 that the busy relay R1235 is operated to condition the third call storage circuit 1206 to store a call, and that when a call is subsequently stored on the third call storage trunk 1206 that the busy relay R1240 is operated. At this time, when all of the trunks 1201, etc., are busy and all of the call storage trunks 1204, etc., are busy, any toll selector searching in the associated level will encounter an "all trunks busy" condition, in the manner explained in Section 5.

Returning now to the present example, upon operating the wait relay R1125 in the toll selector 1100 interrupts, at the contacts 1127, the previously traced circuit for operating the rotary magnet M1183; and completes, at the contacts 1126, a substantially identical circuit for operating the distributor start relay R1120. Accordingly at this time, the wiper set carried by the carriage of the Strowger mechanism 1180 is camping upon the contact set terminating the first call storage trunk 1204; however, the switch relay R1130 is not operated. Upon operating, the distributor start relay R1120 completes, at the contacts 1121, a path for applying battery potential by way of the lower winding of the test relay R1110 to the test conductor of the trunk 1102 appearing before the finders F1, etc., of the various finder links 1000, etc.; and completes, at the contacts 1123, a path, including the contacts 1113, for applying ground potential to the start conductor extending to the distributor 1103. At this time, the finder link 1000 is marked as idle to the distributor 1103 by the application of ground potential via the contacts 1097 to the guard conductor extending to the distributor 1103, whereby the distributor 1103 may effect the assignment of the idle finder link 1000 and operation thereof to search for the trunk 1102 extending to the toll selector 1100. Assuming, that the distributor 1103 assigns the finder link 1000, a ground pulse is applied to the associated step conductor effecting operation and subsequent restoration of the rotary magnet 1M of the finder F1 of the finder link 1000. More particularly the rotary magnet 1M operates and restores driving the wipers of the finder F1 one step in the clockwise direction and transmitting an impulse, at the contacts 1M1, via the pulse conductor to the distributor 1103, whereby the distributor 1103 effects intermittent operation of the rotary magnet 1M until the wipers of the finder F1 engage the contacts in the associated contact bank terminating the trunk 1102 extending to the toll selector 1100, whereupon a test circuit is completed, for energizing the lower winding of the test relay R1090, this test circuit, including the test conductor extending through the distributor 1103 and the test conductor of the trunk 1102. When the lower winding of the test relay R1090 is thus energized, the latter relay operates to complete, at the contacts 1093, a holding circuit for energizing the upper winding thereof; and to complete, at the contacts 1092, a path for applying direct ground potential to the test conductor of the trunk 1102 so as to effect operation of the test relay R1110 in the toll selector 1100. Upon operating, the test relay R1110 interrupts, at the contacts 1113, the path for applying ground potential to the start conductor extending to the distributor 1103 so that the distributor 1103 is dismissed at this time. Also upon operating, the test relay R1090 interrupts, at the contacts 1097, the path for applying ground potential to the guard conductor extending to the distributor 1103, thereby to mark the finder link 1000 as busy to the distributor 1103; and completes, at the contacts 1096, a test circuit, including the contacts 1078 and 3M1 between the switch relay R1000 and the rotary magnet 3M of the finder F3. Further the test relay R1090 completes, at the contacts 1098, a test connection, including the contacts 1079, 1006 and 3M1, between the rotary magnet 3M of the finder F3, and the test wiper thereof.

At this time, ground potential appears upon the test conductor of the trunk engaged by the test wiper of the finder F3 in the event the selected busy set-up circuit is busy at this time, whereby the ground potential completes, a circuit also including the contacts 1006, 1079, 1098, and 3M1 for operating the rotary magnet 3M of the finder F3. Also the application of ground potential upon the test wiper of the finder F3 completes a substantially identical path, also including the contacts 1078 and 1096, for short-circuiting the winding of the switch relay R1000. Accordingly the rotary magnet 3M of the finder F3 operates buzzer fashion to select an idle trunk such, for example, as the trunk 1401 extending to the busy set-up circuit 1300. When the trunk 1401 extending to the idle busy set-up circuit 1300 is thus selected, battery potential via the winding of the test relay R1480 appears upon the test conductor of the trunk 1401, whereby a series parallel circuit is completed for energizing the winding of the switch relay R1000, the winding of the test relay R1480 and the rotary magnet 3M. When this series parallel circuit is completed, the switch relay R1000 operates to interrupt, at the contacts 1006, the test connection extending to the test wiper of the finder F3; and to complete, at the contacts 1005, a direct circuit, including the contacts 1078 and 1096, for energizing the winding of the test relay R1480. Accordingly at this time, the winding of the switch relay R1000 is energized in series relation with the rotary magnet 3M retaining the switch relay R1000 in its operated position and preventing operation of the rotary magnet 3M. The direct application of ground potential to the test wiper of the finder F3 and consequently to the test conductor of the trunk 1401 effects operation of the test relay R1480 in the busy set-up circuit 1300 and marks the trunk 1401 as busy to the finders of the other finder links having access thereto.

Recapitulating, when the toll selector 1100 was operated to find the first call storage trunk 1204 as a consequence of the busy condition of the three trunk lines 1201, etc., at this time, the wait relay R1125 was operated to effect operation of the distributor 1103, whereby the distributor 1103 assigned the idle finder link 1000. In the assigned finder link 1000, the finder F1 operated to find the particular toll selector 1100 occupied with the stored call and then the finder F3 operated to find the idle busy set-up circuit 1300.

Continuing now with the operation of the finder link 1000 and the busy set-up circuit 1300 as a consequence of the operation of the switch relay R1000 and the test relay R1480, the switch relay R1000 completes, at the contacts 1001, etc., connections between the various conductors in the trunk 1401 and the finder link 1000, for a purpose more fully explained hereinafter; and the test relay R1480 completes, at the contacts 1481, a circuit, including the contacts 1434, for operating the hold relay R1420. Upon operating, the hold relay R1420 completes, at the contacts 1423, a circuit for operating the slave relay R1445; and completes, at the contacts 1421, a path for applying ground potential to the release conductor 1424. The application of ground potential to the release conductor 1424 completes a path, including the contacts 1416, for applying ground potential to the release ground conductor 1691; and completes a circuit, including the contacts 1413, for operating the hold relay R1370. Also the hold relay R1420 completes, at the contacts 1422, a circuit, including the grounded release conductor 1424 and the contacts 1461, 1411, and 1361, for operating the cycle relay R1340. Upon operating the cycle relay R1340 completes, at the contacts 1341, a circuit for operating the cycle relay R1350; and upon operating the cycle relay R1350 completes, at the contacts 1351, a circuit for operating the cycle relay R1360. Upon operating, the cycle relay R1360 interrupts, at the contacts 1361, the circuit for energizing the winding of the cycle relay R1340 in order to cause the latter relay to restore shortly thereafter, it being of the slow-to-release type. Upon restoring, the cycle relay R1340 interrupts, at the contacts 1341, the circuit for energizing the winding of the cycle relay R1350 in order to cause the latter relay to restore shortly thereafter, it being of the slow-to-release type. Upon restoring, the cycle relay R1350 interrupts, at the contacts 1351, the circuit for energizing the winding of the cycle relay R1360 in order to cause the latter relay to restore shortly thereafter, it being of the slow-to-release type. Upon restoring, the cycle relay R1360 recompletes, at the contacts 1361, the circuit for operating the cycle relay R1340, whereby the cycle relays R1340, R1350 and R1360 operate and restore cyclically, in the manner described above.

Each time the cycle relay R1340 operates and then restores, it completes and then interrupts, at the contacts 1342, a path for applying ground potential to the in-pulse conductor 1693. The first application of ground potential to the in-pulse conductor 1693 effects operation of the in-pulse relay R1610, whereby the latter relay completes, at the contacts 1611, a path for applying ground potential to the conductor 1694, so as to apply ground potential via a path, including the back contacts 1515, etc., of the various counting relays R1510, etc., to the conductor 1695. The application of ground potential to the conductor 1695 completes a path, including the contacts 1627, for applying ground potential to the conductor 1696, thereby completing a path for shortening the lower winding of the counting relay R1510 to the conductor 1697, the conductor 1697 being connected via the contacts 1625 and 1634 to the release ground conductor 1691. The first removal of ground potential from the in-pulse conductor 1693 interrupts the above traced path for short-circuiting the lower winding of the counting relay R1510, whereby a substantially identical circuit is completed for energizing the lower winding of the counting relay R1510 in series with the winding of the in-pulse relay R1610 causing the counting relay R1510 to operate and the in-pulse relay R1610 to be retained in its operated position, at this time. Upon operating, the counting relay R1510 completes, at the contacts 1513, a holding circuit, including the contacts 1521 and the grounded conductor 1697, for energizing the upper winding thereof; and interrupts, at the contacts 1515, a point in the above mentioned holding circuit for energizing the lower winding of the counting relay R1510 in series with the in-pulse relay R1610. Accordingly, at this time, the counting relay R1510 is retained in its operated position and the in-pulse relay R1610 restores. Also the counting relay R1510 prepares, at the contacts 1514, a path for short-circuiting the lower winding of the counting relay R1520. In view of the above, it will be understood that the second time ground potential is applied to and then removed from the in-pulse conductor 1693, the in-pulse relay R1610 operates and effects operation of the counting relay R1520. Upon operating, the counting relay R1520 interrupts, at the contacts 1525, the holding circuit for energizing the lower winding thereof in series with the winding of the in-pulse relay R1610 in order to cause the in-pulse relay R1610 to restore; and interrupts, at the contacts 1521, the holding circuit for energizing the upper winding of the counting relay R1510 in order to cause the latter relay to restore. Accordingly the counting relays R1510, R1520, R1530, etc., are operated successively; and the operation of the successive counting relays R1520, R1530, etc., effects restoration of the preceding counting relays R1510, R1520, etc.

At the end of the transmission of the fifth ground impulse to the in-pulse relay R1610, the fifth counting relay R1550 is operated and retained in its operated position by the completion of the holding circuit for energizing the upper winding thereof, whereby a multiple path is completed for applying ground potential to the busy cut-off conductor 1595 in order to complete a circuit, including the contacts 1415, for operating the cut-off relay R1410. Upon operating the cut-off relay R1410 completes, at the contacts 1414, a holding circuit for energizing the winding thereof; and interrupts, at the contacts 1411, a point in the circuit for operating the cycle relay R1340 in order to prevent further operation of the cycle relays R1340, R1350 and R1360 at this time. Further the cut-off relay R1410 interrupts, at the contacts 1416, the connection between the grounded release conductor 1424 and the release ground conductor 1691, thereby to interrupt the holding circuit for retaining operated the fifth counting relay R1550. Also the cut-off relay R1410 interrupts, at the contacts 1413, the circuit for energizing the winding of the hold relay R1370 so as to cause the latter relay to restore shortly thereafter, it being of the slow-to-release type. Upon restoring the hold relay R1370 completes, at the contacts 1371, a multiple connection, including the contacts 1422 and 1461, between the grounded release conductor 1424 and the release ground conductor 1691 so as to return ground potential upon the release ground conductor C1691 at this time subsequent to the restoration of the fifth counting relay R1550.

Also each time the cycle relay R1360 operates and then restores, it completes and then interrupts, at the contacts 1362, a path for applying battery potential via the resistor 1363 to the busy signal conductor in the trunk 1401. Each time resistance battery potential is applied to the busy signal conductor in the trunk 1401, it is forwarded, via the contacts 1004, 1077 and 1095, to the EC conductor of the trunk 1102 and consequently to the EC conductor of the trunk 1101 and ultimately to the EC conductor of the trunk 905 extending from the repeater 700. Each time resistance battery potential is applied to the EC conductor of the trunk 905, a circuit, including the contacts 838, 893 and 955, is completed for energizing in multiple the winding of the wait relay Y800 and the lower winding of the tandem test relay R970 in order to cause the wait relay Y800 to operate, but not to cause operation of the tandem test relay R970 since the latter relay is of the marginal type. Accordingly the previously described operation of the cycle relays R1340, etc., in the busy set-up circuit 1300 effects operation and restoration of the wait relay Y800 in the repeater 700, five times in succession. Each time the wait relay Y800 operates and then restores, it completes and then interrupts, at the contacts Y1, a circuit, including the contacts 844, 811 and 955, for energizing the winding of the wait relay X800, causing the latter relay to follow. Each time the wait relay X800 operates and then restores, it interrupts and then recompletes, at the contacts X3, the normally completed path, including the contacts 773, for applying ground potential to the receiving switch conductor C707 extending to the tone unit 701, the removal of ground potential from the receiving switch conductor C707 effecting the restoration of the receiving switch relay therein so as to place the tone unit 701 in sending condition. Also each time the wait relay X800 operates and then restores, it completes and then interrupts, at the contacts X2, an alternative circuit for operating the send relay R775; and completes and then interrupts, at the contacts X1, a path, including the contacts 989, for applying battery potential via the resistor 963 to the modulation cut-off conductor C708 extending to the tone unit 701, thereby to operate the modulation cut-off relay in the tone unit 701, at this time. Accordingly, at this time, the tone unit 701 is rendered operative to send 1000 cycle current over the sending — conductor C701 and the sending + conductor C702 extending therefrom. Each time the send relay R775 operates and then restores, it completes and then interrupts, at the contacts 776, the previously traced path between the sending — conductor C701 and the sending + conductor C702 and the — and + conductors of the toll line 702, whereby a pulse of the 1000 cycle current is transmitted from the tone unit 701 via the repeater 700 over the line conductors of the toll line 702.

Accordingly, in the present example, the wait relay Y800 operates and restores five times effecting corresponding operation and restoration of the wait relay X800 and the resulting operation and restoration of the send relay R775 so that five pulses of the 1000 cycle current are transmitted over the toll line 702 and constituting a call storage signal. The above described call storage signal that is transmitted from the repeater 700 over the toll line 702 is received by the tone unit 601 in order to effect operation and subsequent restoration of the dial-in relay R580 five times in succession. Each time the dial-in relay R580 operates and then restores, it completes and then interrupts, at the contacts 582, a circuit for operating the wait relay Z500. Each time the wait relay Z500 operates and then restores, it interrupts and then recompletes, at the contacts Z1, the present connection between the upper winding of the line supervisory relay R480 and the EC conductor of the trunk 406; and completes and then interrupts at the contacts Z2, a path, including the contacts 485, for applying resistance battery potential to the EC conductor of the trunk 406; and completes and then interrupts, at the contacts Z3, a path for applying ground potential to the C conductor of the trunk 406. Also each time the wait relay Z500 operates and then restores, it completes and then interrupts, at the contacts Z4, an alternative circuit for operating the ring control relay R590, whereby the latter relay is operated and retained in its operated position during the reception of the call storage signal by the repeater 400 since the latter relay is of the slow-to-release type. Accordingly, the wait relay Z500 effects the transmission of five impulses of resistance battery potential over the EC conductor of the trunk 406 so as to cause the upper winding of the supervisory relay R270 in the toll dial circuit 200 to be partially short-circuited five times. At this point, it is again noted that the supervisory relay R270 is of the combination marginal and differential type, whereby the supervisory relay R270 operates only partially when the upper winding thereof is partially short-circuited, as noted above. Specifically the supervisory relay R270 partially operates and restores five times effecting closure and opening of only the contacts 274, thereof, whereby five ground impulses are transmitted over the sleeve conductor S of the trunk 201 extending from the first operator position circuit at the toll board 303 so as to cause five flashes of the call supervisory lamp thereat rendering to the operator call storage supervision. Since the supervisory relay R270 did not operate fully the switch relay R280 was not restored, whereby the dial at the first operator position circuit at the toll board 303 is retained connected to the cord circuit in use. When the operator mentioned receives the call storage signal, she is apprised of the circumstance that the call has been routed by one of the toll selectors 1100, etc., into the call storage circuit 1200 in the tandem exchange 20 by virtue of the busy condition of all of the trunk lines 1251, etc., extending between the tandem exchange 20 and the remote exchange 30, at this time. In the present case, the control of the dial-in relay R580 in the repeater 400 from the tone unit 601 in response to the reception of the call storage signal over the toll line 702 leaves the repeater 400 in the calling condition so that it is capable of transmitting a further digit, or digits, dialed at the first operator position circuit at the toll board 303 in the central office 10, at this time. On the other hand, as explained in Sect. 4, it will be recalled that the control of the signal-in relay R620 in the repeater 400 from the tone unit 601 in response to the reception of the end-of-dial signal or the all-trunks-busy signal, or the line busy signal over the toll line 702 changes the repeater 400 into the answering condition so that it is not capable of transmitting a further digit that might be dialed at the first operator position circuit at the toll board 303. Accordingly, in the present example, the repeater 400 is in the calling condition and the operator at the first operator position at the toll board 303 may set the busy set-up circuit 1300 to return a call on a point-to-point basis sequentially when one of the trunk lines 1251, etc., extending between the tandem exchange 20 and the remote exchange 30 becomes available merely by dialing at this time another digit identifying the first operator position circuit at the toll board 303. Specifically it may be assumed that the single digit 5 identifies the first operator position circuit at the toll board 303, whereby the operator thereat dials the single digit 5 at this time causing the line relay R430 in the repeater 400 to follow so that the tone unit 601 associated with the repeater 400 repeats the dialing signal over the toll line 701 causing the tone unit 701 to respond and repeat the present digit to the dial-in relay R880 in the repeater 700. The dial-in relay R880 repeats, at the contacts 881, the present digit over the present connection to the line relay R1140 in the toll selector 1100 causing the latter relay to follow.

Each time the line relay R1140 restores and then operates, it completes and then interrupts, at the contacts 1143, a path, including the contacts 1137, 1154 and 1124, for applying ground potential to the pulse conductor in the trunk 1102 and consequently a path, including the contacts 1007, for applying ground potential to the pulse conductor in the trunk 1401, so as to effect operation and subsequent restoration of the pulse relay R1455 in the busy set-up circuit 1300. Accordingly, at this time, the pulse relay R1455 operates and restores five times in succession effecting operation of the dial relay R1450, the latter relay operating and remaining operated during impulsing, as it is of the slow-to-release type. Also the first time the pulse relay R1455 restores, it completes, at the contacts 1456, a circuit, including the contacts 1466 and 1452, for operating the dial slave relay R1440. Upon operating the dial slave relay R1440 completes, at the contacts 1443, a holding circuit, including the contacts 1453, for energizing the winding thereof; completes, at the contacts 1444, a direct path, including the contacts 1467, for applying ground potential to the release ground conductor 1691; and completes, at the contacts 1442, an alternative circuit for operating the hold relay R1370. Upon operating, the hold relay R1370 interrupts, at the contacts 1371, the alternative path between the grounded release conductor 1424 and the release ground conductor 1691. Also each time the pulse relay R1455 operates and then restores, it completes and then interrupts, at the contacts 1457, an alternative circuit, including the contacts 1466, for applying ground potential to the in-pulse conductor 1693, so as to effect repeated operation of the in-pulse relay R1610 and sequential operation and restoration of the counting relays R1510, etc., in the manner previously explained.

In the present example, at the conclusion of the present digit 5, the fifth counting relay R1550 is retained in its operated position effecting the restoration of the in-pulse relay R1610. Also at the conclusion of the present digit 5, the line relay R1140 in the toll selector 1100 is retained in its operated position effecting the restoration of the pulse relay R1455 in the busy set-up circuit 1300. Upon restoring, the pulse relay R1455 interrupts, at the contacts 1458, the circuit for energizing the winding of the dial relay R1450 in order to cause the latter relay to restore shortly thereafter, it being of the slow-to-release type. Upon restoring, the dial relay R1450 interrupts, at the contacts 1453, the holding circuit for energizing the winding of the dial slave relay R1440 in order to cause the latter relay to restore shortly thereafter, it being of the slow-to-release type. During the time interval between the restoration of the dial relay R1450 and the restoration of the dial slave relay R1440 resistance battery potential is applied via the contacts 1451 and 1444 to the conductor 1381 completing a series circuit for energizing the lower winding of the marking relay R1315 and the upper winding of the marking relay R1325; this circuit, also including the contact 1552 of the operated fifth counting relay R1550 as well as the grounded conductor 1697. Accordingly, in the present example, the marking relays R1315 and R1325 are operated completing, at the respective contacts 1316 and 1326, paths for applying ground potential to the X and Z conductors in the cable 1301 extending to the registers 1501, the application of ground potential to the X and Z conductors mentioned constituting the marking of the digit 5 to the registers 1501, whereby the digit 5 is registered in the registers 1501.

Upon the restoration of the dial slave relay R1440, the above traced path for applying battery potential to the conductor 1381 is interrupted, at the contacts 1441, so as to bring about the restoration of the marking relays R1315 and R1325. Also upon restoring, the dial slave relay R1440 interrupts, at the contacts 1444, the path for applying ground potential to the release ground conductor 1691 so as to bring about the restoration of the fifth counting relay R1550; and interrupts, at the contacts 1442, the circuit for energizing the winding of the hold relay R1370 so as to cause the latter relay to restore shortly thereafter, it being of the slow-to-release type. Upon restoring, the hold relay R1370 recompletes, at the contacts 1371, the previously traced connection between the grounded release conductor 1424 and the release ground conductor 1691.

At this time, the operator, at the first operator position circuit at the toll board 303 takes down the cord circuit to the jack terminating the trunk 201 so as to bring about the release of the toll dial circuit 200, the toll selector 203, the repeaters 400 and 700, and the incoming toll selector 1008 in a manner substantially identical to that explained in Sect. 4. However, the toll selector 1100 is retained in its operated position together with the finder link 1000 and the busy set-up circuit 1300 at this time. More particularly, when the incoming toll selector 1008 is released, the line relay R1140 in the toll selector 1100 restores interrupting, at the contacts 1142, the circuit for energizing the winding of the hold relay R1145 in order to cause the latter relay to restore shortly thereafter, it being of the slow-to-release type. Upon restoring, the hold relay R1145 interrupts, at the contacts 1146, the circuit for energizing the winding of the hold relay R1150; however, the latter relay being of the slow-to-release type does not restore at this time. Also upon restoring, the hold relay R1145 completes, at the contacts 1147, a path, including the contacts 1137, for applying ground potential to the release conductor of the trunk 1102, thereby to complete a path, including the contacts 1019 and 1001, for applying ground potential to the release and start conductor of the trunk 1401 so as to complete a circuit, including the contacts 1412 and 1464, for energizing the lower winding of the release R1460 in the busy set-up circuit 1300, causing the latter relay to operate. Upon operating, the release relay R1460 completes, at the contacts 1462, a holding circuit for energizing the upper winding thereof; interrupts, at the contacts 1461, the normal connection between the grounded release conductor 1424 and the release ground conductor 1691; interrupts, at the contacts 1464, a further point in the circuit for energizing the lower winding thereof; interrupts, at the contacts 1466, a further point in the circuit for operating the dial slave relay R1440; and interrupts, at the contacts 1467, a further point in the alternative path for applying ground potential to the release ground conductor 1691. Also the release relay R1460 completes, at the contacts 1465, a path for applying ground potential via the contacts 1432 and the lower winding of the series relay R1470 to the — line conductor of the trunk 1401, thereby to complete a circuit, including the contacts 1003 and 1131, for energizing the lower winding of the series relay R1470 in series with the upper winding of the line relay R1140 causing the relays mentioned to operate. Upon operating, the line relay R1140 interrupts, at the contacts 1143, the path for applying ground potential to the pulse conductor of the trunk 1102; and consequently the path for applying ground potential to the pulse conductor of the trunk 1401 so as to effect the restoration of the pulse relay R1455 in the busy set-up circuit 1300. Further the line relay R1140 recompletes, at the contacts 1142 the circuit for reoperating the hold relay R1145, whereby the latter relay interrupts, at the contacts 1147, the path for applying ground potential to the release conductor of the trunk 1102 and consequently to the release and start conductor of the trunk 1401. Accordingly, it will be understood that the line relay R1140 is reoperated, as described above, effecting reoperation of the hold relay R1145 prior to restoration of the hold relay R1150, whereby the relays mentioned are retained in their operated positions at this time.

Now when one of the trunk lines extending between the tandem exchange 20 and the remote office 30 becomes idle, further operation of the toll selector 1100 that is now camping upon the first call storage trunk 1204 is initiated. Assuming that the trunk line 1251 extending between the tandem exchange 20 and the remote office 30 becomes idle at this time, the busy relay R1210 associated with the first trunk 1201 is restored interrupting, at the contacts 1211, the circuit for energizing the winding of the busy relay R1230 in series with winding of the wait relay R1125, whereby the wait relay R1125 restores immediately and the busy relay R1230 restores shortly thereafter, it being of the slow-to-release type. Upon restoring, the wait relay R1125 in the toll selector 1100 interrupts, at the contacts 1126, the circuit for energizing the winding of the distributor start relay R1120 in order to cause the latter relay to restore shortly thereafter, it being of the slow-to-release type. Further the wait relay R1125 recompletes, at the contacts 1127, the previously traced circuit for operating the rotary magnet M1183, whereby the wiper carriage of the Strowger mechanism is driven an additional step or steps in the rotary direction in search of the idle first trunk 1201 at this time. When the wiper set engages the contact set in the associated level terminating the first trunk 1201, the switch relay R1130 operates effecting reoperation of the busy relay R1210 in the manner explained in Sect. 5. More particularly, the busy relay R1210 reoperates in order to recomplete, at the contacts 1211, the previously traced connection between the winding of the busy relay R1230 and the + conductor of the first storage trunk 1204 so that the first storage trunk 1204 is again conditioned to store a call as all three of the trunk lines 1251, etc., extending between the tandem exchange 20 and the remote office 30 are again rendered busy.

At this time, the operated switch relay R1130 switches through the toll selector 1100, whereby the trunk circuit 1250 is controlled to effect the seizure of the dial and ring-down trunk circuit 1260 over the trunk line 1251 so as to mark the dial and ring-down circuit 1260 as busy to the toll board 1270 in the remote office 30, in the manner explained in Sect. 5. Also upon operating, the switch relay R1130 completes, at the contacts 1138, a path for applying ground potential to the cut-in conductor of the trunk 1102, thereby to complete a circuit, including the contacts 1094, 1063 and 1017 for operating the start relay R1020 in the finder link 1000. Upon operating, the start relay R1020 completes, at the contacts 1022, a test connection, including the contacts 2M1, between the winding of the switch relay R1010 and the rotary magnet 2M of the finder F2; and completes, at the contacts 1023, another test connection, including the contacts 2M1 and 1015, between the rotary magnet 2M and the C wiper of the finder F2. The subsequent operation of the finder F2 depends upon the idle or busy condition of the trunk that is selected thereby and extending to one of the repeaters 700, etc. More particularly in the event the selected trunk mentioned is busy, ground potential appears upon the C conductor thereof, short-circuiting the winding of the switch relay R1010 and completing a direct circuit for operating the rotary magnet 2M, whereby the rotary magnet 2M operates buzzer fashion by virtue of the contacts 2M1 in search of an idle trunk extending to one of the repeaters 700, etc.

Assuming that the trunk 906 extending to the repeater 700 is the first idle trunk that is encountered by the finder F2, when the trunk 906 is thus selected, the switch relay R1010 operates in order to interrupt, at the contacts 1015, the circuit for operating the rotary magnet 2M of the finder F2 so as to arrest further operation thereof. Also the switch relay R1010 interrupts, at the contacts 1017, the circuit for energizing the winding of the start relay R1020 in order to cause the latter relay to restore shortly thereafter, it being of the slow-to-release type. Also the switch relay R1010 completes, at the contacts 1016, a multiple holding circuit, including the contacts 2M1, for energizing the winding thereof in series with the rotary magnet 2M so that the switch relay R1010 is retained in its operated position without further operation of the rotary magnet 2M. Further the switch relay R1010 completes, at the contacts 1016 and 1014, a path for applying direct ground potential to the C conductor of the trunk 906 in order to bring about the operation of the release relay R920 in the repeater 700 and the consequent seizure thereof over the trunk 906. Further the switch relay R1010 completes, at the contacts 1011, a connection, including the contacts 1071 and 1026, between the − conductor of the trunk 906 and the dial − conductor of the trunk 1401; and completes, at the contacts 1012, a connection, including the contacts 1056 and 1073, between the + conductor of the trunk 906 and the dial + conductor of the trunk 1401. At this time, the − and + conductors of the trunk 906 are connected via the contacts 981, 983 and 922, respectively to battery and ground potentials via the lower and upper windings of the line relay R930 in the repeater 700; and the dial − and dial + conductors of the trunk 1401 are connected together in the sender 1500 via the contacts 1435 and 1469. Accordingly at this time, a direct impulsing loop is completed in the sender 1500 to the line relay R930 in the repeater 700 causing the latter relay to operate.

Further the switch relay R1010 completes, at the contacts 1013, a multiple path, including the contacts 1091, for applying ground potential to the C conductor of the trunk 1101 in order to retain operated the switch relay R1130 in the toll selector 1100; and completes, at the contacts 1018, a path, including the contacts 1001 for applying ground potential to the release and start conductor of the trunk 1401. The application of ground potential to the release and start conductor in the trunk 1401 completes a circuit, including the contacts 1412, 1463 and 1471, for operating the send-start relay R1430 in the busy set-up circuit 1300, at this time. When the line relay R930 and the release relay R920 in the repeater 700 are operated, the associated tone unit 701 is controlled in order to bring about the sending over the toll line 702 of the seizure signal in a manner explained in Sect. 7, whereby the tone unit 601 causes the repeater 400 to seize the associated incoming toll selector 308 over the trunk 405, whereby the incoming toll selector 308 is conditioned to respond to a digit transmitted over the toll line 702, at this time.

Upon operating, the send-start relay R1430 in the busy set-up circuit 1300 completes, at the contacts 1431, an alternative path for applying ground potential to the release conductor 1424; completes, at the contacts 1433, an alternative path for applying ground potential to the release ground conductor 1691; and interrupts, at the contacts 1435, one of the multiple connections between the send-pulse conductors 1601 and 1602. However, the send-pulse conductors 1601 and 1602 are bridged together at this time at the impulsing contacts 1681 of the cycle relay R1680 thereby to retain the bridge connection across the dial − and dial + conductors in the trunk 1401. Further the send-start relay R1430 interrupts, at the contacts 1432, a further point in the circuit for energizing the lower winding of the series relay R1470 in series with the upper winding of the line relay R1140 in the toll selector 1100; and interrupts, at the contacts 1434, the circuit for energizing the winding of the hold relay R1420 in order to cause the latter relay to restore shortly thereafter, it being of the slow-to-release type. Upon restoring, the hold relay R1420 interrupts, at the contacts 1423, the circuit for energizing the winding of the slave relay R1445 in order to cause the latter relay to restore shortly thereafter, it being of the slow-to-release type. Upon restoring, the slave relay R1445 completes, at the contacts 1447, a connection between the start conductor 1603 and the hold conductor 1425; and completes, at the contacts 1446, a connection between the hold conductor 1425 and the cut-in conductor of the trunk 1401. At this time ground potential in the registers 1501 is applied to the hold conductor 1425 by virtue of the registration of the digit 5 in the registers 1501, whereby ground potential is applied to the start conductor 1603 and to the cut-in conductor of the trunk 1401. The application of ground potential to the cut-in conductor of the trunk 1401 completes a circuit, including the contacts 1002 and 1029, for energizing the lower winding of the stop-send relay R1025 in the finder link 1000 in order to cause the latter relay to operate through its first step, to complete, at the contacts 1028, a path, including the contacts 1013, for short-circuiting the upper winding thereof, the stop-send relay R1025 operating only through its first step at this time since it is of the two-step type. The application of ground potential to the start conductor 1603 completes a circuit, including the contacts 1661, for operating the cycle relay R1670, whereby the latter relay upon operating completes, at the contacts 1671, a holding circuit, including the contacts 1661, for energizing the winding thereof. Also the cycle relay R1670 completes, at the contacts 1672, a circuit for operating the cycle relay R1680. Upon operating, the cycle relay R1680 completes, at the contacts 1682, a circuit for operating the cycle relay R1660; whereby the latter relay upon operating interrupts, at the contacts 1661, the holding circuit for energizing the winding of the cycle relay R1670. Upon restoring, the cycle relay R1670 interrupts, at the contacts 1672, the circuit for retaining operated the cycle relay R1680, whereby the cycle relays R1670, R1680 and R1160 operate cyclically, in the manner described above.

Each time the cycle relay R1680 operates and then restores, it interrupts and then recompletes, at the contacts 1681, the bridge connection between the send-pulse conductors 1601 and 1602, whereby an impulse is transmitted over the connection to the line relay R930 in the repeater 700 so that the tone unit 701 transmits an impulse in the dialing signal over the toll line 702, whereby the repeater 400 controls the operation of the incoming toll selector 308, in the manner explained in Sect. 7. Also each time the cycle relay R1680 operates and then restores, it completes and then interrupts, at the contacts 1683, a connection between the release ground conductor 1691 and the in-pulse conductor 1693, whereby the in-pulse relay R1610 is operated repeatedly so as to effect sequential operation of the counting relays R1510, etc., in the manner previously explained.

At the conclusion of the transmission of the fifth impulse of the present digit 5, the fifth counting relay R1550 is operated completing, at the contacts 1556, a connection between the fifth marking conductor M5 extending from the registers 1501 and the winding of the digit stop relay R1620 in the sender 1500, this connection, including the contacts 1468; whereby the digit stop relay R1620 is operated by virtue of the circumstance that ground potential appears upon the fifth marking conductor M5 in the registers 1501 since the digit 5 is registered therein. Upon operating, the digit stop relay R1620 completes, at the contacts 1622, a holding circuit, including the contacts 1651 and the release ground conductor 1691, for energizing the lower winding thereof; and completes, at the contacts 1621, an auxiliary bridge between the send pulse conductors 1601 and 1602 so as to terminate the transmission of impulses to the line relay R930 in the repeater 700 and consequently to complete the transmission of the present digit 5 registered in the registers 1501. Also the digit stop relay R1620 interrupts, at the contacts 1625, the path for connecting the release ground conductor 1691 to the conductor 1697, thereby to interrupt the holding circuit for retaining operated the fifth counting relay R1550; and completes, at the contacts 1624, a path, including the contacts 1634 and 1654, between the release ground conductor C1691 and the out-guard conductor 1692 extending to the registers 1501, whereby the registers 1501 are tested in order to determine whether there are other digits registered therein. In the present example, since only the single digit 5 is registered in the registers 1501, the registers 1501 operates to remove ground potential from the hold conductor 1425 in the cable 1301 and to clear the registered digit 5 therefrom. When ground potential is removed from the hold conductor 1425, further operation of the cycle relays R1670, R1680 and R1660 is arrested and ground potential is removed from the cut-in conductor of the trunk 1401, whereby the stop-send relay R1025 in the finder link 1000 operates through its second step. Thus operating, the stop-send relay R1025 interrupts, at the contacts 1026, a normally completed path around the resistor 1064, whereby the resistor 1064 is inserted in series relation with the upper and lower windings of the line relay R930 in the repeater 700; and completes, at the contacts 1027, a connection between the winding of the end-dial relay R1030 and EC conductor of the trunk 906.

Recapitulating, the sender 1500 is operated in order to cause the single digit 5 to be sent from the repeater 700 to the repeater 400, whereby the incoming toll selector 308 is operated to select the group of trunks, including the trunk 302, and then operates to select an idle trunk in the group mentioned. For example, the incoming toll selector 308 may select the particular trunk 302 extending to the toll trunk circuit 300, the toll trunk circuit 300 terminating the trunk 301 that is terminated before the first operator position circuit at the toll board 303. When the incoming toll selector 308 thus operates to select the trunk 302, the seize relay R380 in the toll trunk circuit 300 is operated and a moment later the ring relay R330 is operated by the application of resistance battery potential to the + conductor of the trunk 302 as a consequence of the operation of the ring relay R535 in the repeater 400. Upon operating, the ring relay R330 completes, at the contacts 332, a circuit, including the contacts 346, for energizing the upper winding of the control relay R325 in order to cause the latter relay to operate. Upon operating, the control relay R325 completes, at the contacts 326, a holding circuit, including the contacts 348 and 387, for energizing the lower winding thereof; and completes, at the contacts 327, a multiple path, including the contacts 314 and 348, for applying battery potential to the lamp conductor of the trunk 301 so as to light the call lamp at the first operator position circuit at the toll board 303 so as to indicate to the operator thereat the presence of a call upon the trunk 301.

Also when the incoming toll selector 308 operates to select the trunk 302, the repeater 400 is operated to return the end-of-dialing signal over the trunk line 702 to the repeater 700, in the manner explained in Sect. 7, whereby the repeater 700 is controlled to return ground potential over the EC conductor of the trunk 906 causing operation of the end-dial relay R1030 in the finder link 1000. Upon operating, the end-dial relay R1030 completes, at the contacts 1034, a circuit for operating the control relay R1035, whereby the latter relay completes, at the contacts 1037, a circuit for operating the control relay R1040. Moreover the end-dial relay R1030 completes, at the contacts 1032, a circuit, including the contacts 1051 and 1047, for energizing the upper winding of the count relay R1045 causing the latter relay to operate through its first step in order to complete, at the contacts 1049, a substantially identical path for short-circuiting the lower winding thereof, the count relay R1045 being of the two-step type. Also upon operating, the end-dial relay R1030 completes, at the contacts 1033, a circuit, including the contacts 1013, for operating the switch relay R1070, whereby the latter relay completes, at the contacts 1075, a substantially identical holding circuit for energizing the winding thereof. Also upon operating, the switch relay R1070 disconnects, at the contacts 1071 and 1073, the — and + conductors of the trunk 906 form the dial — and dial + conductors of the trunk 1401; and completes, at the contacts 1072 and 1074, connections between the — and + conductors of the trunk 906 and the — and + conductors of the trunk 1101. Accordingly at this time, the — and + conductors of the trunk 906 extending to the repeater 700 are connected to the — and + conductors of the first trunk 1201 extending to the trunk circuit 1250 completing an operative connection therebetween. Further the switch relay R1070 interrupts, at the contacts 1078, the circuit for retaining operated the switch relay R1000, whereby the latter relay interrupts, at the contacts 1001, etc., the connections between the finder link 1000 and the conductors in the trunk 1401 so as to bring about the release of the test relay R1480 and the send-start relay R1430 in the busy set-up circuit 1300. Upon restoring, the send-start relay R1430 interrupts, at the contacts 1431, the application of ground potential to the release conductor 1424, whereby the release relay R1460 and the digit stop relay R1620 are restored. At this time, the busy set-up circuit 1300 as well as the associated sender 1500 are completely released and available for further use, the trunk 1401 being marked as idle to the finders of the various finder links 1000, etc., having access thereto by the application of battery potential via the winding of the test relay R1480 to the test conductor of the trunk 1401.

When the operator at the first position circuit at the toll board 303 answers the call by connecting the answer plug of a cord circuit to the jack terminating the trunk 301, the previously traced circuit for operating the sleeve relay R360 in the toll trunk circuit 300 via the sleeve of the trunk 301 is completed, whereby the sleeve relay R360 effects operation of the prepare relay R340. Upon operating, the prepare relay R340 interrupts, at the contacts 344, the path for applying ground potential to the EC conductor of the trunk 302, whereby the repeater 400 is controlled in order again to cause the tone unit 601 to transmit an answer signal over the toll line 702 so that the tone unit 701 controls the repeater 700 to bring about the removal of ground potential with respect to the EC conductor of the trunk 906, causing the end-dial relay R1030 in the finder link 1000 to restore. Upon restoring, the end-dial relay R1030 interrupts, at the contacts 1032, the path for short-circuiting the lower winding of the count relay R1045, thereby a circuit, including the contacts 1041 and 1049, is completed for energizing the upper and lower windings of the count relay R1045 in series circuit relation thereby to cause the latter relay to operate through its second step, the count relay R1045 being of the two-step type. Also upon restoring the end-dial relay R1030 interrupts, at the contacts 1034, the circuit for energizing the winding of the control relay R1035, whereby the latter relay restores shortly thereafter, it being of the slow-to-release type. Upon restoring, the control relay R1035 completes, at the contacts 1036, a circuit, including the contacts 1031, 1046 and 1062, for operating the ring relay R1055. Also upon restoring, the control relay R1035 interrupts, at the contacts 1037, the circuit for energizing the winding of the control relay R1040 in order to cause the latter relay to restore shortly thereafter, it being of the slow-to-release type. Upon restoring, the control relay R1040 interrupts, at the contacts 1041, the holding circuit for energizing in series relation the upper and lower windings of the count relay R1045 in order to cause the latter relay to restore. Upon restoring, the count relay R1045 interrupts, at the contacts 1046, the circuit for energizing the winding of the ring relay R1055 in order to cause the latter relay to restore shortly thereafter, it being of the slow-to-release type. Accordingly the ring relay R1055 is operated and then restored after a short time interval, whereby the ring relay R1055 completes and then interrupts, at the contacts 1057, a path for applying battery potential by way of the resistor 1065 and the contacts 1074 and 1081 to the + conductor of the trunk 1101, which battery potential is forwarded via the toll selector 1100 and the + conductor of the first trunk 1201 into the trunk circuit 1250 in order to cause the trunk circuit 1250 to ring-down the dial and ring-down trunk circuit 1260 over the trunk line 1251 extending between the tandem exchange 20 and the remote office 30 so that the dial and ring-down trunk circuit 1260 illuminates the call lamp at the toll board 1270 over the incoming trunk 1262 indicating to the operator at the toll board 1270 the presence of a call waiting to be answered upon the trunk 1262.

When the operator at the toll board 1270 answers the present call by connecting the answer plug of a cord circuit to the jack terminating the trunk 1262 the dial and ring-down trunk circuit 1260 is controlled in order to govern the trunk circuit 1250 over the trunk line 1251 so that ground potential is applied to and then removed from the EC conductor of the first trunk 1201 to bring about the operation and subsequent restoration of the re-ring relay R1080 in the finder link 1000, the circuit for operating the re-ring relay R1080, including the contacts 1076 and 1095, the EC conductor of the trunk 1101, the contacts 1122 and 1139, and the EC conductor of the first trunk 1201. Accordingly the re-ring relay R1080 operates and then restores, completing and then interrupting, at the contacts 1082, a path for applying battery potential via the resistor 1065 and the contacts 1074, 1056 and 1012 to the + conductor of the trunk 906 extending to the repeater 700 so as to effect operation of the re-ring relay R900 in series circuit relation with the pad control relay R790. This operation of the re-ring relay R900 causes the tone unit 701 associated with the repeater 700 to transmit an answer signal over the toll line 702, whereby the tone unit 601 controls the signal-in relay R620 in the repeater 400 causing the latter relay to operate and then restore. The operation and subsequent restoration of the signal-in relay R620 operates the ring control relays R560, R550 and R540 and the ring relay R535 through a cycle, whereby the ring relay R535 completes and then interrupts, at the contacts 537, a path for applying battery potential via the resistor 536′ to the + conductor of the trunk 405 and consequently to the + conductor of the trunk 302 so as to effect operation and subsequent restoration of the ring relay R330 in the toll trunk circuit 300. Upon operating, the ring relay R330 completes, at the contacts 332, a multiple path, including the contacts 347, the winding of the re-ring relay R350, the resistor 353, and the contacts 371 and 312 for applying ground potential to the sleeve conductor of the trunk 301, in order to effect illumination of the answer supervisory lamp at the first operator position at the toll board 303. In this circuit, the re-ring relay R350 operates, completing at the contacts 352 a circuit, including the 120 impulses per minute conductor 333, for operating the re-ring relay R370, whereby the latter relay operates and restores 120 times per minute. Each time the re-ring relay R370 operates, it completes, at the contacts 372, a substantially identical holding circuit, also including the resistor 354, for retaining the re-ring relay R350 in its operated position; and interrupts, at the contacts 371 and 373, the connection of ground potential via the winding of the re-ring relay R350 to the sleeve conductor of the trunk 301. Each time the re-ring relay R370 restores, it interrupts, at the contacts 372, the holding circuit, including the resistor 354, for energizing the winding of the re-ring relay R350 and recompletes, at the contacts 371 and 373, the connection of ground potential via the winding of the re-ring relay R350 to the sleeve conductor of the trunk 301. Accordingly low and high resistance ground potential is applied alternately to the sleeve conductor of the trunk 301 during the short time interval that the ring relay R330 occupies its operated position, whereby the answer supervisory lamp at the first operator position at the toll board 303 is flashed at a rate of 120 times a minute during the short time interval noted and constituting an answer signal to the operator at the first operator position at the toll board 303, the answer supervisory lamp being extinguished at the end of the answer signal.

At this time, an established connection is completed on a point-to-point basis between the first operator position circuit at the toll board 303 in the central office 10 and the operator position circuit at the toll board 1270 in the remote office 30, the point-to-point connection being set-up automatically by the operation of the toll selector 1100 followed by the operation of the finder link 1000 under the control of the busy set-up circuit 1300 and the associated sender 1500 in the manner explained above.

The operator at the first operator position at the toll board 303 advises the operator at the position circuit at the toll board 1270 of the extension of the connection. At the conclusion of the established connection, the operator at the position circuit at the toll board 1270 may take down the cord circuit in use in order again to cause the dial and ring-down trunk circuit 1260 to control the trunk circuit 1250 over the trunk line 1251, whereby the trunk circuit 1260 returns ground potential upon the EC conductor of the first trunk 1201 effecting reoperation of the re-ring relay R1080 in the finder link 1000, whereby the re-ring relay R900 in the repeater 700 is controlled to cause the tone unit 701 to return a disconnect signal over the trunk line 702 in the manner previously explained. When the disconnect signal is thus returned over the toll line 702, the tone unit 601 effects operation of the signal-in relay R620 in the repeater 400, whereby the ring control relays R560, etc., are operated through repeated cycles so that the ring relay R330 in the toll trunk circuit 300 is operated and restored bringing about cyclic flashing of the answer supervisory lamp at the first operator position circuit at the toll board 303, in the manner explained above. Upon receiving the disconnect signal, the operator at the first operator position at the toll board 303 takes down the connection to the jack terminating the trunk 301 bringing about the restoration of the sleeve relay R360 and the subsequent restoration of the prepare relay R340 in the toll trunk circuit 300 so that ground potential is returned, at the contacts 344, via the contacts 384, to the EC conductor of the trunk 302, so as to govern the supervisory relay R610 in the repeater 400, whereby the tone unit 601 operates to return the disconnect signal over the toll line 702 effecting operation of the tone unit 701 so that the signal-in relay R720 in the repeater 700 is operated so that the supervisory relay R830 is controlled to return a series of ground impulses over the EC conductor of the trunk 906 effecting corresponding operation and restoration of the end-dial relay R1030 in the finder link 1000. The first time the end-dial relay R1030 is operated and then restored, the count relay R1045 is operated sequentially through its first and second steps. The second operation and restoration of the end-dial relay R1030 effects operation of the count relay R1050 through its first and second steps in a substantially identical manner; and the third operation and restoration of the end-dial relay R1030 effects operation of the release relay R1060 through first and second steps, in a substantially identical manner; the count relays R1045 and R1050 and the release relay R1060 being of the two-step type. When the release relay R1060 operates through its second step, it completes, at the contacts 1061, a holding circuit, including the contacts 1013, for energizing in series the upper and lower windings thereof; and interrupts, at the contacts 1063, the holding circuit for retaining operated the switch relay R1010. Upon restoring, the switch relay R1010 interrupts, at the contacts 1013, the path for applying ground potential to the C conductor of the trunk 906; and interrupts, at the contacts 1011 and 1012, the connection to the − and + conductors of the trunk 906 so as to effect the release of the repeater 700. Also upon restoring, the switch relay R1010 interrupts, at the contacts 1013, the holding circuit for retaining operated the stop-send relay R1025, the release relay R1060, the switch relay R1070, and the test relay R1090, whereby the finder link 1000 is completely released at this time removing ground potential from the C conductor of the trunk 1101 so as to effect the complete release of the toll selector 1100, in the manner previously explained so that the first trunk 1201, the trunk circuit 1250 and the dial and ring-down trunk circuit 1260 are completely released at this time.

The release of the finder link 1000 brings about the release of the repeater 700; and incident to the release of the repeater 700, the tone unit 701 returns a release signal over the toll line 702 in order to control the tone unit 601 so as to bring about the release of the repeater 400 and the consequent release of the toll selector 308, whereby the toll trunk circuit 300 is completely released in the manner previously explained. At this time, the established connection that was automatically set-up by the toll selector 1100, the finder link 1000 and the busy set-up circuit 1300 upon a point-to-point basis between the first operator position circuit at the toll board 303 in the central office 10 and the operator position circuit at the toll board 1270 in the remote office 30 is completely released and the apparatus involved is available for further use.

Reconsidering the operation of the toll selector 1100 and the finder link 1000 incident to the extension of the call from the first operator position circuit at the toll board 303 in the central office 10 to the operator position circuit at the toll board 1270 in the remote office 30, and again assume that the toll selector 1100 selected the first storage trunk 1204 as a result of the busy condition of all of the three trunk lines 1251, etc., extending between the tandem exchange 20 and the remote office 30 causing the distributor 1103 to assign the finder 1000, in the manner explained above. Also it may be again assumed that the finders F1 and F2 of the finder link 1000 again select the toll selector 1100 and the busy set-up circuit 1300, whereby the sender 1500 operates to bring about the return of the call storage signal over the connection to the first operator position circuit at the toll board 303 in the central office 10. At this time, the operator at the first operator position circuit at the toll board 303 may not desire to have the toll selector 1100 and the finder link 1000 set-up the call subsequently on a point-to-point basis back to the first operator position circuit at the toll board 303; whereupon the operator at the first operator position at the toll board 303 merely takes down the connection to the trunk 201 without dialing the digit 5 identifying the first operator position circuit at the toll board 303, whereby no digit is registered in the registers 1501 individual to the busy circuit 1300. In this case, the toll dial circuit 200, the toll selector 203, the repeaters 400 and 700, and the incoming toll selector 1008 are released in the manner previously explained. However, the toll selector 1100 and the busy set-up circuit 1300 are retained in their operated positions as previously explained. Subsequently when one of the trunk lines 1251, etc., extending between the tandem exchange 20 and the remote office 30 becomes available, the toll selector 1100 operates to select the corresponding trunk 1201, etc., causing the finder F2 of the link 1000 to select an idle one of the repeaters 700, etc., whereupon the sender 1500 is conditioned to send a digit registered therein. However in the present example, since there is no digit register in the sender 1500, the stop-send relay R1025 in the finder link 1000 is immediately operated and the busy set-up circuit 1300, the sender 1500 and the registers 1501 are released. At this time, the toll selector 1100, the finder link 1000, the repeater 700, the repeater 400 and the incoming toll selector 308 occupy their operated positions, but no digit was ever sent into the repeaters 700 to be repeated over the toll line 702 to the repeater 400 and thence to the incoming toll selector 308. Accordingly the repeater 700 is in effect falsely seized causing false seizure of the repeater 400. Now in the event a digit is not received by the repeater 400 after seizure thereof within thirty seconds, a circuit, including the false seizure conductor C517, is completed for bringing about operation of the answer supervisory relay R490 and the consequent operation of the release relay R420, whereby the release relay R420 effects operation of the release pulse time relays R435 and R440 so that the repeater 400 returns a release signal over the toll line 702 to the repeater 700, whereby the repeaters 400 and 700 are released effecting the release of the finder link 1000, the toll selector 1100, the trunk circuit 1250, and the dial and ring-down trunk circuit 1200, in the manner previously explained.

Again reconsidering the operation of the toll selector 1100 in conjunction with the storage of the call in the call storage circuit 1200 in the tandem exchange 20, it may occur that while the call on the toll selector 1100 is stored in the first call storage trunk 1204 another call on another toll selector is stored on the second call storage trunk 1205, and still another call on a further toll selector is stored on the third call storage trunk 1206. In this case, when one of the trunk lines 1251, etc., becomes available, the additional operation of the toll selector 1100 is initiated in the manner previously explained, whereby the busy relay R1230 individual to the first call storage trunk 1204 restores during the searching time of the toll selector 1100. Upon restoring, the busy relay R1230 interrupts, at the contacts 1231, the circuit for retaining energized the busy relay R1235 associated with the second call storage trunk 1205, whereby the latter relay restores after a short time interval, it being of the slow-to-release type, to bring about additional operation of the other toll selector. The restoration of the busy relay R1235 brings about the restoration of the busy relay R1240 so as to effect additional operation of the further toll selector. Now in the present example, the toll selector 1100 finds the available trunk line 1251, etc., reconditioning the busy relay R1230 for reoperation; the other toll selector finds the first storage trunk 1204 effecting reoperation of the busy relay R1230 so that the further toll selector finds the second storage trunk effecting reoperation of the busy relay R1235.

In view of the foregoing, it will be understood that the calls respectively stored on the first call storage trunk 1204, the second call storage trunk 1205, and the third call storage trunk 1206 are respectively advanced one step so that the call that was on the first call storage trunk 1204 is completed to the available trunk 1201, etc., and so that the calls respectively stored on the second and third call storage trunks 1205 and 1206 are respectively advanced into storage on the respective first and second call storage trunks 1204 and 1205. Thus the arrangement insures that when a number of calls are in storage in the call storage circuit 1200 that the calls that are in storage will be advanced in sequence preserving the order of storage thereof for future assignment to the trunks 1201, etc., as they become available.

In the foregoing description of the operation of the sender 1500 in conjunction with the registers 1501, it was assumed that only a single digit is required by one of the incoming toll selectors 308, etc., for the purpose of subsequently setting up the connection on a point-to-point basis from the toll selector 1100 and the finder link 1000 back to the first operator position circuit at the toll board 303 in the central office 10, whereby it was assumed that the designation of the first operator position circuit at the toll board 303 comprised the single digit 5. However, it may occur that the incoming toll selector 308 requires two digits to select an idle one of the toll trunk circuits 300, etc., whereby in this event the designation of the first operator position circuit at the toll board 303 would comprise two corresponding digits such, for example, as the digits 5 and 1. In the latter case, when the operator at the first operator position circuit at the toll board 303 receives the call storage signal, she merely dials the two digits 5 and 1, whereby the two digits are repeated between the repeaters 400 and 700, causing the line relay R1140 in the toll selector 1100 to repeat the two digits into the busy set-up circuit 1300 and thus into the registers 1501, etc., in the manner previously explained. Subsequently, when the sender 1500 is conditioned to send the digit, or digits, registered in the registers 1501, it operates in a manner substantially identical to that previously explained to send the two digits 5 and 1 via the finder link 1000 to the repeater 700 so that the two digits are repeated over the toll line 702 to the repeater 400 and are thence repeated to the incoming toll selector 308 in order to bring about operation thereof to select an idle one of the toll trunk circuits 300, etc., in the manner previously explained. In other words, the operation of the sender 1500 to send one or a plurality of the digits that are registered in the registers 1501, etc., is entirely conventional and it should be appreciated that the number of digits that are required to designate the first operator position circuit at the toll board 303 is dependent entirely upon the character of the switch train, including the incoming toll selector 308, and does not in any way affect the principle of operation of the sender 1500 to send all of the registered digits and then to become released, in the manner previously explained.

*Sec. 9.—Conclusions*

In view of the foregoing, it is apparent that an improved toll switching telephone system has been provided that comprises automatic toll call storage and switching apparatus in a tandem exchange of the system, that is operative automatically to set-up toll connections on a point-to-point basis from the tandem exchange to a terminating office and from the tandem exchange to an originating office.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a first office provided with a first operator switchboard, a second office provided with a second operator switchboard, a tandem exchange provided with register and switching apparatus, toll lines extending between said first office and said tandem exchange, trunk lines extending between said second office and said tandem exchange, means for extending a first connection from said first switchboard over an idle one of said toll lines to said apparatus, means for registering in said apparatus a call to said second switchboard from said first switchboard, means for releasing said first connection, means whereby said three last-mentioned means are controllable from said first switchboard, means for operating said apparatus to extend a second connection therefrom over an idle one of said trunk lines to said second switchboard, means for operating said apparatus to extend a third connection therefrom over an idle one of said toll lines to said first switchboard, and means whereby said two last-mentioned means are controllable by said registration in said apparatus.

2. The telephone system set forth in claim 1, and further comprising means controlled by the extension of said third connection for signalling thereover, first answer equipment at said first switchboard for answering on said third connection, means controlled by answering on said third connection for signalling over said second connection, second answer equipment at said second switchboard for answering on said second connection, and means controlled by answering on said second connection for returning an answer signal over said third connection to said first switchboard.

3. In a telephone system, a first office provided with a first station, a second office provided with a second station, a tandem exchange provided with switching apparatus and storage equipment, a first group of trunks extending between said first office and said tandem exchange, a second group of trunks extending between said second office and said tandem exchange, means for extending a first connection from said first station over an idle trunk in said first group to said switching apparatus, means for initiating operation of said switching apparatus, means whereby said two last-mentioned means are controllable from said first station, means governed by an idle condition of a trunk in said second group for controlling operation of said switching apparatus to extend a second connection therefrom over an idle trunk in said second group to said second station and governed by a busy condition of all of the trunks in said second group for controlling operation of said switching apparatus to extend a third connection therefrom to said storage equipment, means governed by operation of said switching apparatus to extend said second connection for operatively interconnecting said first and second connections and governed by operation of said switching apparatus to extend said third connection for returning a storage signal over said first connection to said first station, means for releasing said first connection, means whereby said last-mentioned means is controllable from said first station after receiving said storage signal, means subsequently governed by an idle condition of a trunk in said second group for reoperating said switching apparatus to release said third connection and to extend a fourth connection therefrom over an idle trunk in said second group to said second station and for operating said switching apparatus to extend a fifth connection therefrom over an idle trunk in said first group to said first station, and means controlled by operation of said switching apparatus to extend said fourth and fifth connections for operatively interconnecting said fourth and fifth connections.

4. The telephone system set forth in claim 3, wherein said first and second stations are in the form of operator positions at first and second switchboards respectively provided in said first and second offices.

5. The telephone system set forth in claim 3, wherein said first group of trunks is considerably larger than said second group of trunks.

6. In a telephone system, a first office provided with a first station, a second office provided with a second station, a tandem exchange provided with switching apparatus and storage equipment and register equipment, a first group of trunks extending between said first office and said tandem exchange, a second group of trunks extending between said second office and said tandem exchange, means for extending a first connection from said first station over an idle trunk in said first group to said switching apparatus, means for initiating operation of said switching apparatus, means whereby said two last-mentioned means are controllable from said first station, means governed by an idle condition of a trunk in said second group for controlling operation of said switching apparatus to extend a second connection therefrom over an idle trunk in said second group to said second station and governed by a busy condition of all of the trunks in said second group for controlling operation of said switching apparatus to extend a third connection therefrom to said storage equipment, means governed by operation of said switching apparatus to extend said second connection for operatively interconnecting said first and second connections and governed by operation of said switching apparatus to extend said third connection for operating said switching apparatus to extend a fourth connection therefrom to said register equipment and for returning a storage signal over said first connection to said first station, means for transmitting a hold storage signal from said first station over said first connection and said switching apparatus and said fourth connection to said register equipment, means whereby said last-mentioned means is controllable from said first station after receiving said storage signal, means for releasing said first connection, means whereby said last-mentioned means is controllable from said first station after transmitting said hold storage signal, means controlled by the release of said first connection without the registration of said hold storage signal in said register equipment for releasing said switching apparatus, means controlled by the registration of said hold storage signal in said register and subsequently governed by an idle condition of a trunk in said second group for reoperating said switching apparatus to release said third connection and to extend a fifth connection therefrom over an idle trunk in said second group to said second station and for operating said switching apparatus to extend a sixth connection therefrom over an idle trunk in said first group to said first station and for releasing said fourth connection, and means controlled by operation of said switching apparatus to extend said fifth and sixth connections for operatively interconnecting said fifth and sixth connections.

7. The telephone system set forth in claim 6, and further comprising means for releasing said sixth connection, means whereby said last-mentioned means is controllable from said first station, and means controlled by the release of said sixth connections for releasing said switching apparatus.

8. In a telephone system, a first office provided with a plurality of first stations and first switching apparatus, a second office provided with a second station, a tandem exchange provided with second switching apparatus and storage equipment and register equipment, a first group of trunks extending between said first office and said tandem exchange, a second group of trunks extending between said second office and said tandem exchange, means for seizing said first switching apparatus means whereby said last-mentioned means is controllable from any one of said first stations, means for operating said first switching apparatus to extend a first connection therefrom over an idle trunk in said first group to said second switching apparatus, means for initiating operation of said second switching apparatus, means whereby said two last-mentioned means are controllable from said one first station, means governed by an idle condition of a trunk in said second group for controlling operation of said second switching apparatus to extend a second connection therefrom over an idle trunk in said second group to said second station and governed by a busy condition of all of the trunks in said second group for controlling operation of said second switching apparatus to extend a third connection therefrom to said storage equipment, means governed by operation of said second switching apparatus to extend said second connection for operatively interconnecting said first and second connections and governed by operation of said second switching apparatus to extend said third connection for operating said second switching apparatus to extend a fourth connection therefrom to said register equipment and for returning a storage signal over said first connection to said one first station, means for transmitting an identification signal from said one first station over said first switching apparatus and said first connection and said second switching apparatus and said fourth connection to said register equipment, means whereby said last-mentioned means is controllable from said one first station after receiving said storage signal, means for releasing said first switching apparatus in order to release said first connection, means whereby said last-mentioned means is controllable from said one first station after transmitting said identification signal, means controlled by the registration of said identification signal in said register and subsequently governed by an idle condition of a trunk in said second group for reoperating said second switching apparatus to release said third connection and to extend a fifth connection therefrom over an idle trunk in said second group to said second station and for operating said second switching apparatus to extend a sixth connection therefrom over an idle trunk in said first group to said first switching apparatus and for operating said first switching apparatus to extend a seventh connection therefrom to said one first station and for releasing said fourth connection, means controlled by operation of said second switching apparatus to extend said fifth and sixth connections for operatively interconnecting said fifth and sixth connections, and means controlled by operation of said first switching apparatus to extend said seventh connection for operatively interconnecting said sixth and seventh connections.

9. The telephone system set forth in claim 8, wherein said first stations are in the form of different positions at a first operator switchboard in said first office and said second station is in the form of a second operator switchboard in said second office.

10. The telephone system set forth in claim 8, and further comprising means for releasing said seventh connection, means whereby said last-mentioned means is controllable from said one first station, and means controlled by the release of said seventh connection for releasing said first and second switching apparatus.

11. In a telephone system, an operator switchboard, a trunk line, an automatic switch, a group of trunks, storage equipment, a link, means for extending a call from said operator switchboard over said trunk line to said switch, means for initiating operation of said switch, means whereby said two last-mentioned means are controllable from said operator switchboard, means governed by an idle condition of a trunk in said group for controlling operation of said switch to select an idle trunk in said group and governed by a busy condition of all of the trunks in said group for controlling operation of said switch to select said storage equipment, means governed by operation of said switch to select said storage equipment for connecting said link to said switch and for returning a storage signal over said trunk line to said operator switchboard, means for releasing said trunk line, means whereby said last-mentioned means is controllable from said operator switchboard after receiving said storage signal, means subsequently governed by an idle condition of a trunk in said group for reoperating said switch to release said storage equipment and to select an idle trunk in said group, means controlled by reoperation of said switch to select an idle trunk in said group for connecting said link to said trunk line and for extending a call over said trunk line to said operator switchboard, and answer equipment at said operator switchboard for answering the call on said trunk line.

12. In a telephone system, an operator switchboard, a plurality of trunk lines, a plurality of automatic switches, a group of trunks, storage equipment, a plurality of links, means for extending a call from said operator switchboard over an idle one of said trunk lines to an idle one of said switches, means for initiating operation of said one switch, means whereby said two last-mentioned means are controllable from said operator switchboard, means governed by an idle condition of a trunk in said group for controlling operation of said one switch to select an idle trunk in said group and governed by a busy condition of all of the trunks in said group for controlling operation of said one switch to select said storage equipment, means governed by operation of said one switch to select said storage equipment for connecting an idle one of said links to said one switch and for returning a storage signal over said one trunk line to said operator switchboard, means for releasing said one trunk line, means whereby said last-mentioned means is controllable from said operator switchboard after receiving said storage signal, means subsequently governed by an idle condition of a trunk in said group for reoperating said one switch to release said storage equipment and to select an idle trunk in said group, means controlled by reoperation of said one switch to select an idle trunk in said group for connecting said one link to an idle one of said trunk lines and for extending a call therefrom over said one trunk line to said operator switchboard, and answer equipment at said operator switchboard for answering the call on said one trunk line.

13. In a telephone system, an operator switchboard, a plurality of trunk lines, a plurality of automatic switches, a group of trunks, storage equipment, a plurality of links, a plurality of senders, means for extending a call from said operator switchboard over an idle one of said trunk lines to an idle one of said switches, means for initiating operation of said one switch, means whereby said two last-mentioned means are controllable from said operator switchboard, means governed by an idle condition of a trunk in said group for controlling operation of said one switch to select an idle trunk in said group and governed by a busy condition of all of the trunks in said group for controlling operation of said one switch to select said storage equipment, means governed by operation of said one switch to select said storage equipment for connecting an idle one of said links to said one switch, means controlled by the connection of said one link to said one switch for connecting said one link to an idle one of said senders, means controlled by the connection of said one link to said one sender for operating said one sender to send a storage signal over said one link and said one switch and said one trunk line to said operator switchboard, means for releasing said one trunk line, means whereby said last-mentioned means is controllable from said operator switchboard after receiving said storage signal, means subsequently governed by an idle condition of a trunk in said group for reoperating said one switch to release said storage equipment and to select an idle trunk in said group, means controlled by reoperation of said one switch to select an idle trunk in said group for connecting said one link to an idle one of said trunk lines and for extending a call therefrom over said one trunk line to said operator switchboard, and answer equipment at said operator switchboard for answering the call on said one trunk line.

14. In a telephone system, an operator switchboard, a plurality of trunk lines, a plurality of automatic switches, a group of trunks, storage equipment, a plurality of links, a plurality of register-senders, automatic switching apparatus, means for extending a call from said operator switchboard over an idle one of said trunk lines to an idle one of said switches, means for initiating operation of said one switch, means whereby said two last-mentioned means are controllable from said operator switchboard, means governed by an idle condition of a trunk in said group for controlling operation of said one switch to select an idle trunk in said group and governed by a busy condition of all of the trunks in said group for controlling operation of said one switch to select said storage equipment, means governed by operation of said one switch to select said storage equipment for connecting an idle one of said links to said one switch, means controlled by the connection of said one link to said one switch for connecting said one link to an idle one of said register-senders, means controlled by the connection of said one link to said one register-sender for operating said one register-sender to send a storage signal over said one link and said one switch and said one trunk line to said operator switchboard, means for transmitting an identification signal over said one trunk line and said one switch and said one link to said one register-sender, means whereby said last-mentioned means is controllable from said operated switchboard after receiving said storage signal, means for releasing said one trunk line, means whereby said last-mentioned means is controllable from said operator switchboard after transmitting said identification signal, means subsequently governed by an idle condition of a trunk in said group for reoperating said one switch to release said storage equipment and to select an idle trunk in said group, means controlled by reoperation of one switch to select an idle trunk in said group for operating said one register-sender, and means controlled by operation of said one register-sender for operating said switching apparatus to complete a connection from said one link over an idle one of said trunk lines to said operator switchboard.

15. In a telephone system, an operator switchboard, a plurality of trunk lines, a plurality of automatic switches, a group of trunks, storage equipment, a plurality of links, a plurality of register-senders, automatic switching apparatus, means for extending a call from said operator switchboard over an idle one of said trunk lines to an idle one of said switches, means for initiating operation of said one switch, means whereby said two last-mentioned means are controllable from said operator switchboard, means governed by an idle condition of a trunk in said group for controlling operation of said one switch to select an idle trunk in said group and governed by a busy condition of all of the trunks in said group for controlling operation of said one switch to select said storage equipment, means governed by operation of said one switch to select said storage equipment for connecting an idle one of said links to said one switch, means controlled by the connection of said one link to said one switch for connecting said one link to an idle one of said register-senders, means controlled by the connection of said one link to said one register-sender for operating said one register-sender to send a storage signal over said one link and said one switch and said one trunk line to said operator switchboard, means for transmitting an identification signal over said one trunk line and said one switch and said one link to said one register-sender, means whereby said last-mentioned means is controllable from said operator switchboard after receiving said storage signal, means for releasing said one trunk line, means whereby said last-mentioned means is controllable from said operator switchboard after transmitting said identification signal, means subsequently governed by an idle condition of a trunk in said group for reoperating said one switch to release said storage equipment and to select an idle trunk in said group, means controlled by reoperation of said one switch to select an idle trunk in said group for connecting said one link to an idle one of said trunk lines, means controlled by the connection of said one link to said one trunk line for connecting said one trunk line to said switching apparatus and for operating said one register-sender to send said identification signal therefrom over said one trunk line to said switching apparatus in order to operate said switching apparatus to extend a call therefrom to said operator switchboard, and answer equipment at said operator switchboard for answering the call extended thereto from said switching apparatus.

16. In a telephone system, an operator switchboard, a plurality of trunk lines, a plurality of automatic switches, a group of trunks, storage equipment, a plurality of links, each of said links including first and second and third finders, a plurality of register-senders, automatic switching apparatus, means for extending a call from said operator switchboard over an idle one of said trunk lines to an idle one of said switches, means for initiating operation of said one switch, means whereby said two last-mentioned means are controllable from said operator switchboard, means governed by an idle condition of a trunk in said group for controlling operation of said one switch to select an idle trunk in said group and governed by a busy condition of all of the trunks in said group for controlling operation of said one switch to select said storage equipment, means governed by operation of said one switch to select said storage equipment for assigning an idle one of said links, means controlled by the assignment of said one link for operating the first finder thereof to find said one switch, means controlled by the last-mentioned operation of the first finder of said one link for operating the second finder thereof to find an idle one of said register-senders, means controlled by the last-mentioned operation of the second finder of said one link for operating said one register-sender to send a storage signal over said one link and said one switch and said one trunk line to said operator switchboard, means for transmitting an identification signal over said one trunk line and said one switch and said one link to said one register-sender, means whereby said last-mentioned means is controllable from said operator switchboard after receiving said storage signal, means for releasing said one trunk line, means whereby said last-mentioned means is controllable from said operator switchboard after transmitting said identification signal, means subsequently governed by an idle condition of a trunk in said group for reoperating said one switch to release said storage equipment and to select an idle trunk in said group, means controlled by reoperation of said one switch to select an idle trunk in said group for operating the third finder of said one link to find an idle one of said trunk lines, means controlled by the last-mentioned operation of the third finder of said one link for connecting said one trunk line to said switching apparatus and for operating said one register-sender to send said identification signal therefrom over said one link and said one trunk line to said switching apparatus in order to operate said switching apparatus to extend a call therefrom to said operator switchboard, and answer equipment at said operator switchboard for answering the call extended thereto from said switching apparatus.

17. In a telephone system, a plurality of operator positions, a trunk line, an automatic switch, a group of trunks, storage equipment, a link, a register-sender, automatic switching apparatus, means for extending a call from any one of said operator positions over said trunk line to said switch, means for initiating operation of said switch, means whereby said two last-mentioned means are controllable from said one operator position, means governed by an idle condition of a trunk in said group for controlling operation of said switch to select an idle trunk in said group and governed by a busy condition of all of the trunks in said group for controlling operation of said switch to select said storage equipment, means governed by operation of said switch to select said storage equipment for connecting said link to said switch and to said register-sender, means controlled by the connection of said link to said register-sender for operating said register-sender to send a storage signal over said link and said switch and said trunk line to said one operator position, means for transmitting an identification signal over said trunk line and said switch and said link to said register-sender, means whereby said last-mentioned means is controllable from said one operator position after receiving said storage signal, means for releasing said trunk line, means whereby said last-mentioned means is controllable from said one operator position after transmitting said identification signal, means subsequently governed by an idle condition of a trunk in said group for reoperating said switch to release said storage equipment and to select an idle trunk in said group, means controlled by reoperation of said switch to select an idle trunk in said group for connecting said link to said trunk line, means controlled by the connection of said link to said trunk line for connecting said trunk line to said switching apparatus and for operating said register-sender to send said identification signal therefrom over said link and said trunk line to said switching apparatus in order to operate said switching apparatus to extend a call therefrom to said one operator position, and answer equipment at said one operator position for answering the call extended thereto from said switching apparatus.

18. In a telephone system, a first operator switchboard, a trunk line, an automatic switch, a group of trunks, a second operator switchboard, storage equipment, a link, means for extending a call from said first switchboard over said trunk line to said switch, means for initiating operation of said switch, means whereby said two last-mentioned means are controllable from said first switchboard, means governed by an idle condition of a trunk in said group for controlling operation of said switch to select an idle one of the trunks in said group and governed by a busy condition of all of the trunks in said group for controlling operation of said switch to select said storage equipment, means governed by operation of said switch to select said one trunk for extending a call from said switch over said one trunk to said second switchboard, means governed by operation of said switch to select said storage equipment for connecting said link to said switch and for returning a storage signal over said trunk line to said first switchboard, means for releasing said trunk line, means whereby said last-mentioned means is controllable from said first switchboard after receiving said storage signal, means subsequently governed by an idle condition of a trunk in said group for reoperating said switch to release said storage equipment and to select an idle one of the trunks in said group, means controlled by reoperation of said switch to select said one trunk for connecting said link to said trunk line and for extending a call over said trunk line to said first switchboard, first answer equipment at said first switchboard for answering the call on said trunk line, means controlled by answering of the call on said trunk line at said first switchboard for extending a call from said switch over said one trunk to said second switchboard, second answer equipment at said second switchboard for answering the call on said one trunk, and means controlled by answering of the call on said one trunk at said second switchboard for returning an answer signal over said trunk line to said first switchboard.

19. In a telephone system, a first operator switchboard, a trunk line, an automatic switch, a group of trunks, a second operator switchboard, storage equipment, a link, a register-sender, means for extending a call from said first switchboard over said trunk line to said switch, means for initiating operation of said switch, means whereby said two last-mentioned means are controllable from said first switchboard, means governed by an idle condition of a trunk in said group for controlling operation of said switch to select an idle one of the trunks in said group and governed by a busy condition of all of the trunks in said group for controlling operation of said switch to select said storage equipment, means governed by operation of said switch to select said one trunk for extending a call from said switch over said one trunk to said second switchboard, means governed by operation of said switch to select said storage equipment for connecting said link to said switch and for connecting said register-sender to said link, means controlled by the connection of said register-sender to said link for operating said register-sender to return a storage signal over said link and said switch and said trunk line to said first switchboard, means for transmitting an identification signal from said first switchboard over said trunk line and said switch and said link to said register-sender, means whereby said last-mentioned means is controllable from said first switchboard after receiving said storage signal, means for releasing said trunk line, means whereby said last-mentioned means is controllable from said first switchboard after transmitting said identification signal, means subsequently governed by an idle condition of a trunk in said group for re-operating said switch to release said storage equipment and to select an idle one of the trunks in said group, means controlled by reoperation of one switch to select said one trunk for operating said register-sender, means controlled by operation of said register-sender for operating said switching apparatus to complete a connection from said one link over an idle one of said trunk lines to said first switchboard, first answer equipment at said first switchboard for answering the call extended thereto, means controlled by answering of the call on said trunk line at said first switchboard for extending a call from said switch over said one trunk to said second switchboard, second answer equipment at said second switchboard for answering the call on said one trunk, and means controlled by answering of the call on said one trunk at said second switchboard for returning an answer signal over said trunk line to said first switchboard.

20. In a telephone system, an operator switchboard, a plurality of trunk lines, a plurality of automatic switches, a group of trunks, storage equipment, a plurality of register senders, means for extending a connection from said operator switchboard over an idle one of said trunk lines to an idle one of said switches, means for initiating operation of said one switch, means whereby said two last-mentioned means are controllable from said operator switchboard, means governed by an idle condition of a trunk in said group for controlling operation of said one switch to select an idle one of said trunks and governed by a busy condition of all of the trunks in said group for controlling operation of said one switch to select said storage equipment, means governed by operation of said one switch to select said one trunk for extending a call thereover and governed by operation of said one switch to select said storage equipment for connecting an idle one of said register-senders to said one switch, means controlled by the connection of said one register-sender to said one switch for operating said one register-sender automatically to send a storage signal over said one switch and said one trunk line to said operator switchboard, means for transmitting an identification signal from said operator switchboard over said one trunk line to said one switch, means whereby said two last-mentioned means are controllable from said operator switchboard, means included in said one switch for repeating said identification signal received thereby to said one register-sender, means for releasing said one trunk line, means whereby said last-mentioned means is controllable from said operator switchboard after transmitting said identification signal, means subsequently governed by an idle condition of a trunk in said group for reoperating said one switch to release said storage equipment and to select an idle one of the trunks in said group, means governed by reoperation of said one switch to select said one trunk for operating said one register-sender to send said identification signal over said one switch in order to extend a call from said one switch over an idle one of said trunk lines to said operator switchboard, means controlled by said last-mentioned operation of said one register-sender for disconnecting said one register-sender from said one switch, equipment at said operator switchboard for answering the call on said one trunk line, and means controlled by answering of the call on said one trunk line at said operator switchboard for extending a call from said one switch over said one trunk.

21. The telephone system set forth in claim 20, wherein said storage signal sent by said one register-sender is in the form of one or more predetermined digits, and said identification signal transmitted from said operator switchboard is in the form of one or more given digits.

22. In a telephone system, a first office provided with a first operator switchboard, a second office provided with a second operator switchboard, a tandem exchange provided with automatic switching apparatus and storage equipment, a plurality of toll lines extending between said first office and said tandem exchange, a group of trunk lines extending between said second office and said tandem exchange, for extending a connection from said first switchboard over an idle one said toll lines to said switching apparatus, means for initiating operation of said switching apparatus, means whereby said two last-mentioned means are controllable from said first switchboard, means governed by an idle condition of one of the trunk lines in said group for controlling operation of said switching apparatus to select an idle one of the trunk lines in said group and governed by a busy condition of all of the trunk lines in said group for controlling operation of said switching apparatus to select said storage equipment, means controlled by operation of said switching apparatus to select said one trunk line for returning a select signal over said one toll line to said first switchboard and for forwarding a call signal over said one trunk line to said second switchboard, means controlled by operation of said switching apparatus to select said storage equipment for returning a storage signal over said one toll line to said first switchboard, means for transmitting from said first switchboard an identification signal over said one toll line to said storage equipment, means whereby said last-mentioned means is controllable from said first switchboard after receiving said storage signal, means included in said storage equipment for registering said identification signal transmitted thereto, means for releasing said connection extended from said first switchboard over said one toll line to said switching apparatus, means whereby said last-mentioned means is controllable from said first switchboard after transmitting said identification signal, means governed jointly by the registration of said identification signal in said storage equipment and by the subsequent idle condition of one of the trunk lines in said group for reoperating said switching apparatus to release said storage equipment and to select an idle one of the trunk lines in said group and for extending a connection from said switching apparatus over an idle one of said toll lines to said first switchboard, means controlled by the extension of said last-mentioned connection for forwarding a first call signal over said one toll line to said first switchboard, first answer equipment at said first switchboard for answering the call on said one toll line after receiving said first call signal, means controlled by the answering of the call on said one toll line for forwarding a second call signal over said one trunk line to said second switchboard, second answer equipment at said second switchboard for answering the call on said one trunk line after receiving said second call signal, and means controlled by the answering of the call on said one trunk line for returning an answer signal over said one toll line to said first switchboard.

23. In a telephone system, a group of automatic switches, a group of trunks, storage equipment having a given number of storage positions, the number of switches in said group being greater than the number of trunks in said group, means for extending connections to said switches and then for initiating operation thereof, each of said switches being operative to search over said storage positions in a predetermined order and then over said trunks in a predetermined order, each of said storage positions being normally marked as non-selectable and each of said trunks being normally marked as idle, means controlled by operation of any one of said switches to select an idle one of said trunks for arresting operation of said one switch and for marking said one trunk as busy, means controlled by a busy marking of all of said trunks for marking as selectable the first storage position in said storage equipment, means controlled by operation of any one of said switches to select a selectable one of said storage positions for arresting operation of said one switch and for marking said one storage position as busy and for marking the preceding one of said storage positions as selectable, means for releasing said switches, means controlled by the release of any one of said switches selecting one of said trunks for marking said one trunk as idle, means controlled by the marking of any one of said trunks as idle for removing the selectable marking from the first storage position in said storage equipment, means controlled by the removal of the selectable marking from any one of said storage positions for initiating further operation of the one of said switches selecting said one storage position and then for removing the selectable marking from the preceding one of said storage positions, and means controlled by the further operation of any one of said switches from any one of said storage positions for removing the busy marking from said one storage position.

24. The telephone system set forth in claim 23, and further comprising means controlled by operation of any one of said switches to select any one of said storage positions for returning a storage signal over the connection to said one switch, and means controlled by operation of any one of said switches to select any one of said trunks for returning a trunk signal over the connection to said one switch.

25. The telephone system set forth in claim 23, wherein each of said trunks and each of said storage positions includes a pair of line conductors and a control conductor, said idle and busy markings are applied to the control conductors of said trunks, said busy markings are applied to the control conductors of said storage positions, and said non-selectable and selectable markings are applied to the line conductors of said storage positions.

26. The telephone system set forth in claim 23, wherein each of said switches includes a wiper set provided with a pair of line wipers and a control wiper, a switch relay governed over said control wiper to control arresting of operation thereof, and a wait relay governed over one of said line wipers to control arresting of operation thereof and to control initiating of further operation thereof.

27. The telephone system set forth in claim 23, wherein the means for applying the non-selectable and selectable markings to said storage positions is in the form of a plurality of slow-to-release relays individually associated therewith.

28. In a telephone system, a group of automatic switches, a group of trunks, storage equipment having a given number of storage positions, the number of switches in said group being greater than the number of trunks in said group plus the number of storage positions in said storage equipment, means for extending connections to said switches and then for initiating operation thereof, each of said switches being operative to search over said storage positions in a predetermined order and then over said trunks in a predetermined order, each of said storage positions being normally marked as non-selectable and each of said trunks being normally marked as idle, means controlled by operation of any one of said switches to select an idle one of said trunks for arresting operation of said one switch and for marking said one trunk as busy, means controlled by a busy marking of all of said trunks for marking as selectable the first storage position in said storage equipment, means controlled by operation of any one of said switches to select a selectable one of said storage positions for arresting operation of said one switch and for marking said one storage position as busy and for marking the preceding one of said storage positions as selectable, means for releasing said switches, means controlled by the release of any one of said switches selecting one of said trunks for marking said one trunk as idle, means controlled by the marking of any one of said trunks as idle for removing the selectable marking from the first storage position in said storage equipment, means controlled by the removal of the selectable marking from any one of said storage positions for initiating further operation of the one of said switches selecting said one storage position and then for removing the selectable marking from the preceding one of said storage positions, means controlled by the further operation of any one of said switches from any one of said storage positions for removing the busy marking from said one storage position, and means controlled by operation of any one of said switches past all of said storage positions and all of said trunks for arresting operation of said one switch and for returning an all-busy signal over the connection to said one switch.

29. In a telephone system a first office provided with a first operator switchboard, a second office provided with a second operator switchboard, a tandem exchange provided with automatic switching apparatus and storage equipment, a toll line extending between said first office and said tandem exchange, first and second repeaters respectively disposed in said first office and in said tandem exchange and respectively terminating the associated ends of said toll line, a trunk line extending between said second office and said tandem exchange, means for extending a connection from said first switchboard to said first repeater, means whereby said last-mentioned means is controllable from said first switchboard, means included in said first repeater and controlled by the extension of said connection thereto for sending a seizure signal therefrom over said toll line to said second repeater, means included in said second repeater and controlled by said seizure signal for extending a connection therefrom to said switching apparatus, means for transmitting a dialing signal from said first switchboard to said first repeater, means whereby said last-mentioned means is controllable from said first switchboard, means included in said first repeater and controlled by said dialing signal for repeating a dialing signal therefrom over said toll line to said second repeater, means included in said second repeater and controlled by said dialing signal for initiating operation of said switching apparatus, means governed by an idle condition of said trunk line for controlling operation of said switching apparatus to select said trunk line and governed by a busy condition of said trunk line for controlling operation of said switching apparatus to select said storage equipment, means included in said second repeater and controlled by operation of said switching apparatus to select said trunk line for sending a select signal therefrom over said toll line to said first repeater and for sending a call signal therefrom to said switching apparatus so as to forward a call signal over said trunk line to said second switchboard, means included in said first repeater and controlled by said select signal for repeating a select signal therefrom to said first switchboard, means included in said second repeater and controlled by operation of said switching apparatus to select said storage equipment for sending a storage signal therefrom over said toll line to said first repeater, means included in said first repeater and controlled by said storage signal for repeating a storage signal therefrom to said first switchboard, means for transmitting an identification signal from said first switchboard to said first repeater, means whereby said last-mentioned means is controllable from said first switchboard after receiving said storage signal, means included in said first repeater and controlled by said identification signal for repeating an identification signal therefrom over said toll line to said second repeater, means included in said second repeater and controlled by said identification signal for repeating an identification signal therefrom over said switching apparatus to said storage equipment, means included in said storage equipment for registering said identification signal repeated thereto, means for releasing said connection extended from said first switchboard to said first repeater, means whereby said last-mentioned means is controllable from said first switchboard after transmitting said identification signal, means included in said first repeater and controlled by the release of said connection for releasing said first repeater and for sending a release signal therefrom over said toll line to said second repeater, means included in said second repeater and controlled by said release signal for releasing said second repeater and said connection extending therefrom to said switching apparatus, means governed jointly by the registration of said identification signal in said storage equipment and by the subsequent idle condition of said trunk line for reoperating said switching apparatus to release said storage equipment and to select said trunk line and for extending a connection from said switching apparatus to said second repeater and then for transmitting said identification signal from said storage equipment to said second repeater, means included in said second repeater and controlled by the extension of said connection thereto for sending a seizure signal therefrom over said toll line to said first repeater, means included in said second repeater and controlled by said identification signal for repeating an identification signal therefrom over said toll line to said first repeater, means included in said first repeater and controlled by said seizure signal and said identification signal for extending a connection therefrom to said first switchboard and for sending a call signal therefrom over said connection to said first switchboard and for sending a select signal therefrom over said toll line to said second repeater, first answer equipment at said first switchboard for answering the call extended thereto, means included in said first repeater and controlled by the answering of the call at said first switchboard for sending an answer signal therefrom over said toll line to said second repeater, means included in said second repeater and controlled by said select signal and said answer signal for sending a call signal therefrom to said switching apparatus so as to forward a call signal over said trunk line to said second switchboard, second answer equipment at said second switchboard for answering the call extended thereto, means included in said second repeater and controlled by the answering of the call at said second switchboard for sending an answer signal therefrom over said toll line to said first repeater, and means included in said first repeater and controlled by said answer signal for repeating an answer signal to said first switchboard.

30. The telephone system set forth in claim 29, wherein said first and second repeaters are of the voice frequency signalling type, and all of the signals sent therebetween are in the voice frequency range.

31. The telephone system set forth in claim 30, wherein said dialing signal and said storage signal and said identification signal sent over said toll line are in the form of a series of pulses of a first frequency in the voice frequency range, and said other signals named are in the form of a series of pulses of said first frequency modulated by a lower second frequency in the voice frequency range.

References Cited in the file of this patent

UNITED STATES PATENTS

| Number | Name | Date |
|---|---|---|
| 2,534,500 | Claesson et al. ______ | Dec. 19, 1950 |